United States Patent
Murabayashi

(10) Patent No.: US 7,822,569 B2
(45) Date of Patent: Oct. 26, 2010

(54) SPECIFIC-CONDITION-SECTION DETECTION APPARATUS AND METHOD OF DETECTING SPECIFIC CONDITION SECTION

(75) Inventor: Noboru Murabayashi, Saitama (JP)

(73) Assignee: Sony Corporation (JP)

( * ) Notice: Subject to any disclaimer, the term of this patent is extended or adjusted under 35 U.S.C. 154(b) by 769 days.

(21) Appl. No.: 11/408,111

(22) Filed: Apr. 20, 2006

(65) Prior Publication Data

US 2006/0259261 A1 Nov. 16, 2006

(30) Foreign Application Priority Data

Apr. 20, 2005 (JP) ............... 2005-122171

(51) Int. Cl.
*G01D 18/00* (2006.01)

(52) U.S. Cl. ...................................... 702/85

(58) Field of Classification Search ............ 702/85; 386/46, 52, 55
See application file for complete search history.

(56) References Cited

U.S. PATENT DOCUMENTS 7,298,962 B2 * 11/2007 Quan et al. ............... 386/46

FOREIGN PATENT DOCUMENTS

| JP | 4-192763 A | 7/1992 |
|---|---|---|
| JP | 5-012843 A | 1/1993 |
| JP | 8-317342 A | 11/1996 |
| JP | 2000165798 A | 6/2000 |
| JP | 2000165806 A | 6/2000 |
| JP | 2003219348 A | 7/2003 |
| JP | 2003298981 A | 10/2003 |
| WO | 98/41978 A1 | 9/1998 |

OTHER PUBLICATIONS

Satterwhite, B.; Marques, O.; "Automatic Detection of TV Commercials" IEEE Potentials vol. 23, Issue 2, Apr.-May 2004 pp. 9-12.

* cited by examiner

*Primary Examiner*—Drew A Dunn
*Assistant Examiner*—Stephen J Cherry
(74) *Attorney, Agent, or Firm*—Lerner, David, Littenberg, Krumholz & Mentlik, LLP

(57) ABSTRACT

A specific-condition-section detection apparatus configured to detect a specific condition section in a data signal having a signal level that continues to be closer to a predetermined signal level than a reference level includes a signal correcting unit configured to correct the data signal so that a segment of the data signal is corrected to a level closer to the predetermined signal level than the reference level for a predetermined amount of time starting from the point where the signal level of the data signal changes from a level closer to the predetermined signal level than the reference level to a level further away from the predetermined signal level than the reference level, and a determining unit configured to determine whether the level of the corrected data signal is closer to the predetermined signal level than the reference level.

15 Claims, 35 Drawing Sheets

FIG. 3

PLAY LIST DATA

| (a) | (b) |
|---|---|
| 100 | 700 |
| 900 | 1500 |
| 2000 | 2600 |
| 3000 | 3600 |
| 3700 | 4200 |
| 5000 | 5600 |

FIG. 8

| | (a) | (b) | (c) | (d) |
|---|---|---|---|---|
| CHARACTERISTIC POINT EXTRACTION DATA | RECORDED | NOT RECORDED | RECORDED | NOT RECORDED |
| PLAY LIST DATA (CHAPTER DATA) | RECORDED | RECORDED | NOT RECORDED | NOT RECORDED |

PLAY LIST DATA DOES NOT EXIST.
PLAY LIST WILL BE GENERATED
USING CHARACTERISTIC POINT
EXTRACTION DATA.
PLEASE WAIT.

PLAY LIST IS BEING GENERATED.

PLAY LIST IS GENERATED.

SPECIAL PLAY MODE IS CARRIED OUT

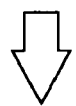

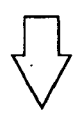

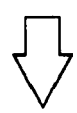
SPECIAL PLAY MODE IS CARRIED OUT

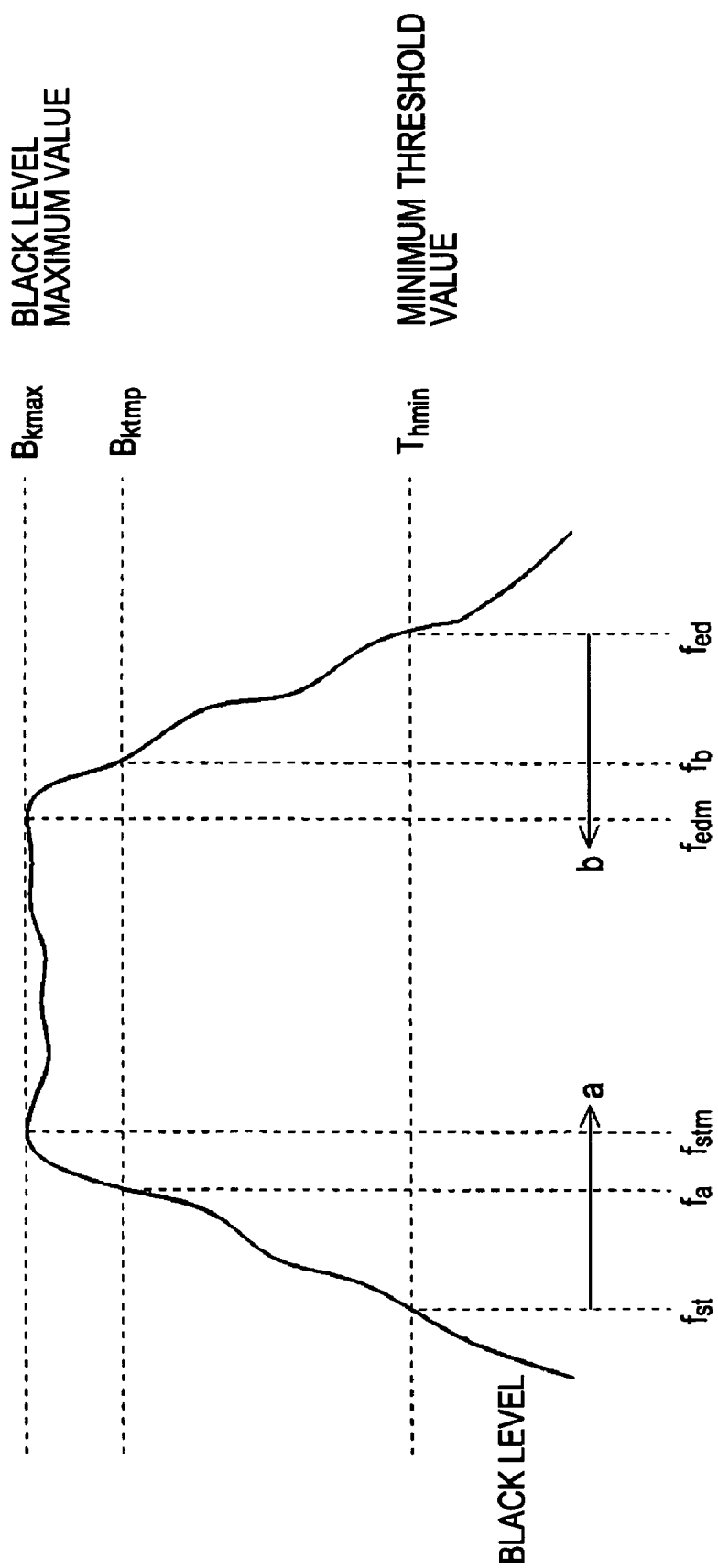

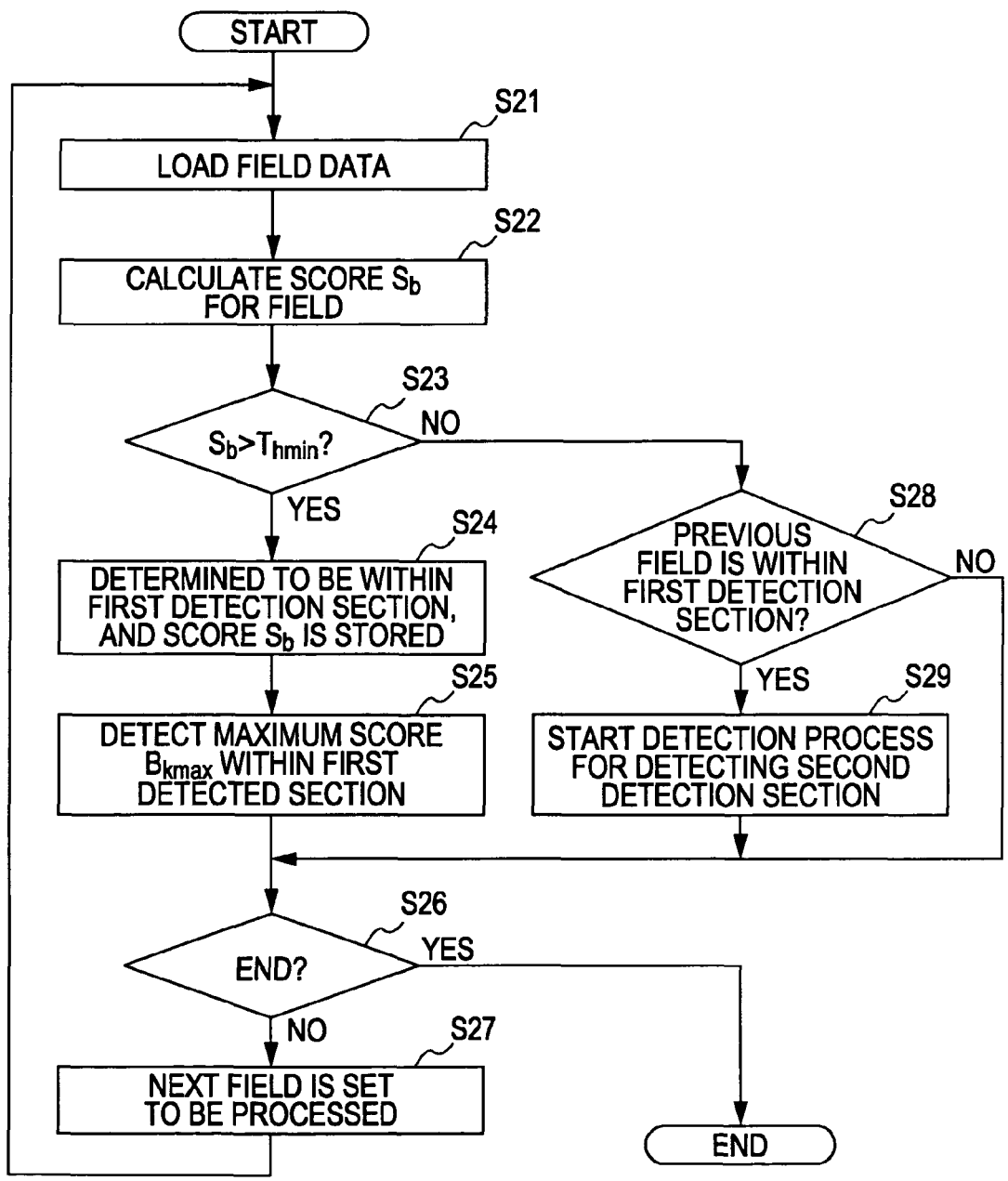

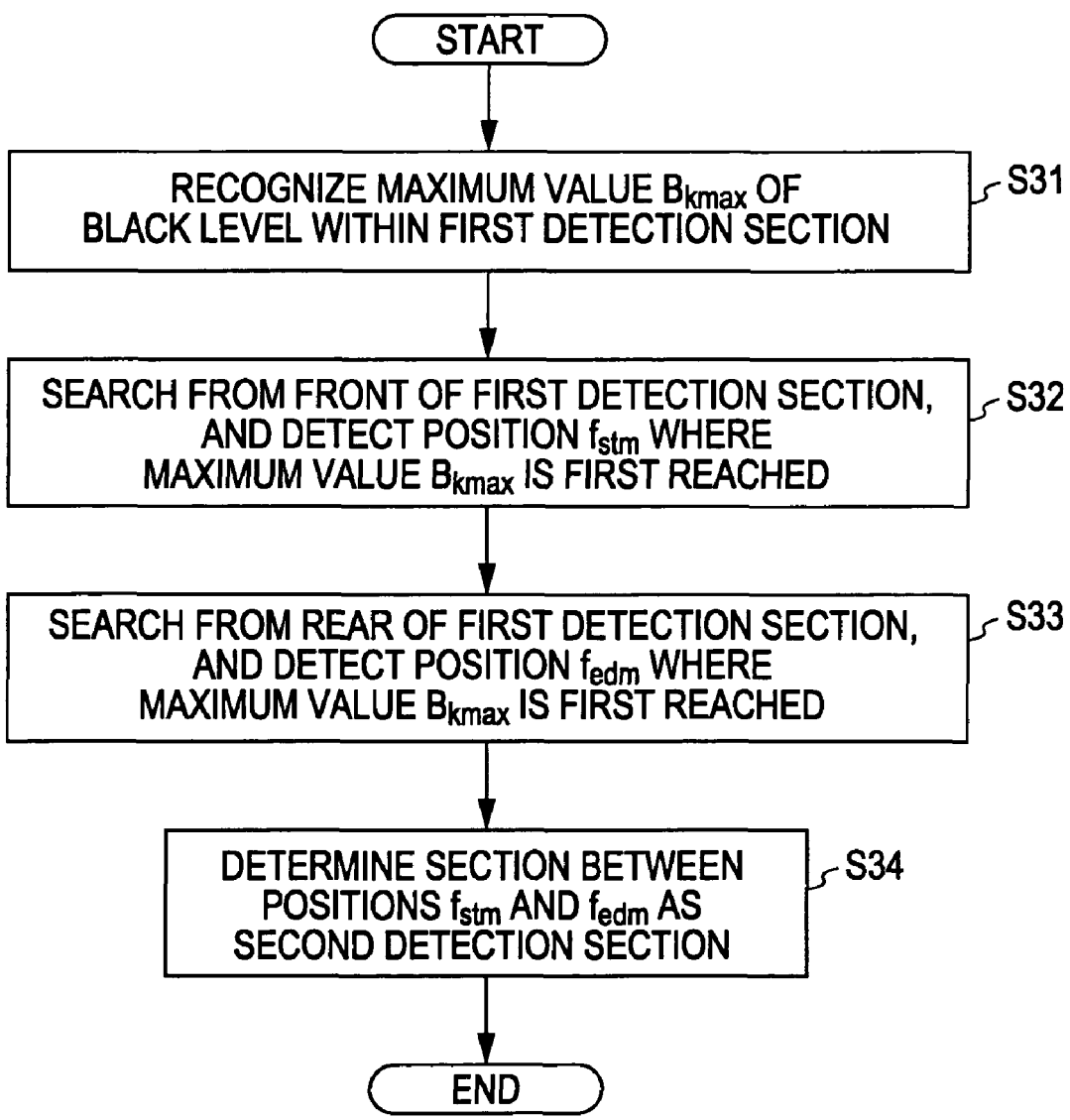

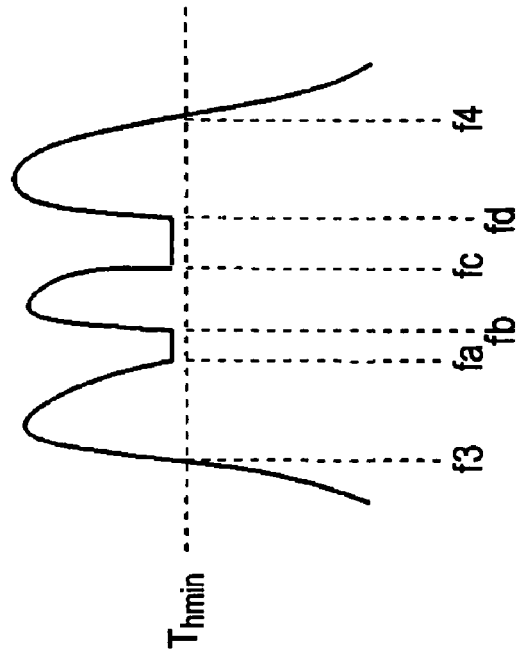
FIG. 24A
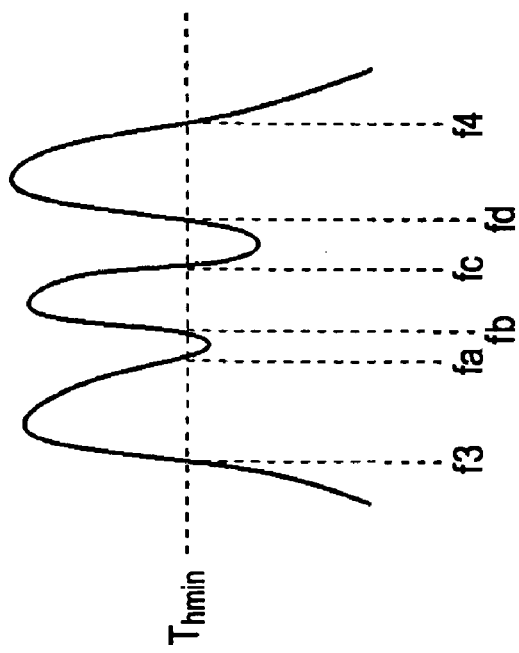
FIG. 24B

FIG. 27

$$Pav = \sum^{nd} |Ad(n)|/Sm \quad \cdots(10)$$

$$Athm = \sum_{k=1}^{t} Pav(n-k)/m \quad \cdots(11)$$
$$(\text{WHERE } t \leq M)$$

$$Athm = (Pav(n-1) + Pav(n-2))/m \quad \cdots(12)$$

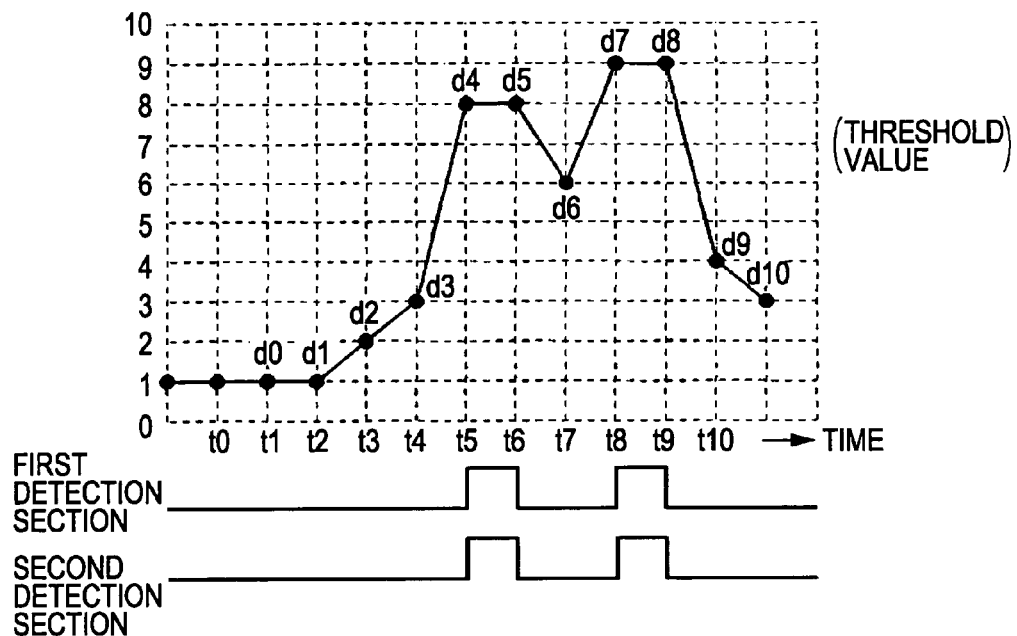
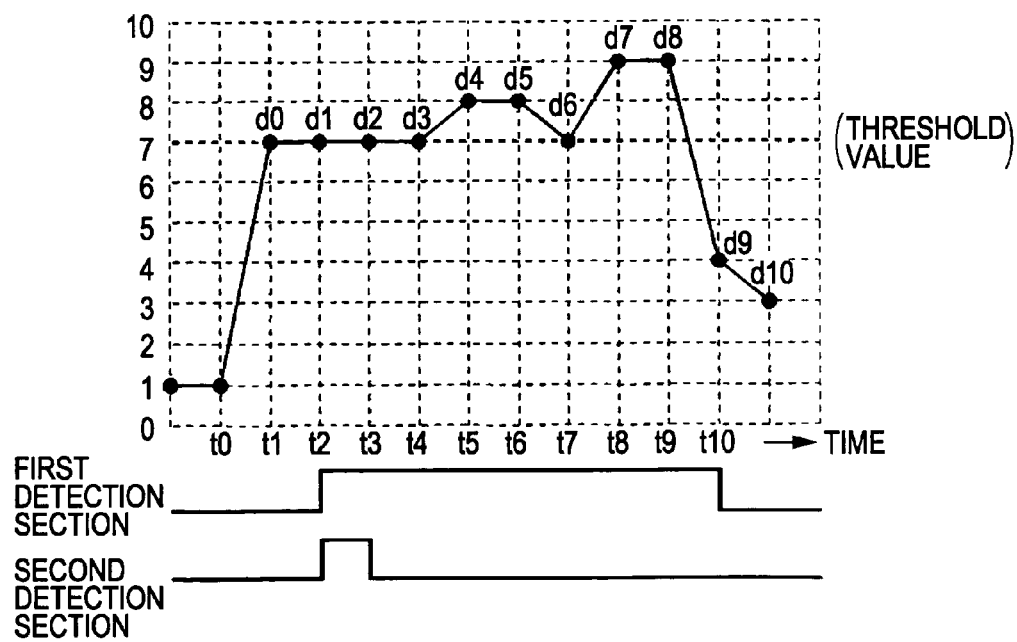

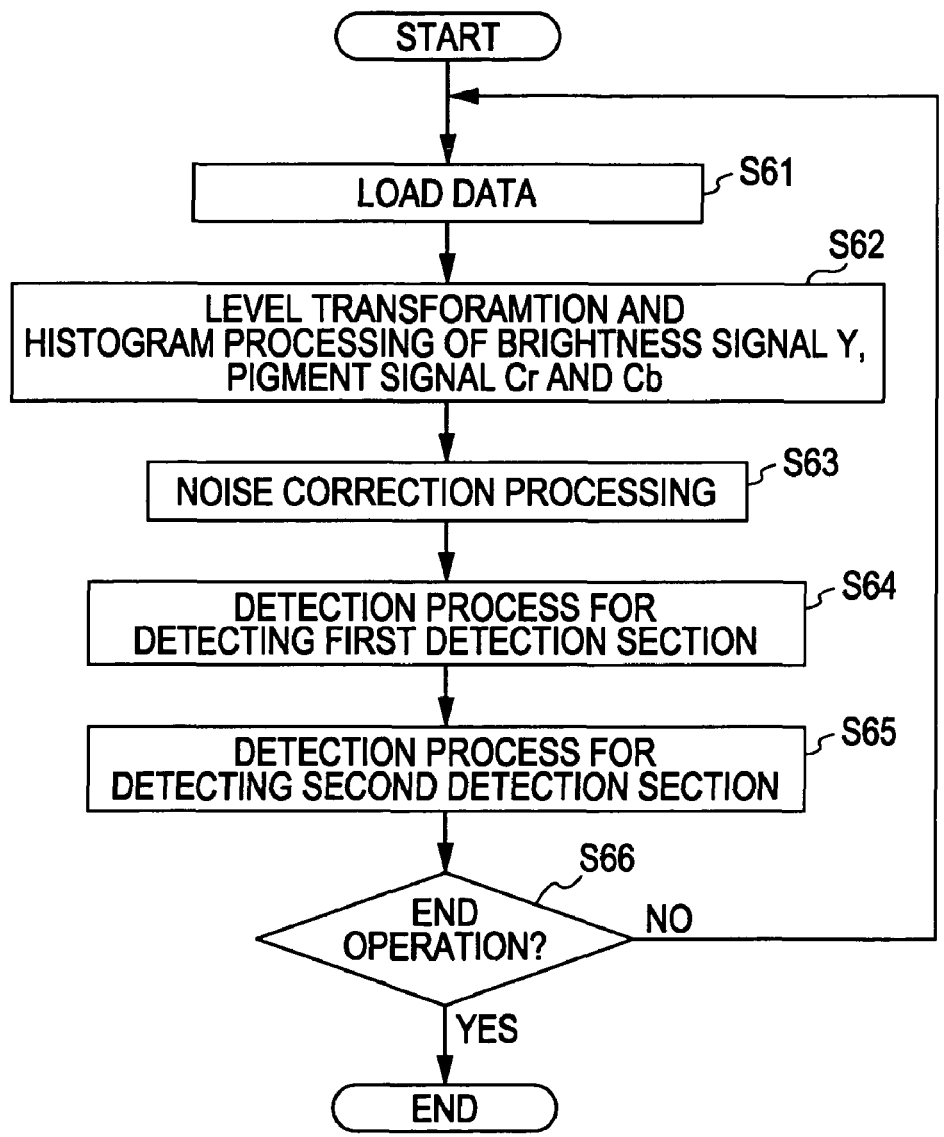

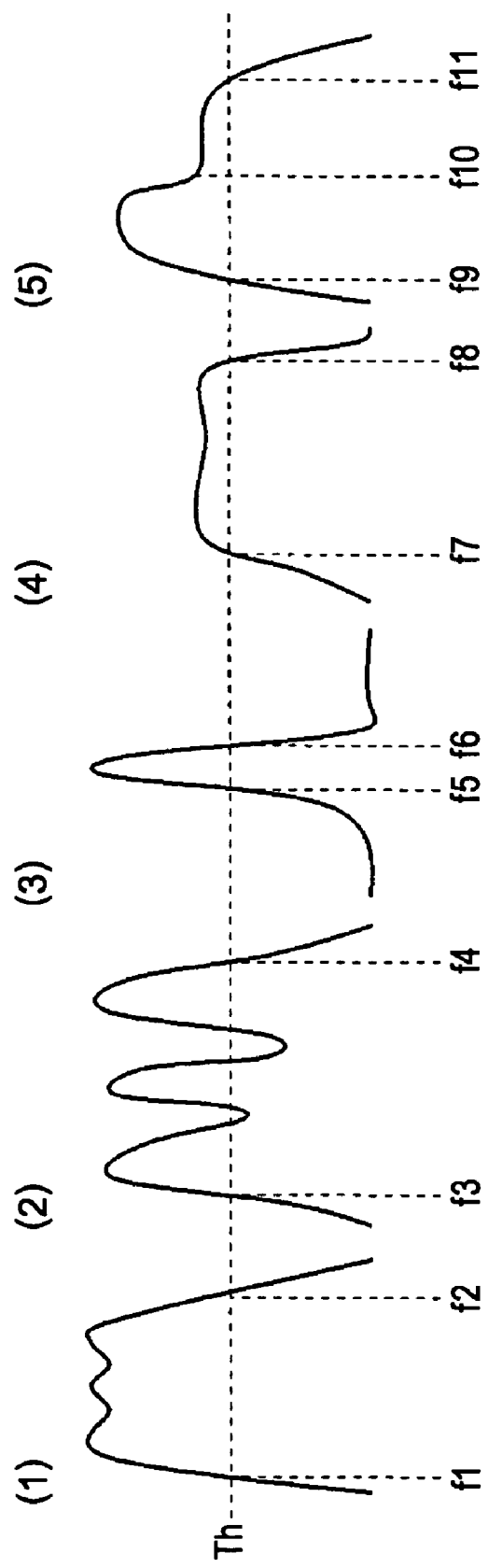

SPECIFIC-CONDITION-SECTION DETECTION APPARATUS AND METHOD OF DETECTING SPECIFIC CONDITION SECTION

CROSS-REFERENCE TO RELATED APPLICATIONS

The present application claims priority from Japanese Patent Application No. JP 2005-122171 filed on Apr. 20, 2005, the disclosure of which is hereby incorporated by reference herein.

BACKGROUND OF THE INVENTION

The present invention relates to a specific-condition-section detection apparatus and a method of detecting a specific condition section that can be satisfactorily employed when detecting, for example, a black level section in a video signal of broadcast television program.

Due to a significant increase in storage capacity and a reduction in sales price, hard disk devices are not only widely used in personal computers but also in commercial recording and reproducing apparatuses configured to record and reproduce video and audio information of broadcast television programs.

A recording and reproducing apparatus including a hard disk device sometimes also includes a recording and playing drive corresponding to a removable recording medium, such as a digital versatile disk (DVD), so that the recording medium can be handled by the apparatus.

Such a recording and reproducing apparatus may be used in a copy recording process in which a user selects predetermined television programs from the various television programs recorded on a hard disk device of the apparatus and stores the selected television programs on a DVD. The apparatus may also be used in an editing process in which only sections of television programs including predetermined scenes selected by the user are recorded or television programs that are already recorded are re-recorded.

When carrying out such a copy recording process or an editing process on a television program selected by the user, a predetermined television program selected by the user or a predetermined television program that may interest the user is retrieved from the various television programs stored on the hard disk device. However, it is time consuming and inefficient to play the all of the various television programs stored on the hard disk device to retrieve specific sections of the recorded television programs.

To efficiently check the content of recorded video and audio data, the recorded video and audio data can be played in a digest play mode in which the play time is reduced by displaying thumbnails corresponding to predetermined points (i.e., chapter points) of a television program or in a special play mode, such as double-speed play mode, or important sections can be selectively played (i.e., key frames).

To set the above-mentioned predetermined points (i.e., chapter points) of a television program, predetermined characteristic data included the video and audio signals is obtained through a predetermined characteristic extraction process. Then, characteristic points corresponding to important scenes (i.e., key frames) included in the obtained characteristic data are detected. These characteristic points can be set as chapter points.

In the above-mentioned digest playing process, characteristic data is detected in a manner similar to that described above, and then predetermined sections between key frames detected on the basis of the detected characteristic data are played in order, as described in Japanese Unexamined Patent Application Publication No. 2003-219348. In this way, video and audio data can be played in an amount of time shorter than that required for a regular play operation.

Characteristic points included in, for example, a television program and set on the basis of characteristic data detected in a manner described above may be points provided between a main section of the television program and a commercial message (CM) section (i.e., a point provided between the end point of a main section and the start point of a CM section or between the end point of a CM section and the start point of a main section) or points provided between a CM section and another CM section.

For example, Japanese Unexamined Patent Application Publication Nos. 2000-165806 and 2000-165798 disclose techniques for determining CM sections on the basis of CM start points and CM end points determined from silent sections detected in the audio signal and the intervals between the silent sections. Since the lengths of CM sections are integral multiples of about 15 seconds, when the detected silent sections that are specific condition sections appear in intervals of integral multiples of 15 seconds, these silent sections are recognized as CM sections.

Television programs that are played using the recording and reproducing apparatus may include, not only Japanese television programs, but also television programs broadcast in countries other than Japan that also conform to the national television system committee (NTSC) standard, such as the United States.

For example, in case of studying English, although various materials for learning English conversation are commercially available, learners may want to watch US television programs to improve their English listening abilities. In such a case, since US television programs conform to the NTSC standard, learners may record US television programs using a video tape recorder in the United States and play the recorded television program using a Japanese video-playing apparatus.

Since the Internet having a high-speed data transfer rate is now widely used, television programs broadcast in Japan and other countries can be received and recorded via the Internet. Television programs recorded in such a manner may also be played and viewed.

The techniques described in Japanese Unexamined Patent Application Publication Nos. 2003-219348, 2000-165806, and 2000-165798 are related to detection of commercial messages included in television programs broadcast in Japan. The techniques described in these documents cannot be simply employed in a process for detecting commercial messages in television programs broadcast in the United States.

In television programs broadcast in the United States, CM sections cannot be accurately detected by detecting silent sections in the same way as detecting CM sections in television programs broadcast in Japan. To accurately detect CM sections in television programs broadcast in the United States, sections including a plurality of fields having low brightness signal levels and a substantially black level must be detected.

The lengths of CM sections in television programs broadcast in the United States are integral multiple of substantially 15 seconds, which is the same as that in Japan. However, it is known that sections including a plurality of field whose brightness signal levels are the substantially black level (hereinafter referred to as 'black sections') are provided at start points and end points of CM sections in US television programs.

Black sections included in CM sections in US television programs and techniques related to CM detection are described in, for example, "Automatic Detection of TV Commercials" (Satterwhite, B.; Marques, O.; Potentials, IEEE, Volume 23, Issue 2, April-May 2004 pp. 9-12). This nonpatent document also describes the characteristics of the lengths of the black sections and the CM sections in television programs including commercial messages that have black sections.

As described above, to detect CM sections in television programs broadcast in the United States, black sections must be detected. In general, to detect black sections, sections in which the brightness signal level of the video signal is lower than a reference level that higher than the black level.

Various characteristic points, start points, end points, CM sections, and segments between CM sections, in a video signal were detected by actually viewing television programs broadcast in the United States. As a result, the various characteristic points were detected although noise was present in the signal.

FIG. 40 illustrates the possible waveforms of a brightness signal included in a video signal referred to when detecting a black section corresponding to at least one field. In FIG. 40, the top of the drawing corresponds to the black level, and the bottom the drawing corresponds to the white level. In FIG. 40, Th represents a reference level for comparison. A section in which the signal level exceeds the reference level Th is determined to a black section.

As shown in FIG. 40, a brightness signal 1 has a section in which the signal level is closer to the black level in comparison with the reference level Th for a several fields in a stable manner. A black section can be stably detected in such a brightness signal. In the case of the waveform 1 in FIG. 40, the section from field number f1 to field number f2 is detected as a black section.

In contrast, as shown in FIG. 40, although a brightness signal 2 includes a black section, in some field segments included in the brightness signal, the signal level is closer to the white level compared to the reference level Th due to an influence of noise. In other words, the brightness signal has a fluctuating waveform. In the case of the brightness signal 2 in FIG. 40, although the actual black section is the section from field number f3 to field number f4, the black section cannot be detected accurately.

As shown in FIG. 40, a brightness signal 3 includes a short black section. The length of the black section in which the signal level is closer to the black level compared to the reference level Th is, for example, one field. The black section is the section from field number f5 to field number f6.

As shown in FIG. 40, a brightness signal 4 having a signal level that is only slightly closer to the black level compared to the reference level Th. In this case, the section from field number f7 to field number f8 can be detected as a black section.

As shown in FIG. 40, a brightness signal 5 having a step-like waveform. In this case, if the black section is detected on the basis of whether or not the signal level is closer to the black level compared to the reference level Th, the section from field number f9 to field number f11 will be detected as a black section. However, it is more desirable to employ a detection method that is able to detect the section from field number f9 to field number f10 that is closer to the black level than the section from field number f10 to field number f11 as a black section.

As the brightness signals 1 to 5 shown in FIG. 40, a black section may not be accurately detected in a video signal of a television program when detection is carried out by simply comparing the brightness level and a reference level Th.

The waveforms of the signals 1 to 5 shown in FIG. 40 are not limited to the waveforms of brightness signals of a television program used to detect black sections but are also waveforms observed in any type of data signals used for detecting specific condition sections in which the signal level is closer to a predetermined signal level compared with a reference level.

SUMMARY OF THE INVENTION

As described above, according to embodiments of the present invention, a specific condition section in a data signal having a signal level continuing to be closer to a predetermined signal level than a reference level for comparison can be accurately detected even when the signal is affected by noise.

According to an embodiment of the present invention, a specific-condition-section detection apparatus configured to detect a specific condition section in a data signal having a signal level that continues to be closer to a predetermined signal level than a reference level for comparison includes a signal correction unit configured to correct the data signal so that a segment of the data signal in which the signal level is further away from the predetermined signal level than the reference level is corrected to a level closer to the predetermined signal level than the reference level for a predetermined amount of time starting from a point at which the signal level of the data signal changes from a level closer to the predetermined signal level than the reference level to a level further away from the predetermined signal level than the reference level, and a determination unit configured to determine whether the level of the corrected data signal is closer to the predetermined signal level than the reference level. The specific condition section is detected based on the determination output from the determination unit.

According to this embodiment, a signal correction unit corrects the data signal so that a segment of the data signal in which the signal level is further away from the predetermined signal level than the reference level is corrected to a level closer to the predetermined signal level than the reference level for a predetermined amount of time starting from the point at which the signal level of the data signal changes from a level closer to the predetermined signal level than the reference level to a level further away from the predetermined signal level than the reference level.

Then, a determination unit determines whether the level of the corrected data signal is closer to the predetermined signal level than the reference level. On the basis of the determination output from the determination unit, the specific condition section is detected.

According to another embodiment of the present invention, a specific-condition-section detection apparatus configured to detect a specific condition section in a data signal having a signal level that continues to be closer to a predetermined signal level than a reference level for comparison includes a determination unit configured to determine whether the level of the data signal is closer to the predetermined signal level than the reference level, and a detection unit configured to detect a first point and a second point in a first section of the data signal determined by the determination unit to have a signal level closer to the predetermined signal level than the reference level, the first point being the first point in the first section of the data signal at which the signal level reaches a maximum level in the signal level closer to the predetermined signal level than the reference level when the first section of the data signal is searched from a chronological start position, and the second point being the first point in the first section of the data signal at which the signal level reaches a maximum level in the signal level closer to the predetermined signal level than the reference level when the first section of the data signal is searched backward from a chronological end position. A second section from the first point to the second point is the specific condition section.

According to this embodiment, instead of directly determining a first section in which the signal level reaches the maximum level in the signal level closer to the predetermined signal level than the reference level when the first section of the data signal is searched from the chronological start position as a specific condition section, a second section from a first point to a second point in a first section of the data signal determined by the determination unit to have a signal level closer to the predetermined signal level than the reference level is determined as a special condition section, wherein the first point is the first point in the first section of the data signal at which the signal level reaches the maximum level in the signal level closer to the predetermined signal level than the reference level when the first section of the data signal is searched from the chronological start position, and the second point is the first point in the first section of the data signal at which the signal level reaches the maximum level in the signal level closer to the predetermined signal level than the reference level when the first section of the data signal is searched backward from the chronological end position.

BRIEF DESCRIPTION OF THE DRAWINGS

FIG. 3 illustrates play list data used in a special play mode of the recording and reproducing apparatus shown in FIG. 1.

FIG. 8 illustrates recording states of additional data recorded on a recording medium by the recording and reproducing apparatus shown in FIG. 1.

FIG. 21 illustrates a method of detecting specific condition sections according to an embodiment of the present invention.

FIG. 22 illustrates a flow chart for a process of a method of detecting specific condition sections according to an embodiment of the present invention.

FIG. 23 illustrates a flow chart for a process of a method of detecting specific condition sections according to an embodiment of the present invention.

FIG. 24 illustrates a noise correction process in a method of detecting specific condition sections according to an embodiment of the present invention.

FIG. 27 illustrates expressions used in describing the processing operation of the audio characteristic signal processing unit shown in FIG. 26.

FIG. 30 illustrates the processing operation of a noise correction processing unit according to an embodiment in the characteristic-point extraction unit shown in FIG. 25.

FIG. 31 illustrates the processing operation of a noise correction processing unit according to another embodiment in the characteristic-point extraction unit shown in FIG. 25.

FIG. 32 illustrates the processing operation of a noise correction processing unit according to another embodiment in the characteristic-point extraction unit shown in FIG. 25.

FIG. 39 illustrates a flow chart of the operation processing of the recording and reproducing apparatus shown in FIG. 38.

FIG. 40 illustrates the various types of signal sections detected as specific condition sections.

DETAILED DESCRIPTION

Figure 1:
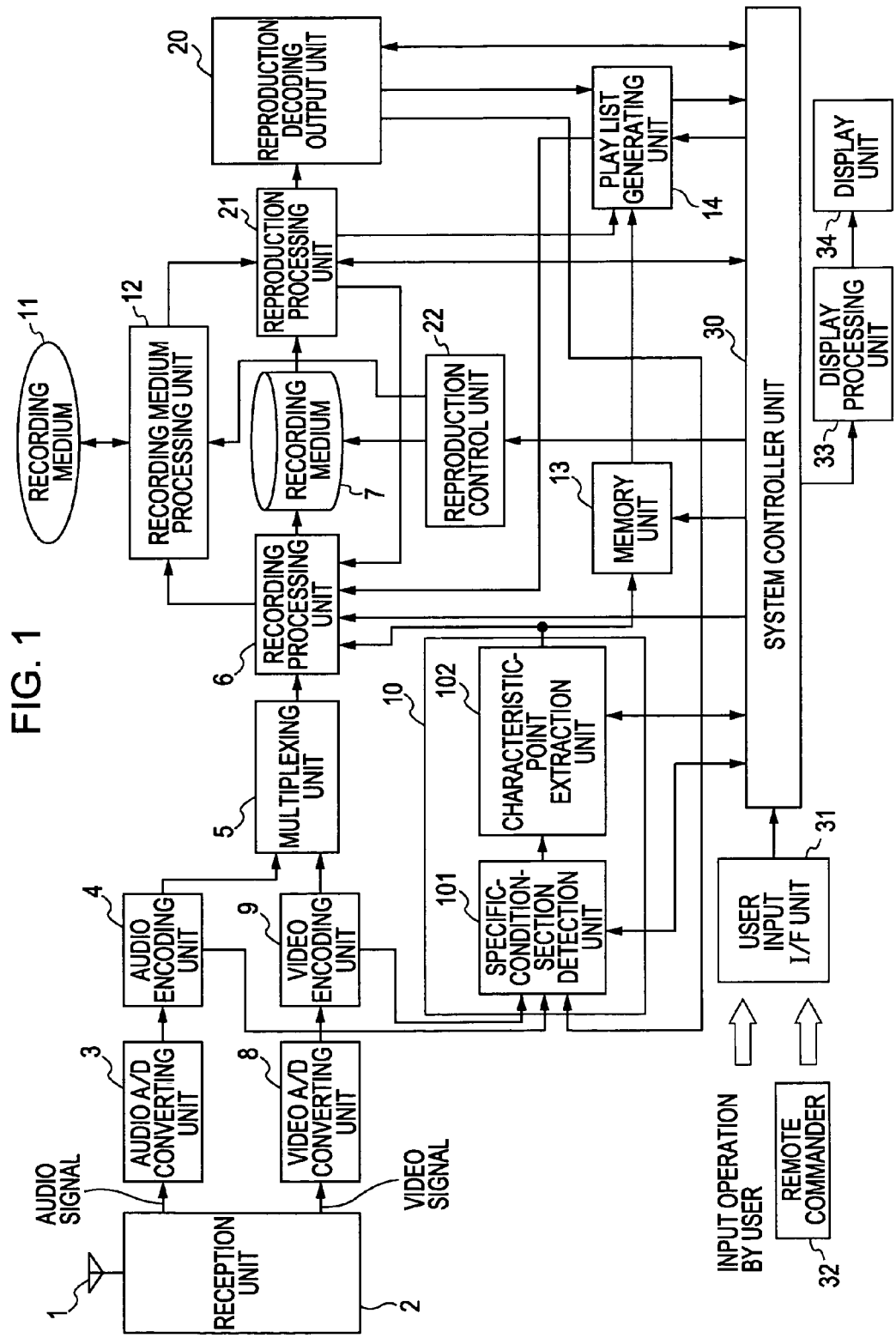
FIG. 1 illustrates a block diagram of a recording and reproducing apparatus employing a method of detecting a specific condition section according to an embodiment of the present embodiment.

A specific-condition-section detection apparatus and a method of detecting a specific condition section according to embodiments of the present invention will be described below with reference to the drawings.

As described below, embodiments of the present invention may be employed for detecting start points and end points of CM sections, start points of main parts of a television program following CM sections, and end points of main parts of a television program followed by CM sections.

According to the present embodiment, the specific-condition-section detection apparatus is included in a recording and reproducing apparatus configured to record video and audio signals of a broadcast television program. The recording and reproducing apparatus is configured to record video and audio signals of a broadcast television program on a recording medium and play the data recorded on the recording medium. At the same time, the specific-condition-section detection apparatus according to the present embodiment included in the recording and reproducing apparatus detects specific condition sections included in the video and audio signals of the recorded television program or the video and audio signals of the played television program. The specific-condition-section detection apparatus detects start points and end points of CM sections, start points of main parts of a television program following CM sections, and end points of main parts of a television program followed by CM sections as characteristic points (or characteristic positions) included in the detected specific condition sections.

According to the present embodiment, if the user inputs a recording instruction, the data of the detected characteristic points is recorded in a predetermined area of a recording medium as an additional data file of the recorded television program.

In a special play mode, the recording and reproducing apparatus according to the present embodiment generates a play list including start points and end points of sections to be reproduced on the basis of the detected characteristic points. Then, data of the generated play list is recorded on a recording medium as an additional data file of the recorded television program. Chapter points may generated from start points and end points of the television program or start points of CM sections from the detected characteristic points, and, then, a data list of the generated chapter points may be recorded on a recording medium.

The play list data is reproduction position data used for signal reproduction processing in a special play mode. The special play mode is an operation mode in which data processing is carried out so that a user can play and view video and audio data of a recorded television program in a play mode other than a normal play mode. In the special play mode, operations such as digest play and skip play of a play list, still image display at a predetermined point (including thumbnail display), and still image display at a chapter setting point (including thumbnail display) are carried out.

For example, to playing only the CM sections, play list data including data on the start points (or start positions) and end points (or end positions) of CM sections are generated. To playing only the main parts of a television program, the start points and end points of the main parts of the television program are detected to generate play list data including data on the start points and end points of the main parts of the television program.

The start points of the main parts of a television program following CM sections and the end points of the main parts of a television program followed by CM sections can be determined from CM start points and CM end points, respectively. According to the present embodiment, the CM start points and the CM end points are detected as characteristic points. However, instead, the start points of the main parts of a television program following CM sections and the end points of the main parts of a television program followed by CM sections may be detected characteristic points.

When the data of a play list is displayed as text data, the data may be displayed as shown in FIG. 3. As described above, the play list data corresponds to the data of the recorded television program and is recorded as an additional data file in a predetermined recording area of a recording medium.

For the play list data shown in FIG. 3, CM start points and CM end points are detected from specific condition sections detected by the specific-condition-section detection unit according to the present embodiment, as described below. Start points and end points of main parts of a television program are detected as characteristic points from the detected CM start points and CM end points. Then, the play list data is generated from the start points and end points of main parts of a television program detected as characteristic points and is recorded.

For example, in FIG. 3, field numbers correspond to the position data of the start points and the end points of the main parts of the television program. In FIG. 3, the data items in column (a) are the position data of the start points of the main parts of the television program, and the data items in column (b) are the position data of the end points of the main parts of the television program. For example, in FIG. 3, the first data corresponds to the 100th to 700th fields. The section corresponding to 100th to 700th fields is a main part of the television program.

In FIG. 3, field numbers are used to represent the position data corresponding to play list data and position data of chapter points. However, the position data may be represented in any other way. For example, position data may be represented by length of time from the moment the recording of the television program was started.

In special play modes, such as a digest play mode, a skip play mode, a chapter point thumbnail display mode, the play list data and chapter point data are read out to carry out predetermined signal processing and predetermined operations in accordance with the selected special play mode.

For example, in a digest play mode, a predetermined reduced-time play operation can be carried out by playing only the sections represented by the fields corresponding to the data item pairs in columns (a) and (b), shown in FIG. 3. In the case shown in FIG. 3, only the sections corresponding the 100th to 700th fields, 900th to 1,500th fields, 2,000th to 2,600th fields and so on are extracted and reproduced, and the other sections are not played. By operating in such a digest play mode, the data can be reproduced in less time than when the data is reproduced in a normal play mode in which all recorded sections are reproduced.

As play list data, only the data items included in column (a) in FIG. 3 that represent position data of the start points of the main parts of the television program may be recorded on a recording medium. If such play list data is recorded, for example, in a chapter point thumbnail display mode, images at the start points of a predetermined television program corresponding to the position data included in column (a) in FIG. 3 may be displayed as thumbnails by processing the F thumbnail signals.

The recording and reproducing apparatus according to the present embodiment is capable of not only recording play list data but also recording data on characteristic points (characteristic point extraction data) detected in the data of the specific condition sections obtained from the video and audio signals of a television program, as data linked to the television program to be recorded. In this way, a play list may be regenerated later.

The recording and reproducing apparatus according to the present embodiment allows a user to select whether or not to record play list data on a recording medium in the same way the user can select whether or not to record characteristic point data on a recording medium.

[Specific Condition Section to be Searched and Detection of CM Sections]

The recording and reproducing apparatus according to the present embodiment is configured to detect CM start points, CM end points, start points of main parts of a television program following CM sections, and end points of main parts of a television program followed by CM sections in television programs broadcast in Japan and in the United States.

As described above, CM start points and CM end points in a television program broadcast in Japan can be detected by, first, detecting silent sections included in the television audio signal since silent sections corresponding to a plurality of fields are included in the audio signal at positions corresponding to the CM start points and CM end points. In other words, CM start points and CM end points can be determined by detecting silent sections in the television audio signal and finding silent sections that appear at intervals of integral multiples of 15 seconds, which is characteristic of CM sections.

On the other hand, as described above, CM start points and CM end points in a television program broadcast in the United States can be detected by, first, detecting black sections included in the television video signal since black sections corresponding to a plurality of fields are included in the video signal at positions corresponding to the CM start points and CM end points. In other words, CM start points and CM end points can be determined by detecting black sections in the television video signal and finding sections that appear at intervals of integral multiples of 15 seconds, which is characteristic of CM sections.

For a television program broadcast in the United States, it has been confirmed that silent sections existing in the television audio signal have a predetermined relationship with the black sections corresponding to the CM start points and CM end points. According to this embodiment, CM start points and CM end points in a television program broadcast in the United States are detected on the basis of both the black sections detected in the television video signal and the silent sections detected in the television audio signal.

Accordingly, the specific-condition-section detection unit according to the present embodiment detects silent sections in an audio signal and black sections in a video signal as specific condition sections.

The recording and reproducing apparatus according to the present embodiment is configured to detect CM start points and CM end points as the above-described characteristic points in the specific condition sections, i.e., the detected silent sections and the detected black sections, detected by the specific-condition-section detection unit.

In this case, when the user knows in advance whether the television program to be searched by specific-condition-section detection unit to detect specific condition sections is broadcast in Japan or the United States, the user can notify this information (i.e., input this information) to the recording and reproducing apparatus.

If the input from the user indicates that the television program to be searched is broadcast in Japan, the recording and reproducing apparatus detects the CM start points and the CM end points as characteristic points on the basis of the silent sections detected at the specific-condition-section detection unit. If the input from the user indicates that the television program to be searched is broadcast in the United States, the recording and reproducing apparatus detects the CM start points and the CM end points as characteristic points on the basis of the black sections detected at the specific-condition-section detection unit.

When the user does not specify whether the television program is broadcast in Japan or the United State, the recording and reproducing apparatus according to the present embodiment detects the CM start points and the CM end points as characteristic points on the basis of the silent sections and the black sections detected at the specific-condition-section detection unit. At the same time, the recording and reproducing apparatus determines whether the television program is broadcast in Japan or the United State on the basis of the detected characteristic points. In other words, the recording and reproducing apparatus according to the present embodiment determines whether the television program to be searched is broadcast in Japan or the United State on the basis of whether or not the characteristic points are found in the silent sections or in both the black sections and the silent sections.

[Descriptions on Specific Condition Section for Detecting Characteristic Points]

Figure 4:
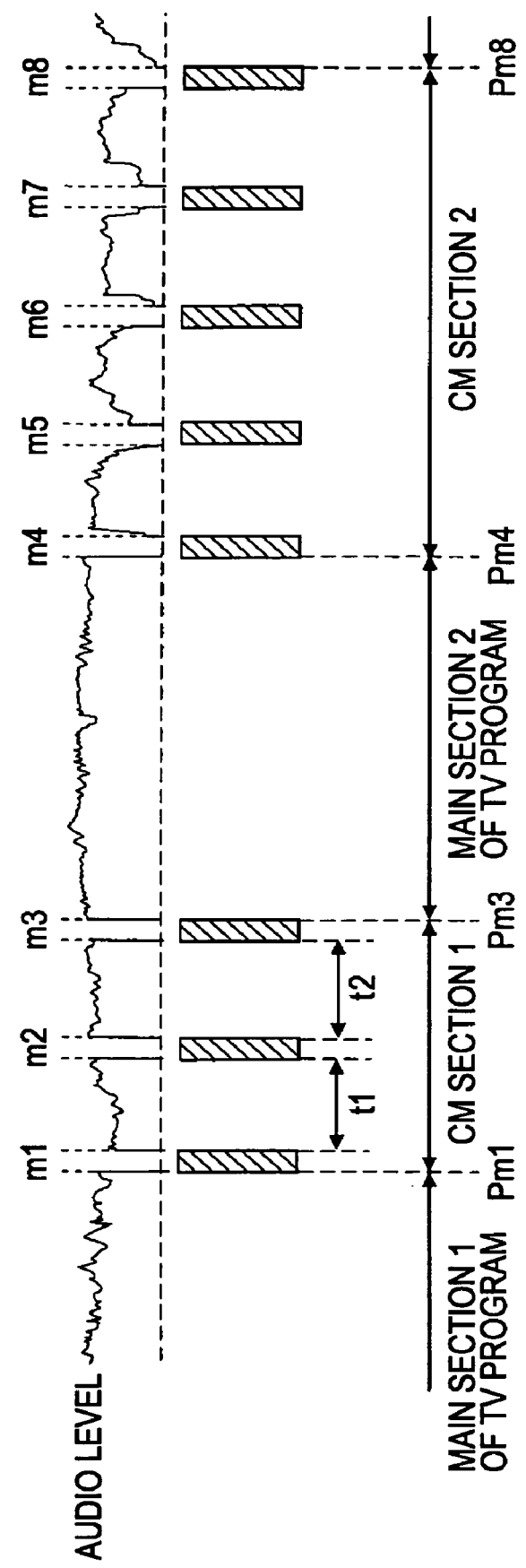
FIG. 4 illustrates CM detection in a television program broadcast in Japan.

(1) Television Program Broadcast in Japan (FIG. 4)

Since methods of CM detection for television programs broadcast in Japan are described in Japanese Unexamined Patent Application Publication Nos. 2000-165806 and 2000-165798, described above, such a method will be described briefly below.

FIG. 4 illustrates the relationship between CM sections, main parts of a television program, and a television audio signal of a television program broadcast in Japan. As shown in FIG. 4, it is known that silent sections m1, m2, m3, . . . each corresponding to a plurality of fields are provided at the CM start points and CM end points in a television program broadcast in Japan. The intervals t1, t2, . . . between commercial messages are known to be integral multiples of 15 seconds.

A characteristic point, for example, in the silent section m1 may be any point or any position in the silent section m1. The characteristic point may be any point in the silent section m1 but only one characteristic point may exist in the silent section m1. In the case shown in FIG. 4, the characteristic points are represented by points Pm1, Pm3, Pm4, and Pm8.

A CM section that is a characteristic section may be defined as a section between a CM start point to a CM end point, i.e., for example, as shown in FIG. 4, the section between the silent sections m1 and m3, or, more specifically, the section between the position Pm1 to Pm3.

Accordingly, the recording and reproducing apparatus according to the present embodiment detects silent sections by, first, detecting the audio signal level of the broadcast television program, then, comparing the detected audio signal level with a predetermined threshold level that is a reference level set for comparison, and, finally, determining the sections where the audio signal level is smaller than the predetermined threshold level as silent sections.

The recording and reproducing apparatus according to the present embodiment temporarily stores data of the detected silent sections in a storage unit and measures the intervals between adjacent silent sections by, for example, carrying out signal processing by a counter. If the intervals (corresponding to the lengths of the CM sections) are integral multiples of 15 seconds, the silent sections used for determining the intervals are determined to be either a CM start point or a CM end point.

Figure 6:
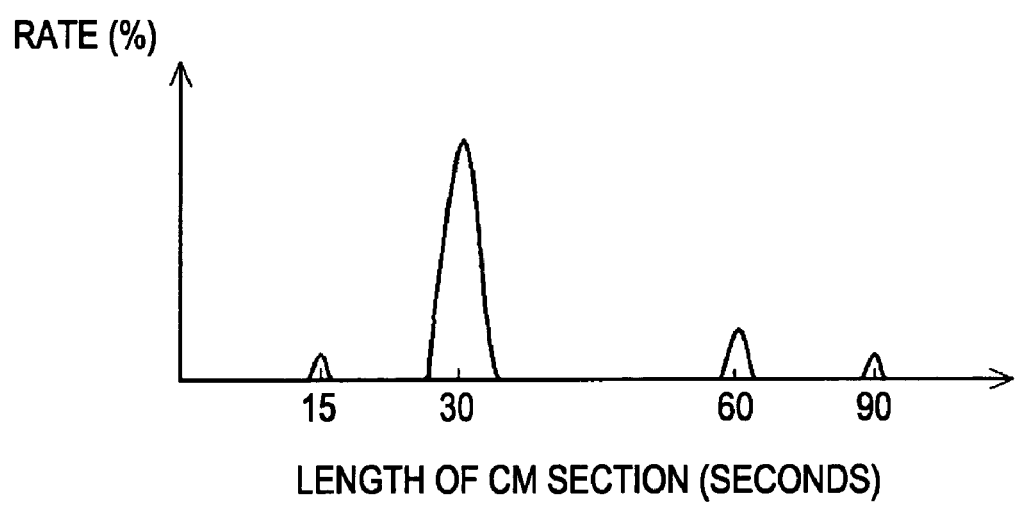
FIG. 6 illustrates characteristics of CM sections.

FIG. 6 illustrates the distribution characteristic of the lengths of CM sections in a television program. As show in the drawing, the lengths of CM sections concentrate at 15 seconds, 30 seconds, 60 seconds, and 90 seconds, which are all integral multiples of 15 seconds.

The maximum length $T_{cmax}$ of a CM section is presumed to be about 90 seconds. Therefore, when considering a point $P_{mi}$ (where i=1, 2, ... ) in a silent section, the point $P_{mi}$ can be determined as a CM start point if other silent sections are not detected before the point $P_{mi}$ within the same amount of time of the maximum length $T_{cmax}$. The detection point $P_{mi}$ can be determined as a CM end point if other silent sections are not detected after the point $P_{mi}$ within the same amount of time of the maximum length $T_{cmax}$.

By actually checking television programs broadcast in the United States, it has been confirmed that the CM distribution characteristic show in FIG. 6 is similar to the CM distribution characteristic of television programs broadcast in the United States. Therefore, in the present embodiment, the CM distribution characteristic show in FIG. 6 is taken into consideration in the process of detecting CM sections in television programs broadcast in the United States, as described below.

Figure 5:
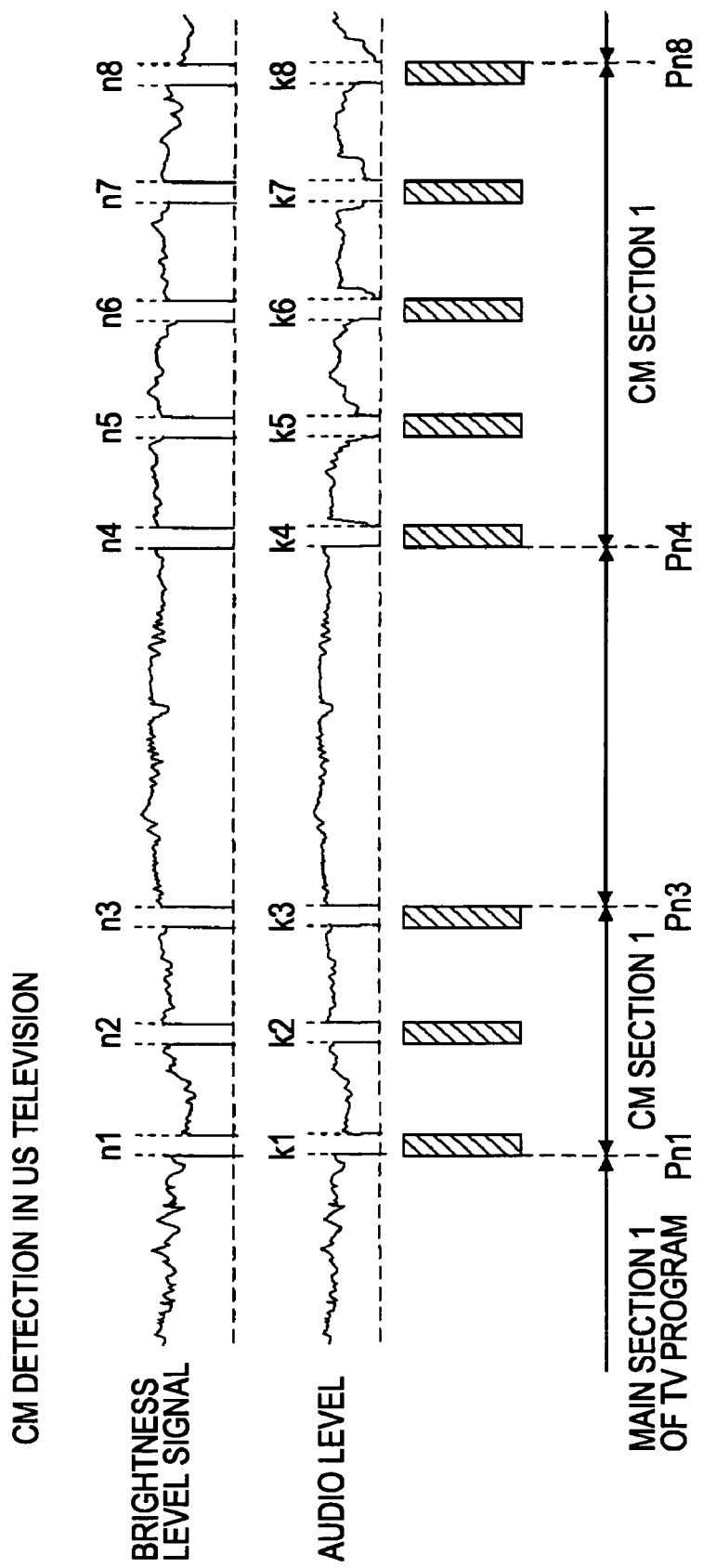
FIG. 5 illustrates CM detection in a television program broadcast in the United States.

(2) Television Program Broadcast in the United States (FIG. 5)

As described above, it is known that black sections corresponding to a plurality of fields exist at CM start points and CM end points in television programs broadcast in the United States.

FIG. 5 illustrates the relationship of CM sections and main parts of television programs, and a television audio signal of a television program broadcast in the United States. As shown in FIG. 5, black sections n1, n2, n3, ... each corresponding to a plurality of fields are provided at the CM start points and CM end points in a television program broadcast in the United States. As shown in FIG. 5, silent sections k1, k2, k3, ... corresponding to the black sections at the CM start points and CM end points exist.

In FIG. 5, the black sections at the CM start points and CM end points and the corresponding silent sections are illustrated so that the length of the black sections and the length of the silent sections match. However, in actuality, the black sections at the CM start points and CM end points and the corresponding silent sections do not always match.

Figure 7:
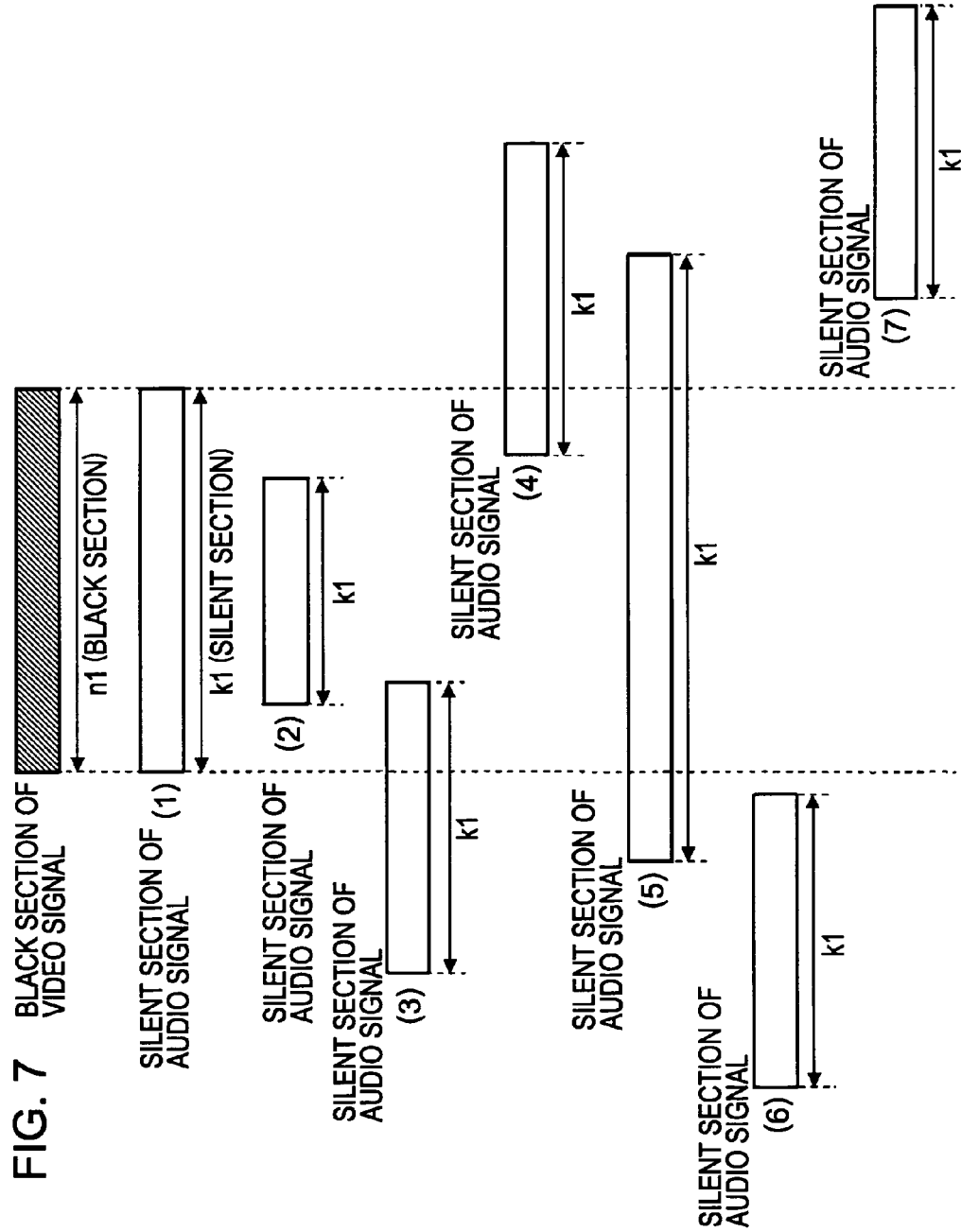
FIG. 7 illustrates CM detection in a television program broadcast in the United States.

FIG. 7 illustrates several different patterns of the chronological relationship between a black section at a CM start points or a CM end points and a corresponding silent section. FIG. 7 shows, for example, patterns 1 to 7 of the chronological relationship between a black section n1 at a CM start point and a corresponding silent section k1.

In the pattern 1, the black section n1 and t the silent section k1 match.

In the pattern 2, the silent section k1 is included in the black section n1.

In the pattern 3, the black section n1 and the silent section k1 partially overlap, wherein the silent section k1 is provided before the black section n1.

In the pattern 4, the black section n1 and the silent section k1 partially overlap, wherein the silent section k1 is provided after the black section n1.

In the pattern 5, the black section n1 is included in the silent section k1.

In the pattern 6, the black section n1 and the silent section k1 do not overlap, and the silent section k1 is provided within a predetermined amount of time before the black section n1. In this case, it is acceptable so long as at least the end point of the silent section k1 is provided within a predetermined amount of time before the black section n1.

In the pattern 7, the black section n1 and the silent section k1 do not overlap, and the silent section k1 is provided within a predetermined amount of time after the black section n1. In this case, it is acceptable so long as at least the start point of the silent section k1 is provided within a predetermined amount of time after the black section n1.

By considering the above-described patterns, in the present embodiment, CM sections in a television program broadcast in the United States are determined by detecting black sections as specific condition sections in a television video signal and silent sections in a television audio signal and determining whether the silent sections are included in the detected black sections or provided near the black sections within a predetermined amount of time.

[Hardware Structure of Recording and Reproducing Apparatus]

FIG. 1 illustrates a block diagram of a recording and reproducing apparatus including a specific-condition-section detection apparatus according to an embodiment of the present embodiment. The block diagram in FIG. 1 mainly illustrates details of the recording system of the recording and reproducing apparatus.

Figure 2:
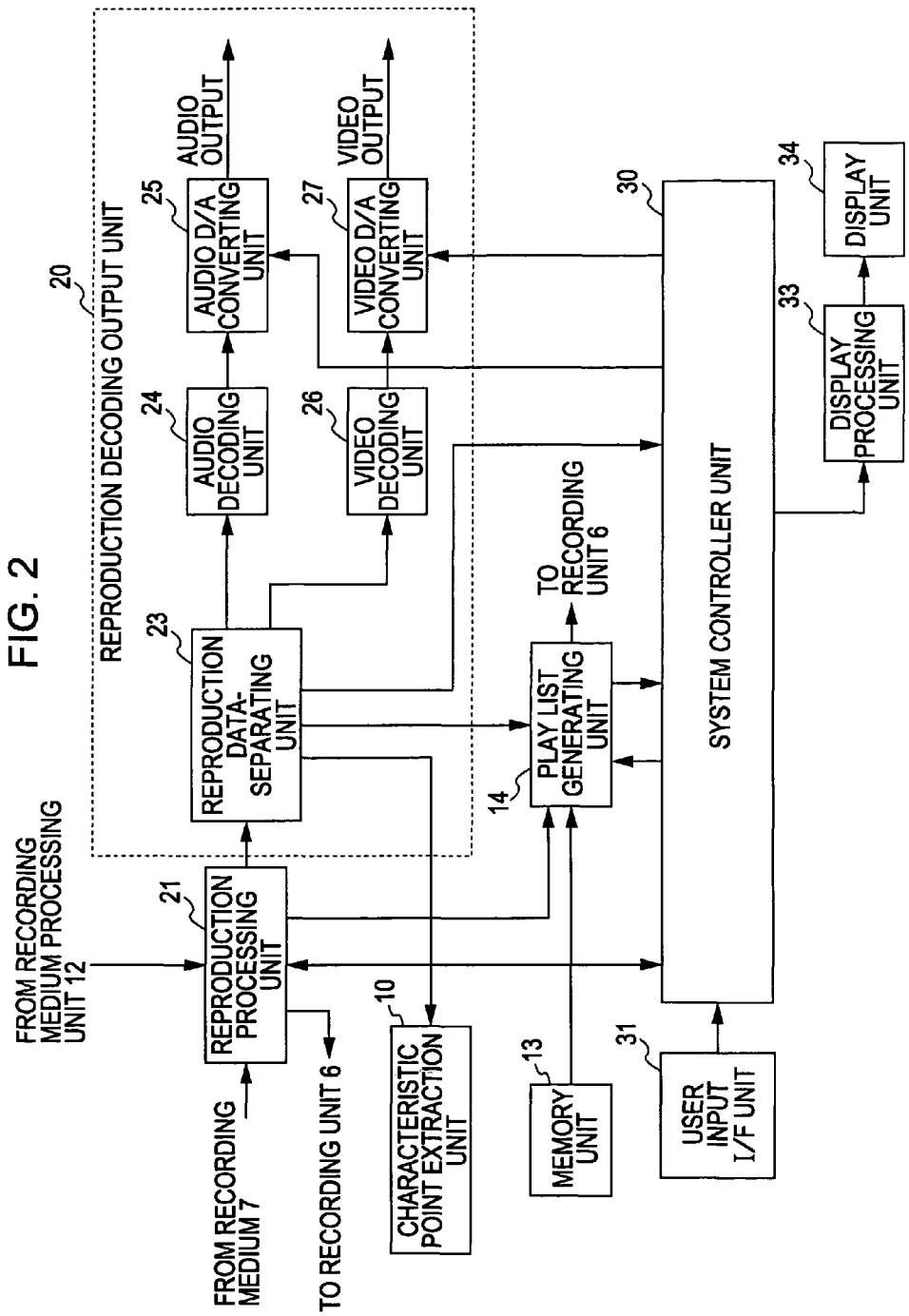
FIG. 2 illustrates a block diagram of a reproduction decode output unit of the recording and reproducing apparatus shown in FIG. 1.

A system controller unit 30, shown in FIGS. 1 and 2, includes a microcomputer and is configured to control the various modes and other operations of the recording and reproducing apparatus according to the present embodiment.

In the system controller unit 30, operation information input by the user using, for example, a remote commander 32 or an operation button of the recording and reproducing apparatus is supplied via a user input interface unit 31. The system controller unit 30 recognizes the input operation information and carries out processing corresponding to the input operation information.

The system controller unit 30 is connected to a display unit 34 via a display processing unit 33. The display unit 34 displays information used as reference by the user when carrying out various input operations.

<Recording System Processing>

First, the recording system of the recording and reproducing apparatus according to the present embodiment will be described with reference to FIG. 1.

When the user uses, for example, the remote commander 32 or an operation button of the recording and reproducing apparatus to input an instruction for recording, this information is supplied to the system controller unit 30 via the user input interface unit 31. Under the control of the system controller unit 30, the recording and reproducing apparatus carries out the following recording processing.

A reception unit 2 includes a television tuner, an intermediate frequency circuit, and a detection circuit for receiving television programs broadcast in Japan or the United States.

Before inputting an instruction for recording, the user uses the remote commander 32 or an operation button on the recording and reproducing apparatus to select a channel. Then, this information is supplied to the system controller unit 30 via the user input interface unit 31 so that the system controller unit 30 supplies channel-selection control information for selecting the broadcasting channel in accordance with the user's selection to the reception unit 2. When selecting a channel, the system controller unit 30 displays the selected channel on the display unit 34 via the display processing unit 33. In this way, the user can select a channel while viewing an image displayed on the display processing unit 33.

The reception unit 2 receives the channel selection control information and selectively extracts a television program broadcast on the channel selected by the user from the television broadcast airwaves received at a reception antenna 1. Furthermore, the reception unit 2 outputs audio signals and video signals of the selectively extracted television program.

At an audio analog to digital (A/D) converting unit 3, analog to digital conversion signal processing is carried out on an audio signals extracted from the selected television program at the reception unit 2 at a predetermined sampling frequency and a predetermined quantization bit number. Then, the processed audio signal is input to an audio encoding unit 4.

At the audio encoding unit 4, data compression processing is carried out according to a predetermined band compression method, such as MPEG audio or AC-3 audio (Dolby AC-3 or Audio Code Number 3). The compressed audio data is supplied to a multiplexing unit 5.

At a video A/D converting unit 8, A/D conversion signal processing is carried out on the video signal of a television program extracted from the selected television program at the reception unit 2 at a predetermined sampling frequency and a predetermined quantization bit number. Then, the processed video signal is input to a video encoding unit 9.

At the video encoding unit 9, data compression processing is carried out according to a predetermined band compression method, such as MPEG video or wavelet transformation. The compressed video data is supplied to the multiplexing unit 5, multiplexed with the compressed audio data, and recorded on an embedded recording medium 7 via a recording processing unit 6. If the user instructs the data to be recorded on a detachable recording medium 11, instead of the embedded recording medium 7, the recording processing unit 6 records the multiplexed data from the multiplexing unit 5 on the recording medium 11 via a recording medium processing unit 12 in accordance with a control signal from the system controller unit 30.

At this time, identification information (i.e., recorded program identification information) is added to the recorded television program. The compressed video data and the compressed audio data are recorded on the recording medium 7 or the recording medium 11 after the recorded program identification information is added to the data. The recorded program identification information is used for a search operation carried out during a play operation.

According to the present embodiment, the recording medium 7 is a hard disk device, whereas the recording medium 11 is a digital versatile disk (DVD). The system controller unit 30 includes a microcomputer.

In FIG. 1, a characteristic-point extraction unit 10 includes a specific-condition-section detection unit 101 that is equivalent to the specific-condition-section detection apparatus according to an embodiment of the present invention and a characteristic-point extraction unit 102 configured to detect characteristic points on the basis of the detection outputs from the specific-condition-section detection unit 101. According to the present embodiment, characteristic points are obtained as CM start points and CM end points from specific condition sections.

In order to detect specific condition sections in an audio signal data obtained during the audio data compression process is input from the audio encoding unit 4 to the specific-condition-section detection unit 101 of the characteristic-point extraction unit 10, as described below.

Specific condition sections can be detected in an audio signal by supplying digital audio data from the A/D converting unit 3 to the specific-condition-section detection unit 101. However, according to the present embodiment, as described below, specific condition sections are detected on the basis of the data obtained during an audio data compression process to detect specific condition sections in a reproduction signal and extract characteristic points and chapter points.

In this way, when detecting specific condition sections in a reproduction signal, the original digital audio data does not have to be restored by completely decoding the reproduction signal, and data obtained during the decoding process can be used to detect the specific condition sections. Consequently, the time required for the detection process is reduced.

Similarly, according to the present embodiment, to detect specific condition sections in a video signal, data obtained during the video data compression process is input from the video encoding unit 9 to the specific-condition-section detection unit 101 of the characteristic-point extraction unit 10, as described below.

Specific condition sections in a video signal can be detected by supplying digital video data from the A/D converting unit 3 to the specific-condition-section detection unit 101. However, according to the present embodiment, similar to the case of detecting specific condition sections in an audio signal, data obtained during the video data compression process is used to detect specific condition sections to increase the speed of detecting specific condition sections in a reproduction signal.

Details of the detection process of specific condition sections and characteristic points carried out at the characteristic-point extraction unit 10 will be described in detail below. According to the present embodiment, in a recording mode or in a play mode when required, specific condition sections in an audio signal and a video signal are detected at the specific-condition-section detection unit 101 in order. On the basis of the detected specific condition sections, the characteristic point extraction unit 102 detects specific condition sections as characteristic points, and characteristic point data extracted from the detected characteristic points is output. In this case, the characteristic point extraction data is position data on the start points and end points of the specific condition sections determined to included characteristic points.

The characteristic point extraction data from the characteristic-point extraction unit 10 is supplied to the recording processing unit 6. Then, at the recording processing unit 6, recording processing is carried out on the characteristic point extraction data so as to record the data in a predetermined recording area on the recording medium 7, i.e., additional file area according to the present embodiment. The characteristic point extraction data from the characteristic-point extraction unit 10 may, instead, be supplied to the recording medium processing unit 12 from the recording processing unit 6 and recorded in a predetermined area in the recording medium 11, i.e., additional file area according to the present embodiment.

In this case, the additional file of the characteristic point extraction data is recorded in the additional file area while being linked to the video data and audio data of the television program recorded on the recording medium 7 or 11 on the basis of the recorded program identification information.

The characteristic point extraction data according to the present embodiment is linked to the field positions of the video data and the audio data of a section of recorded television program by using field numbers of the recorded television program.

Instead of recording the characteristic point extraction data from the characteristic-point extraction unit 10 as an additional file, the characteristic point extraction data may be supplied to the multiplexing unit 5, multiplexed with compression encoded video data and audio data, and recorded in a predetermined recording area of the recording medium 7 or 11.

The characteristic point extraction data may always be recorded together with the compression encoded video data and audio data when recording a television program. However according to the present embodiment, the user can input an instruction for whether or not to record the characteristic point extraction data to the system controller unit 30 via the user input interface unit 31. When the system controller unit 30 receives the instruction, the system controller unit 30 controls the transmission of the characteristic point extraction data from the characteristic-point extraction unit 10 to the multiplexing unit 5.

At the characteristic-point extraction unit 10 according to the present embodiment, various characteristic data extraction processes are carried out on the basis of various video specific data and audio data and predetermined parameter data. The characteristic data to be extracted includes predetermined telop characteristics data (telop section determination data), image characteristic data (image characteristic section determination data) such as personal characteristic data, speaking voice characteristic data (speaking voice determination data), clapping and cheering sound characteristic data (clapping and cheering sound determination data), and other audio characteristic data (audio characteristic section determination data).

The recoding and playing apparatus according to the present embodiment includes a play list generating unit 14. The play list generating unit 14 uses characteristic points extraction data that is specific condition section data determined to include characteristic points extracted at the characteristic-point extraction unit 10 to determine characteristic points, such as CM start points, CM end points, start points of the main part of the television program, and end points of the main part of the television program and then generates a play list from the detected characteristic points. According to the present embodiment, the position information on the start points of the main part of the television program, and end points of the main part of the television program is generated as play list data.

At the play list generating unit 14, not only play list data but also position information on chapter points used in the above-mentioned chapter point thumbnail display mode may be generated and recorded on a recording medium.

In the present embodiment, play list data generation is carried out at the play list generating unit 14 according to a two series signal processing process. The recording and reproducing apparatus according to the present embodiment allows the user to select whether or not to record the play list data generated at the play list generating unit 14.

According to the present embodiment, when the user selects to record the play list data, the play list data generated in either process are recorded in a recording area of the recording medium 7 or 11.

First Process of Play List Data Generation (a)

Characteristic point data (information of specific condition sections determined to include characteristic points) from the characteristic-point extraction unit 10 is temporarily stored in a memory unit 13. The play list generating unit 14 detects the characteristic points on the basis of the information of specific condition sections determined to include characteristic points temporarily stored in the memory unit 13 and generates play list data on the basis of the detected characteristic points.

The method of the first process (a) according to the present embodiment is employed when the characteristic point extraction data that is output from the characteristic-point extraction unit 10 is not recorded on the recording medium 7 or 11. However, the method of the first process (a) may be employed when the characteristic point extraction data is recorded on the recording medium 7 or 11.

As the memory unit 13, the memory area in a memory embedded in the system controller unit 30 may be used.

When recording a television program having a predetermined length t in the first process (a), for example, the recording and reproducing apparatus stores the characteristic point detection output data from the characteristic-point extraction unit 10 in the memory unit 13 while recording the video data and the audio data of the television program having a predetermined length t. In this way, when the recording of the video data and the audio data of the television program having a predetermined length t is completed, position information on the specific condition sections determined to include all characteristic points in the television program is stored in the memory unit 13.

The play list generating unit 14 starts the process for detecting characteristic points, such as CM start points and CM end points, within the length t when the recording of the video data and the audio data of the television program having a predetermined length t is completed and carries out play list data generation processing on the basis of the detected results of the characteristic points.

The generated play list data is supplied from the play list generating unit 14 to the recording processing unit 6. The recording processing unit 6 carries out recording processing so as to record the play list data in a recording area of an additional data file on the recording medium 7. The play list data generated at the play list generating unit 14 may, instead, be supplied from the recording processing unit 6 to the recording medium processing unit 12. The recording medium processing unit 12 carries out recording processing so as to record the play list data in a recording area of an additional data file on the recording medium 11.

In such a case, as described above, the play list data is linked to the field positions of the video data and the audio data of a section of recorded television program by using field numbers of the recorded television program. The play list data is recorded on the recording medium 7 or 11 as an additional data file linked to the compressed video data and the compressed audio data of the television program on the basis of the above-described recorded program identification information.

Second Process of Play List Data Generation (b)

The characteristic point extraction data from the characteristic-point extraction unit 10 is supplied to the recording processing unit 6 every time a specific condition section determined to include the characteristic points is detected. The characteristic point extraction data is linked to the corresponding compressed video data and compressed audio data, for example, on the basis of the recorded program identification information at an additional data file area on the recording medium 7.

In the second process (b), when the recording of the video data and the audio data of the television program is completed, the characteristic point extraction data is played from the recording medium 7 or 11 via a play unit 21 and supplied to the play list generating unit 14. The play list generating unit 14 generates play list data from the characteristic point extraction data obtained from the play unit 21.

The generated play list data is supplied from the play list generating unit 14 to the recording processing unit 6. The play list data is carries out recording processing so as to record the play list data in a recording area of an addition information file on the recording medium 7. The play list data generated at the play list generating unit 14 is supplied from the recording processing unit 6 to the recording medium processing unit 12. The recording medium processing unit 12 carries out recording processing so as to record the play list data in a recording area of an addition information file on the recording medium 11.

In this case, as described above, the play list data is linked to the field positions of the video data and the audio data of a section of recorded television program by using field numbers of the recorded television program. The play list data is recorded on the recording medium 7 or 11 as an additional data file linked to the compressed video data and the compressed audio data of the television program on the basis of the above-described recorded program identification information.

The method of the second process (b) can be employed only when the user instructs the recording to the characteristic point extraction data on the recording medium 7 or 11.

In the method of the second process (b) according to the present embodiment, similar to the method of the first process (a), the play list generating unit 14 first records a television program having a length t, then detects the completion of the recording of the television program having a length t, and finally plays the characteristic point extraction data recorded in the additional data file to start the play list data generation process.

In some case according to the present embodiment, both the play list data and the characteristic point extraction data are recorded in the additional data file recorded on the recording medium 7 or 11. When the play list data is recorded, the characteristic point extraction data does not necessarily have to be recorded on the recording medium 7 or 11. However, according to the present embodiment, the characteristic point extraction data is recorded in case data generation is carried out again.

If the play list data is not to be corrected, the additional data file of the characteristic point extraction data may be deleted when the play list data is recorded as an additional data file on the recording medium 7 or 11.

As described above, the play list data is configured of data linked to the play start point information and the play end point information of each characteristic point section to carry out skip play by extracting the characteristic point sections from the video data and the audio data of the recorded television program. The play list data includes, for example, a data pair of a play start frame (or field) number $F_{start}$ and a play end frame (or field) number $F_{end}$.

An operation mode using the play list data may include an editing operation mode for cutting a predetermined section of the recorded television program or a predetermined operation mode, such as a thumbnail display mode for confirming the content of the record. When entering such an operation mode, the position information of the start frame $F_{start}$ is used to produce a thumbnail from the image corresponding to the position and display the produced thumbnail.

As described above, the play list data can be used for the digest play process by carrying out skip play of predetermined sections in the recorded television program. Therefore, as the play list data, time code data and time stamp data, such as presentation time stamp (PTS) and decode time stamp (DTS) of MPED compression format may be used, in addition to the above-described frame data (field data).

In the above-described first process (a) and second process (b), the play list generating unit 14 generates a play list immediately after recording of the video data and the audio data of the television program having a length t is completed.

In the first process (a), the play list generating unit 14 detects characteristic points using the characteristic point extraction data output from the characteristic-point extraction unit 10 in addition to recording the video data and the audio data of the television program having a length t. On the basis of the detection results, play list data may be generated and recorded in an additional data file area on the recording medium 7 or 11.

As described above, in a recording mode in which the video data and the audio data of the television program is recorded, the play list generating unit 14 is not only used for generating play list data after recording of the television program information is completed and supplying the data to the recording processing unit 6 but also is used in a play mode, described below.

For example, the play list generating unit 14 is used when generating play list data using characteristic point extraction data recorded on the recording medium 7 or 11 as an additional data file and when characteristic point extraction data is output by detecting specific condition sections including characteristic point from the played video and audio data at the characteristic-point extraction unit 10 to generate play list data by sending the characteristic point extraction data to the play list generating unit 14.

<Play System Processing>

Next, the play system of the recording and reproducing apparatus according to the present embodiment will be described with reference to FIGS. 1 and 2.

As described above, the recording and reproducing apparatus according to the present embodiment has, in addition to a normal play mode, a special play mode for playing play list data. The user uses the remote commander 32 or an operation button on the recording and reproducing apparatus to input a command for instructing the start of one of the play modes. Accordingly, the operation information is supplied to the system controller unit 30 via the user input interface unit 31. Under the control of the system controller unit 30, the recording and reproducing apparatus carries out play processing as described below.

(Normal Play Mode Operation)

First, the operation in normal play mode will be described.

When the user inputs an instruction for playing data from the recording medium 7 or 11 in a normal play mode via, for example, the remote commander 32, the instruction is input to the system controller unit 30 via the user input interface unit 31. The system controller unit 30 receives the input from the user and controls a reproduction control unit 22 so as to operate in the normal play mode. Below, a case in which the user selects, for example, the recording medium 7 as a recording medium.

In the normal play mode, the play unit 21 reads out the compressed video data and the compressed audio data of the television program assigned by the user to be played from the recording medium 7. Read out data is supplied to a reproduction decode output unit 20.

At the reproduction decode output unit 20, the compressed video data and the compressed audio data of the played television program is supplied to a reproduction data separating unit 23 to be separated into video data and audio data. Then, the compressed audio data separated at the reproduction data separating unit 23 is supplied to an audio decoding unit 24, where predetermined decoding processing corresponding to the band compression signal processing method employed when recording the data is carried out on the separated compressed audio data.

The digital audio signal obtained by the decoding process carried out at the audio decoding unit 24 is supplied to an audio digital to analog (D/A) converting unit 25, where D/A conversion is carried out on the digital audio signal. The converted digital audio signal is output as an analog audio signal.

The compressed video data separated at the reproduction data separating unit 23 is supplied to a video decoding unit 26, where predetermined decoding processing corresponding to the method of band compression signal processing employed when recording the data is carried out on the separated compressed digital data. The digital video signal obtained by the decoding processing carried out at the video decoding unit 26 is supplied to a video D/A converting unit 27 where D/A conversion is carried out on the digital video signal. The converted digital video signal is output as an analog video signal.

If an additional data file has been recorded on a recording medium, the additional data file is also read out from the recording medium by the play unit 21 and is sent to the reproduction data separating unit 23. At the reproduction data separating unit 23, data in the additional data file is separated into characteristic point extraction data and play list data. Then, the characteristic point extraction data and the play list data are supplied to the system controller unit 30. The characteristic point extraction data is also supplied to the play list generating unit 14.

In the normal play mode, the system controller unit 30 determines not to use the data in the additional data file and discards the data.

(Special Play Mode Operation)

As described above, in the recording and reproducing apparatus according to the present embodiment, the characteristic point extraction data and the play list data that are position information of specific condition sections including characteristic points may be recorded or not recorded, depending on the instruction input by the user. In case a television program is recorded on a recording medium using a recording apparatus other than the recording and reproducing apparatus according to the present embodiment, the characteristic point extraction data and the play list data will not be recorded on the recording medium.

Therefore, when the recording and reproducing apparatus according to the present embodiment operates in the special play mode, the system controller unit 30 scans for a reproduction signal of the additional data file from the reproduction data separating unit 23 and determines whether the characteristic point extraction data and the play list data are recorded together with the video data and the audio data of the television program on the recording medium. Depending on the determination result, the signal processing method in the special play mode is changed.

Four combinations a, b, c, and d of the characteristic point extraction data and the play list data recorded on a recording medium are illustrated in FIG. 8. The reproduction operation in the special play mode corresponding to the four combinations will be described below.

Figure 9:
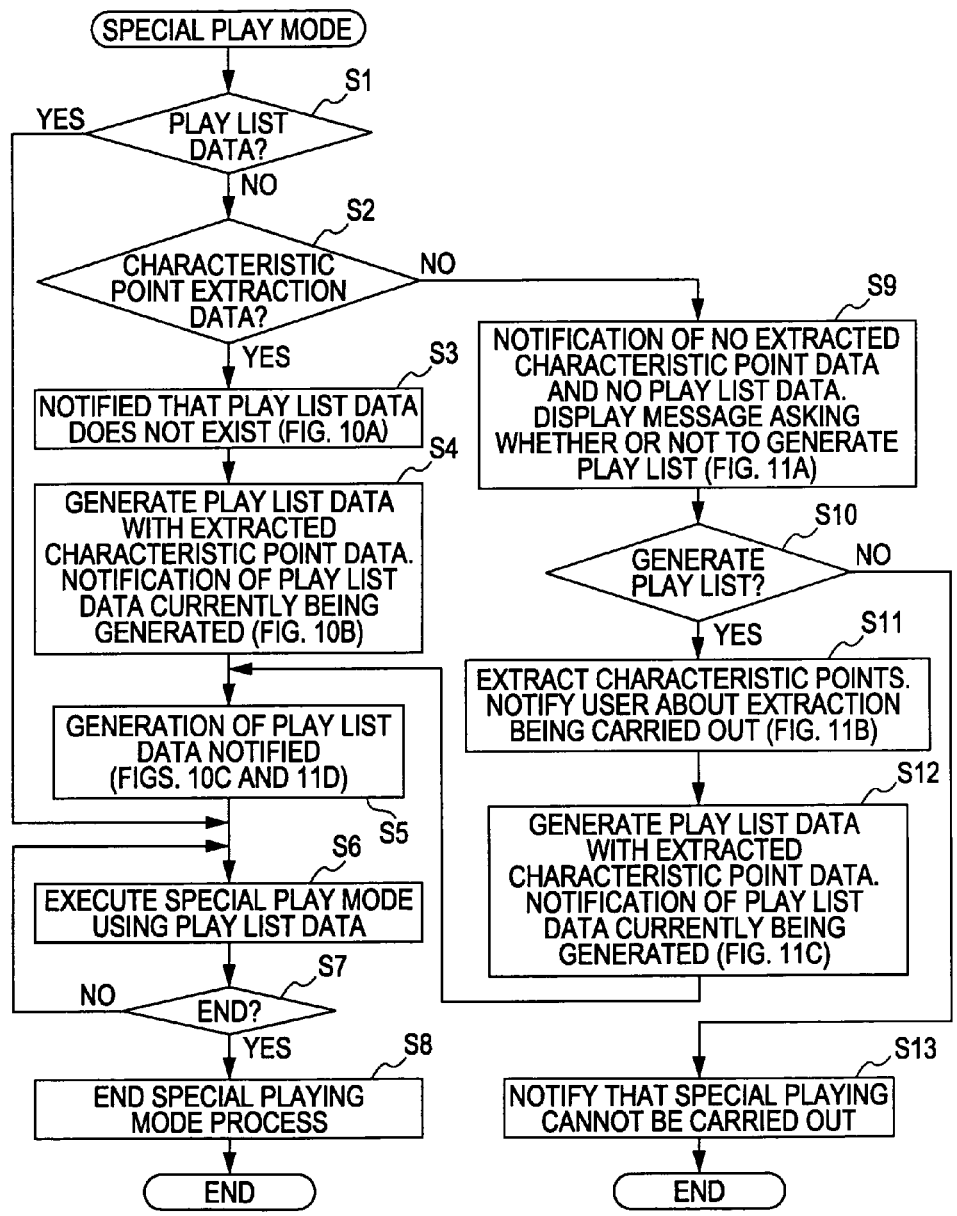
FIG. 9 illustrates a flow chart of the operation process in a special play mode of the recording and reproducing apparatus shown in FIG. 1.

FIG. 9 illustrates a flow chart of the processing carried out by the system controller unit 30 when the user assigns the special play mode. The processing carried out by the system controller unit 30 will be described below with reference to the flow chart.

When the system controller unit 30 determines that one of the special play modes in which play list data is used is assigned by the user by inputting an instruction via the user input interface unit 31, the process shown in FIG. 9 is started in order to determine whether or not an additional data file of the play list data is recorded on the recording medium 7 or 11 to be played (Step S1).

(When Play List Data can be Reproduced)

In Step S1, if it is determined that play list data is recorded on the recording medium (corresponding to combinations a and b in FIG. 8), the system controller unit 30 controls the recording and reproducing apparatus so that the play list data recorded on the recording medium is reproduced in the special play mode (Step S6).

For example, when the user assigns the digest play mode, the system controller unit 30 detects the sections of the characteristic points to be reproduced on the basis of the play list data and controls the recording and reproducing apparatus so that skip play of the sections of the characteristic points is carried out.

In other words, when a start command for the digest play mode is input to the system controller unit 30 via the user input interface unit 31, the system controller unit 30 carries out control for the digest play mode.

Here, since the play list data is recorded as an additional data file on the recording medium 7 or the recording medium 11, the additional data file of the play list data is separated at the memory unit 13 and is supplied to the system controller unit 30.

Upon reception of the additional data file of the play list data, the system controller unit 30 confirms that the play list data is recorded on the recording medium 7 or the recording medium 11.

The start points (skip play start data) and the end points (skip play end data) of the sections to be reproduced are retrieved from the play list data. Then, the system controller unit 30 controls the reproduction control unit 22 to read out the reproduction data from the recording medium 7 or the recording medium 11 in accordance with the retrieved skip play start data and skip play end data. By carrying out skip play, digest play is carried out.

When the user assigns the chapter display mode, the system controller unit 30 determines the positions of the chapter points on the basis of the play list data and displays thumbnails of images corresponding to the chapter points or points near the chapter points.

In other words, when the system controller unit 30 is assigned via the user input interface unit 31 to enter the chapter display mode, the system controller unit 30 carries out control of the digest play mode.

According to the present embodiment, the chapter data is generated at the system controller unit 30 on the basis of the position information (field number) of the start point or near the start point of a predetermined characteristic section represented by the recorded play list data, the end point or near the end point of the predetermined characteristic section, the start point or near the start point of a section other than the characteristic section connected to the predetermined characteristic section, or the end point or near the end point of a section other than the predetermined characteristic section.

Then, on the basis of the generated chapter data, the system controller unit 30 reads out the video data corresponding to the chapter points or the points near the chapter point from the recording medium 7 or the recording medium 11 and decodes the read out video data. Thumbnails are generated from the decoded video data and are displayed on the display unit 34 via the display processing unit 33.

(When Play List Data (Play List Data File) Cannot be Reproduced)

In Step S1, if it is determined that play list data is not recorded on the recording medium (corresponding to combinations c and d in FIG. 8), the system controller unit 30 according to the present embodiment carries out different processing operations depending on whether or not the additional data file of the characteristic point extraction data is recorded on the recording medium 7 or 11.

More specifically, when an additional data file of the characteristic point extraction data is recorded on the recording medium 7 or 11, the system controller unit 30 automatically generates play list data, whereas, when an additional data file of the characteristic point extraction data is not recorded on the recording medium 7 or 11, the system controller unit 30 generates play list data in response to the instruction input by the user and carries out operation in the special play mode.

According to the present embodiment, the play list data is automatically generated when an additional data file of the characteristic point extraction data is recorded on the recording medium 7 or 11 since play list data can be easily and quickly generated when characteristic point extraction data exists. However, instead, even when an additional data file exists, whether or not to generate play list data may be determined in accordance with an instruction received from the user.

According to the present embodiment, play list data is not automatically generated but is generated in accordance with an instruction input by the user because the processing time required for extracting characteristic point extraction data is relatively long since video and audio data must be read out from the recording medium 7 or 11 and then processed. However, so long as the user is notified, the user will not mistakenly determine the recording and reproducing apparatus as being damaged even if the processing time required for generating the play list data is relatively long. In any case, a display indicating the generation of the play list data may be displayed on the screen before automatically generating the play list data.

Accordingly, in Step S1, when the system controller unit 30 determines that play list data is not recorded on the recording medium 7 or 11, first, it is determined whether or not an additional data file of the characteristic point extraction data is recorded on the recording medium 7 or 11 by monitoring the data from the reproduction data separating unit 23 (Step S2).

(When Characteristic Point Extraction Data can be Reproduced)

Figure 10A:
FIG. 10 illustrates examples messages displayed on a display unit in a special play mode of the recording and reproducing apparatus shown in FIG. 1.

In Step S2, if it is determined that characteristic point extraction data is recorded on the recording medium 7 or 11 (corresponding to combination c in FIG. 8), the system controller unit 30 notifies the user that play list data is not recorded by displaying a message, such as that shown in FIG. 10A, on the display screen of the display unit 34 (Step S3).

Figure 10B:

Subsequently, the system controller unit 30 sends a control command to the play list generating unit 14 to generate play list data using the characteristic point extraction data from the reproduction data separating unit 23. At the same time, the user is notified that play list data is being generated through a message, such as that shown in FIG. 10B, displayed on the display screen of the display unit 34 (Step S4).

Figure 10C:

Subsequently, when the system controller unit 30 receives a notice from the play list generating unit 14 that the generation of the play list data has been completed, the user is notified that the play list data has been generated through a message, such as that shown in FIG. 10C, displayed on the display screen of the display unit 34 (Step S5).

Upon reception of the generated play list data, the system controller unit 30 controls the reproduction control unit 22 in accordance with the special play mode selected by the user so as to carry out a predetermined play operation on the basis of the play list data. By controlling the reproduction control unit 22, the data on the recording medium 7 or the recording medium 11 is reproduced to execute the special play mode (Step S6).

When the user assigns the digest play mode, the system controller unit 30 controls the reproduction control unit 22 so that skip play in which predetermined play sections are played in order on the basis of the play list data is carried out in accordance with the predetermined digest play time assigned by the user.

When chapter data is generated, the system controller unit 30 controls the reproduction control unit 22 to carry out predetermined operations related to the chapters, such as displaying thumbnails corresponding to predetermined chapter points indicated in the chapter data, edit processing of cutting and connecting chapter points, and skip play operation for reproducing only the chapter points selected by the user. By controlling the reproduction control unit 22, the reproduction operation of the data stored on the recording medium 7 or 11 and the display operation of the display processing unit 33 are controlled.

The system controller unit 30 determines whether or not the above-described special play mode has been completed or whether or not the user has input an end command for ending the special play mode (Step S7). If the system controller unit 30 determines that the special play mode has been completed or the user has input an end command, the system controller unit 30 carried out a play end process (Step S8). Then, the processing routine of the special play mode is completed.

In Step S7, if it is determined that the special play mode is not completed or the user has not input an end command for ending the special play mode, the process is returned to Step S6, and the operations of the special play mode is continued.

The system controller unit 30 is capable of recording the play list data generated in Step S4 on the recording medium 7 or the recording medium 11. When the play list data is to be recorded on the recording medium 11, the recording is carried out only when the play list data can be recorded as an additional data file.

Moreover, when the generated play list data can be recorded on the recording medium 7 or the recording medium 11, the system controller unit 30 may display a massage on the display unit 34 to allow the user to select whether or not to record the play list data. In such as case, the generated play list data is recorded on the recording medium 7 or 11 only when the user chooses to record the play list data.

(When Characteristic Point Extraction Data Cannot be Reproduced)

Figure 11A:
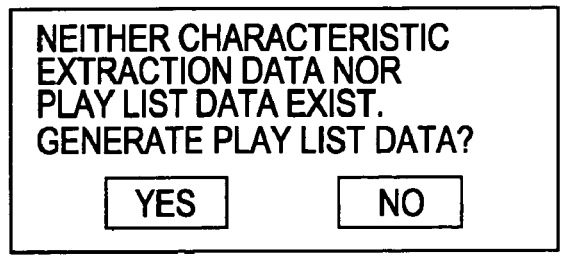
FIG. 11 illustrates examples messages displayed on a display unit in a special play mode of the recording and reproducing apparatus shown in FIG. 1.

In Step S2, if it is determined that the characteristic point extraction data is not recorded on the recording medium 7 or 11 (corresponding to combination d in FIG. 8), the system controller unit 30 notifies the user that play list data and characteristic point extraction data are not recorded through a message, such as that shown in FIG. 11A, displayed on the display screen of the display unit 34. At the same time, a message for asking the user whether or not to generate play list data is displayed (Step S9).

The system controller unit 30 waits for the user to input a response to the displayed message. On the basis of the response from the user, the system controller unit 30 receives whether or not to generate play list data (Step S10). When the user instructs the system controller unit 30 not to generate play list data, the system controller unit 30 displays a message (not shown) on the display unit 34 indicating that the special play mode cannot be executed (Step S13). Then, the processing routine of the special play mode is completed.

Figure 11B:
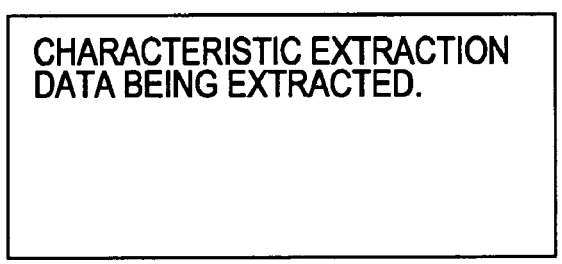

In Step S10, if it is determined that an instruction for generating play list data has been received from the user, the system controller unit 30 controls the reproduction control unit 22 to read out the video and audio data from the recording medium 7 or 11 and commands the characteristic-point extraction unit 10 to extract the characteristic point extraction data from the compressed video data and the compressed audio data from the reproduction data separating unit 23. Then, the system controller unit 30 notifies the user that the characteristic point extraction data is being extracted by displaying a message, such as that shown in FIG. 11B, on the display screen of the display unit 34 (Step S11).

Figure 11C:
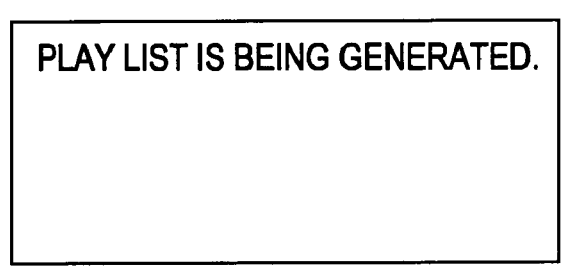
Figure 11D:
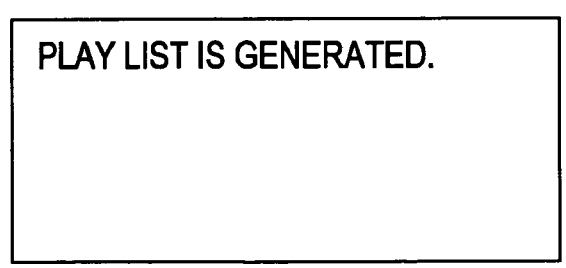

Then, when the system controller unit 30 receives a notification that the extraction of the characteristic point extraction data from the characteristic-point extraction unit 10 has been completed, the system controller unit 30 controls the play list generating unit 14 so that play list data is generated using the characteristic point extraction data stored in the memory unit 13. Then, the system controller unit 30 notifies the user that the play list data is being extracted by displaying a message, such that shown in FIG. 11C, on the display screen of the display unit 34 (Step S12).

Next, when the system controller unit 30 receives a notification that the play list data generation has been completed from the play list generating unit 14, the system controller unit 30 notifies the user that the play list data has been generated through a message, such that shown in FIG. 1D, displayed on the display screen of the display unit 34 (Step S5).

Upon reception of the generated play list data, the system controller unit 30 controls the reproduction control unit 22 in accordance with the special play mode selected by the user so as to carry out a predetermined play operation on the basis of the play list data. By controlling the reproduction control unit 22, the data on the recording medium 7 or the recording medium 11 is reproduced to execute the special play mode (Step S6).

Also in this case, the characteristic point extraction data extracted in Step S10 and the play list data generated in Step S11 can be recorded on the recording medium 7 or the rere-cording medium 11. In case the data is to be recorded on the recording medium 11, the characteristic point extraction data and the play list data are recorded only when they can be recorded as an additional data file.

Moreover, when the generated play list data can be recorded on the recording medium 7 or the recording medium 11, the system controller unit 30 may display a massage on the display unit 34 to allow the user to select whether or not to record the play list data. In such as case, the generated play list data is recorded on the recording medium 7 or 11 only when the user chooses to record the play list data.

In such a case, the video data and the audio data from the reproduction data separating unit 23 are video data and audio data processed according to a band compression method, described above in the description on the recording system. In case the video data from the reproduction data separating unit 23 is specific data, such as DCT coefficients (DC coefficients and AC coefficients) of MPEG. The characteristic-point extraction unit 10 detects characteristic point extraction data in the compressed video and audio data. In case the data from the reproduction data separating unit 23 is audio data, various types of predetermined audio characteristic data, such as audio power, are detected.

As described above, at the characteristic-point extraction unit 10 according to the present embodiment, various characteristic data extraction processes are carried out on the basis of various video specific data and audio data and predetermined parameter data. The characteristic data to be extracted includes predetermined telop characteristics data (telop section determination data), image characteristic data (image characteristic section determination data) such as personal characteristic data, speaking voice characteristic data (speaking voice determination data), clapping and cheering sound characteristic data (clapping and cheering sound determination data), and other audio characteristic data (audio characteristic section determination data). The extracted image characteristic extraction data (image characteristic data) and the audio characteristic extraction data (audio characteristic data) are input to the system controller unit 30.

The system controller unit 30 determines that the characteristic point extraction process has been completed when the broadcasting of the television program being recorded is completed or when the predetermined characteristic point extraction process carried out by the characteristic-point extraction unit 10 is completed for all of the predetermined video and audio sections.

When the characteristic point extraction process is completed, a message signal indicating the completion of the characteristic point extraction process may be sent from the system controller unit 30 to the display unit 34 via the display processing unit 33 so as to display a message indicating the completion of the process on the display screen of the display unit 34.

Next, a process for generating play list data and/or chapter data form characteristic point extraction data will be described.

The various sets of characteristic point extraction data for each predetermined characteristic point extraction section are stored in the memory unit 13. When the processing for all sets of predetermined characteristic data is completed, the data is input to the play list generating unit 14 to generate play list data and/or characteristic point extraction data.

The characteristic point extraction data may be directly input in series from the characteristic-point extraction unit 10 to the play list generating unit 14. However, instead, after the characteristic point extraction process of the recorded television program is completed, as described above, play list data and/or characteristic point extraction data may be generated at the play list generating unit 14 on the basis of a predetermined signal from the system controller unit 30.

The characteristic point extraction data from the characteristic-point extraction unit 10 may be input to the play list generating unit 14 via the system controller unit 30.

When play list data and/or characteristic point extraction data is generated at the play list generating unit 14, a signal indicating that the play list generation process has been completed is input to the system controller unit 30. In response to the input, for example, digest play corresponding to a predetermined digest time or chapter-related operations using predetermined chapter data may be carried out.

As described above, a predetermined message indicating that the play list data and/or the characteristic point extraction data have been generated or a predetermined message indicating that the operation is in the digest play mode or a predetermined operation mode related to the chapters may be displayed on the display unit 34.

For the user to instruct the apparatus to carry out digest play, several play list data sets corresponding to different digest play times may be generated in advance according to the lengths of the sections obtained by carrying out characteristic extraction on the video and audio data of the recorded television program. In this way, the digest play time can be set even when the digest play time desired by the user, i.e., 20 minutes or 30 minutes, is unknown.

For example, if the total recording time of a television program from which characteristic points are to be extracted is one hour, play list data sets for carrying out digest play in 40, 30, or 20 minutes may be generated. By generating such play list data sets, digest play operation corresponding to the selected digest play time can be immediately carried out when the user selects the digest play time via the remote commander 32.

[Copying Data on Recording Medium 7 onto Recording Medium 11 and Vice Versa]

The recording and reproducing apparatus according to the this embodiment is capable of copying the video and audio data and the additional data file (if recorded) on the recording medium 7 onto the recording medium 11 and copying the video and audio data and the additional data file (if recorded) on the recording medium 11 onto the recording medium 7.

More specifically, when the user inputs a command for copying the data on the recording medium 7 onto the recording medium 11 via the user input interface unit 31, the reproduction control unit 22 reads out video and audio data from the recording medium 7 and supplies the data to the play unit 21 under the control of the system controller unit 30. When an additional data file is also recorded on the recording medium 7, the reproduction control unit 22 reads out the additional data file and sends the file to the reproduction control unit 22. The reproduction control unit 22 sends the video and audio data and the data of the additional data file to the recording processing unit 6 under the control of the system controller unit 30.

The recording processing unit 6 sends the data from the play control unit 22 to the recording medium 11 via the recording medium processing unit 12 under the control of the system controller unit 30 to copy the data on the recording medium 7 onto the recording medium 11.

When the user inputs a command for copying the video and audio data and the data of the additional data file recorded on the recording medium 11 onto the recording medium 7 to the system controller unit 30 via the user input interface unit 31, the data is copied in a similar manner as described above.

[Characteristic-Point Extraction Unit 10]

As described above, the specific-condition-section detection unit 101 according to the present embodiment receives the audio and video data on which band compression processing has been carried out. Then, silent sections and black sections are detected in the data as specific condition sections.

Here, a process of detecting a black section in a video signal will be described in detail as an example of a process of detecting a specific condition section.

In the recoding process according to this example, a DC coefficient obtained as a result of carrying out discrete cosine transformation (DCT) on a brightness signal Y and color-difference signals Cb and Cr in a MPEG compression process is sent from the video encoding unit 9 to the characteristic-point extraction unit 10 for signal processing.

In the reproduction process, a DC coefficient obtained as a result of carrying out DCT on the brightness signal Y and the color-difference signals Cb and Cr compressed according to the MPEG system from the reproduction data separating unit 23 of the reproduction decode output unit 20 to the characteristic-point extraction unit 10 for signal processing.

Figure 12:
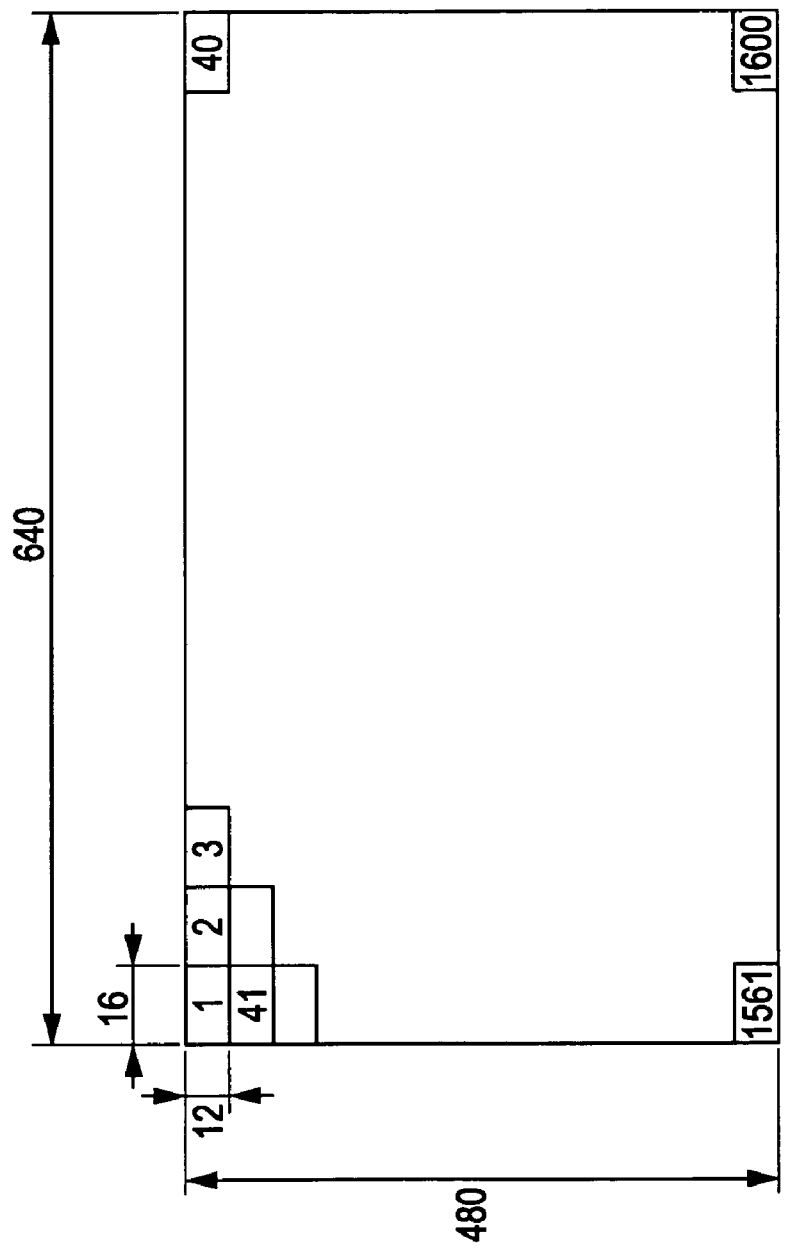
FIG. 12 illustrates a generation process of data for characteristic extraction.

In this example, as shown in FIG. 12, when a video signal corresponding to one screen (i.e., one field or one frame) is displayed, the size of the efficient area of the screen can be presumed to be 640 pixels by 480 pixels in the horizontal direction and vertical direction, respectively. The 640×480 pixel effective area of the screen is divided into processing unit blocks (hereinafter simply referred to as "blocks") having a size of 16 pixels by 12 pixels in the horizontal direction and vertical direction, respectively.

In the example screen shown in FIG. 12, the number of blocks in the horizontal direction of the example screen is:

$$640/16=40 \text{ (blocks)} \quad (1)$$

and the number of blocks in the vertical direction is:

$$480/12=40 \text{ (blocks)} \quad (2)$$

Therefore, the total number of blocks in the effective area of screen is:

$$40\times40=160 \text{ (blocks)} \quad (3)$$

Figure 13:
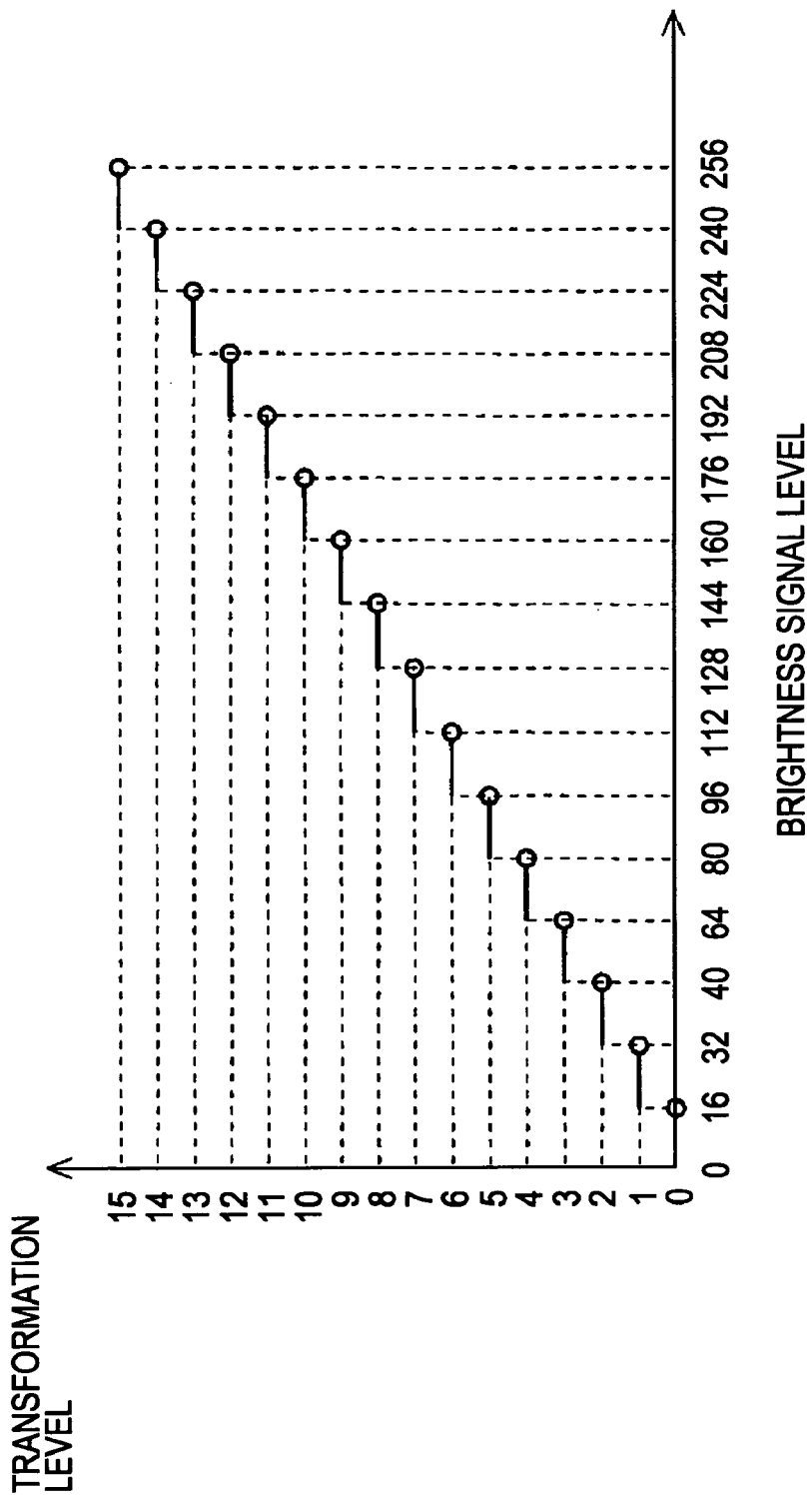
FIG. 13 illustrates a generation process of data for characteristic extraction.

Next, the brightness signal level of each block in FIG. 12 is considered. Here, the value of the brightness signal level (i.e., the DC coefficient of the DCT for the brightness signal) is in the range of 0 to 255. According to the non-linear transformation characteristic, as shown in FIG. 13, the value of the average brightness signal level of each block is transformed into a transformation level r(n) (where r(n) is in the range of 0 to 15).

Here, the transformation level is a data transformation value obtained by a non-linear transformation process corresponding to the range in which the average brightness signal level is included. For example, if the brightness signal level $Y_{lev}$ is in the range, $$0 \leq Y_{lev} < 16 \quad (4)$$

the transformation level of the corresponding block is zero, and if the brightness signal level $Y_{lev}$ is in the range, $$16 \leq Y_{lev} < 32 \quad (5)$$

the transformation level of the corresponding block is one. If the $Y_{lev}$ is some other value, the average brightness signal level of the blocks is transformed into a transformation level corresponding the value in accordance with the non-linear transformation characteristic shown in FIG. 13.

Next, for the effective area of a screen, a histogram representing the number of blocks per transformation level is generated, wherein each block is sorted according to its average brightness signal level that corresponds to a specific transformation level. For example, the histogram shown in FIG. 14 represents the effective area of a screen including predetermined numbers of blocks corresponding to only the transformation levels 0, 1, and 2 and not including blocks corresponding to the other transformation levels.

Figure 14:
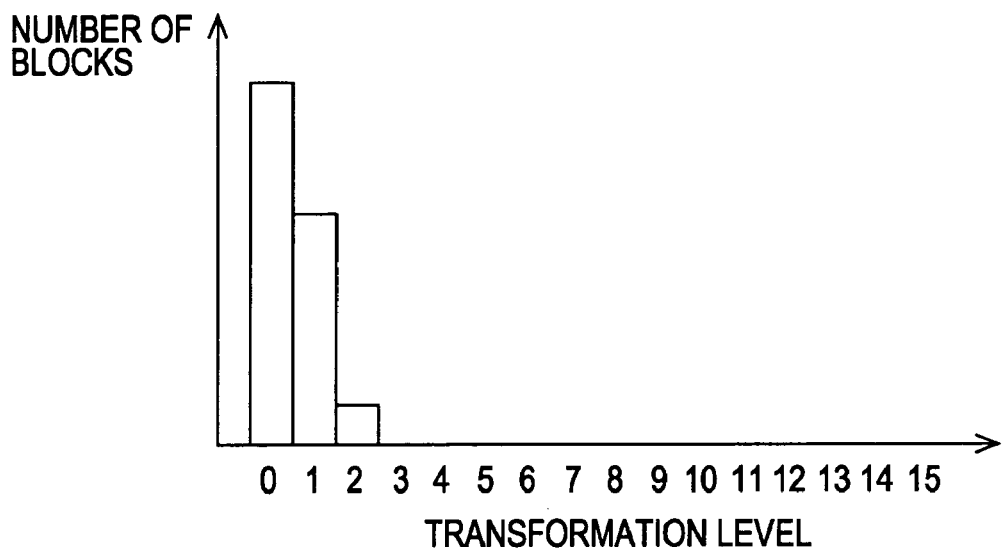
FIG. 14 illustrates a generation process of data for characteristic extraction.

As shown in the histogram in FIG. 14, the effective area of a screen includes blocks corresponding to the transformation levels 0 to 2 but does not include any blocks corresponding to the other transformation levels 3 to 15. Therefore, the screen can be determined as a dark screen. In a black section of a video signal, the screen is dark because the brightness level is low. Accordingly, as shown in FIG. 14, in the histogram representing the effective area of a screen in a black section, most of the blocks correspond to smaller transformation levels. Consequently, it is possible to determine whether or not a screen corresponds to a black section on the basis of the number of blocks corresponds to each transformation level in a histogram representing the effective area of a screen.

(Histogram for Color-Difference Signal)

For the color-difference signals Cb and Cr, similar to the brightness signal Y, a screen division process, such as that described with reference to FIG. 12, and a level transformation process, such as that described with reference to FIG. 13, may be carried out to obtain a histogram representing the number of blocks per transformation level.

Figure 15:
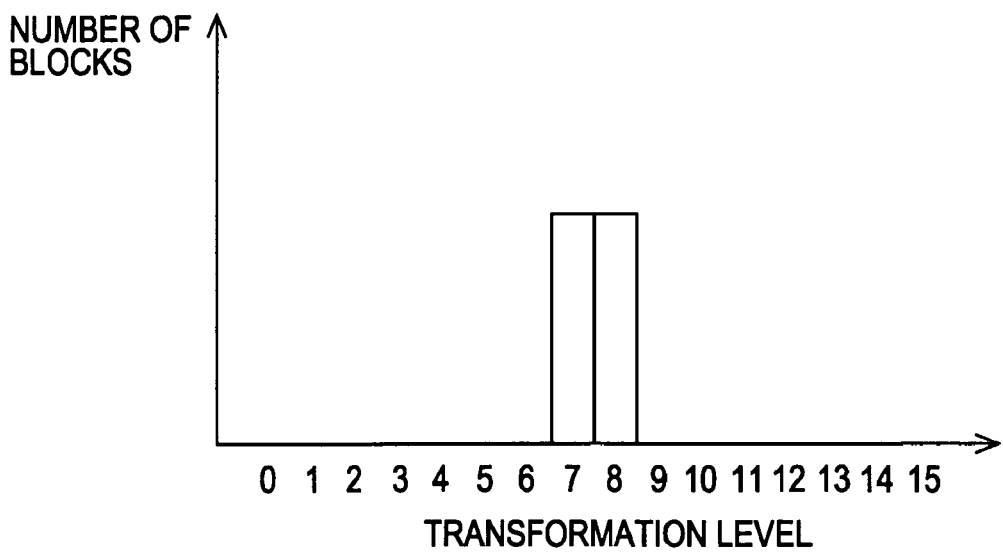
FIG. 15 illustrates a generation process of data for characteristic extraction.

However, in a histogram representing the color-difference signals Cb and Cr in a black section, the blocks will not correspond to smaller transformation levels, as shown in FIG. 14. Instead, as shown in FIG. 15, a histogram representing the color-difference signals Cb and Cr in a black section will include similar numbers of blocks corresponding to predetermined transformation levels adjacent to each other (e.g., transformation levels 7 and 8 in FIG. 15).

In the actual signal processing, the following expression may be set as a condition for detecting a black section:

$$|H_{cb}[7] - H_{cb}[8]| < T_{hcb} \quad (6)$$

where $H_{cb}[7]$ and $H_{cb}[8]$ represent the numbers of blocks corresponding to the transformation levels 7 and 8, respectively, of the color-difference signal Cb and $T_{hcb}$ represents a predetermined threshold value.

Similarly, the following expression may be set as a condition for detecting a black section:

$$|H_{cr}[7] - H_{cr}[8]| < T_{hcr} \quad (7)$$

where $H_{cr}[7]$ and $H_{cr}[8]$ represent the numbers of blocks corresponding to the transformation levels 7 and 8, respectively, of the color-difference signal Cr and $T_{hcr}$ represents a predetermined threshold value.

One of expressions 6 and 7 may be used for detecting a black section, or both of expressions 6 and 7 may be used for detecting a black section.

The expressions 6 and 7 may be integrated and used as a condition for detecting a black section:

$$|H_{cb}[7] - H_{cb}[8]| + |H_{cr}[7] - H_{cr}[8]| < T_{hc} \quad (8)$$

where $T_{hc}$ represents a predetermined threshold value.

(Relationship of Brightness Signal to Histogram)

Next, the relationship of the above-described histogram data corresponding to a brightness signal and a black signal level of the specific condition section to be detected will be described.

Figure 16:
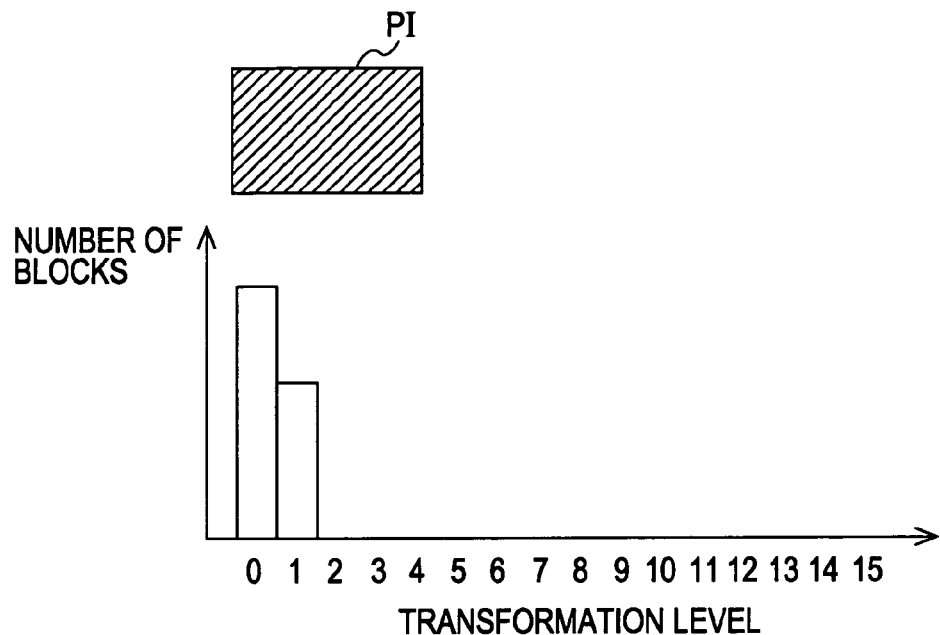
FIG. 16 illustrates a generation process of data for characteristic extraction.
Figure 17:
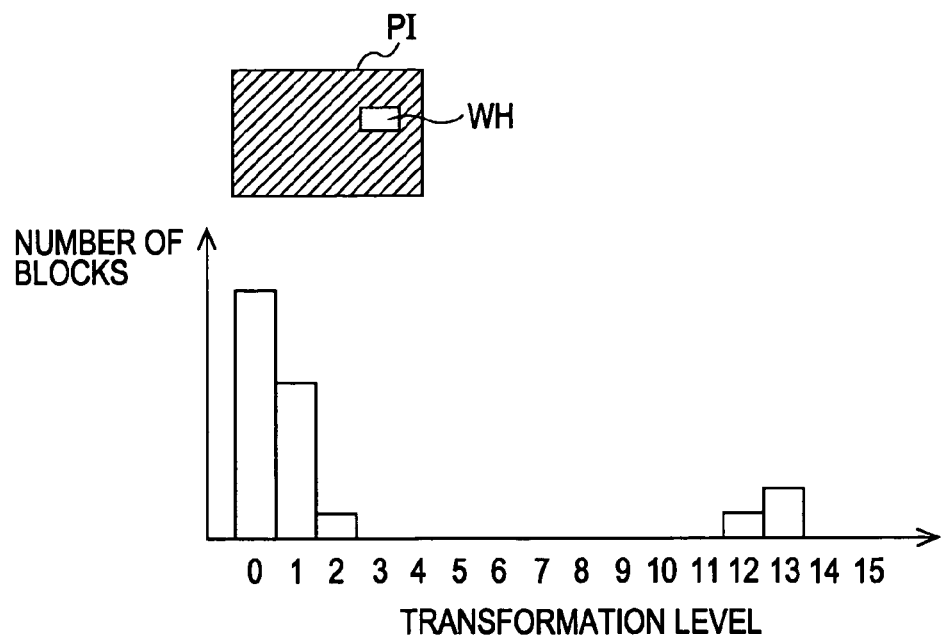
FIG. 17 illustrates a generation process of data for characteristic extraction.

FIG. 16 illustrates a histogram representing a screen PI that is entirely black. In this a case, as described above, the blocks correspond to smaller transformation levels. However, a black section cannot be accurately detected by only focusing at the blocks corresponding to smaller transformation levels. As shown in FIG. 17, if the black screen includes a bright area (area WH in FIG. 17), the blocks will correspond to both smaller transformation levels and higher transformation levels. A screen represented by the histogram having a distribution of blocks as shown in FIG. 17 should not be detected as corresponding to a black section.

Accordingly, in some cases, the process may lead to false detection of a black section in a video signal, unless the detection result is based on both smaller transformation levels and higher transformation levels.

For example, the histogram shown in FIG. 16 includes blocks corresponding to transformation levels 0 to 2 but does not include blocks corresponding to transformation levels 3 to 15. On the other hand, the histogram shown FIG. 17 blocks corresponding to the smaller transformation levels 0 to 3 and also include blocks corresponding to the larger transformation levels 12 and 13.

According to the present embodiment, the transformation levels are searched from the highest value (15 in this example) toward the lowest value (0 in this example) to determine the number of consecutive transformation levels that do not correspond to any blocks. The greater the number of consecutive transformation levels is, the more biased the distribution of the blocks is and the more accurate the detection of a black section will be. If all of the transformation levels do not correspond to any blocks, it is determined that a signal has not been received, and the corresponding section is not determined as a black section.

Figure 18:
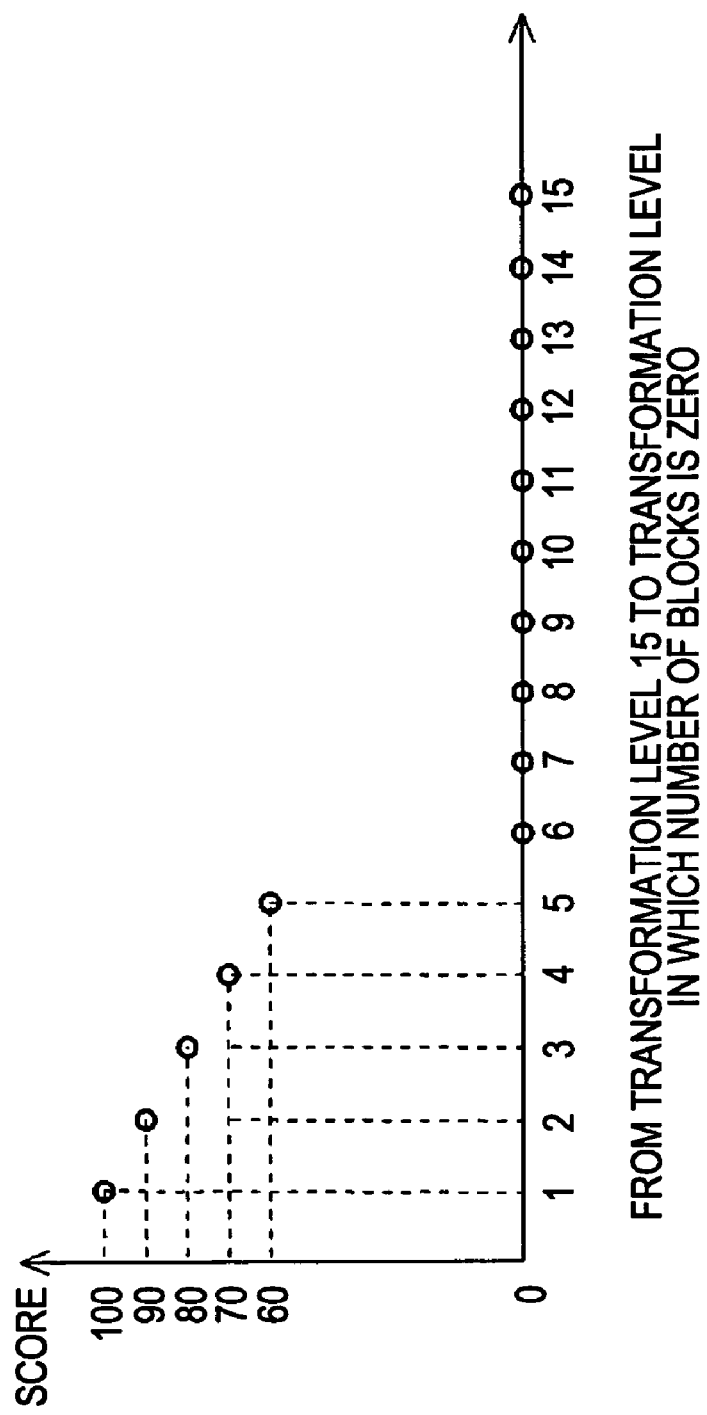
FIG. 18 illustrates a generation process of data for characteristic extraction.

To quantify this characteristic, in the present embodiment, the transformation level data of the histogram is transformed into predetermined scores, as shown in FIG. 18. In FIG. 18, the horizontal axis represents the last transformation level that corresponds to zero blocks when the transformation levels are searched from the highest value 15 toward the transformation value 1. In FIG. 18, the vertical axis represents the score values. In the example shown in FIG. 18, the scores range from 0 points to 100 points. Accordingly, the larger the score is, the darker the screen is.

According to the above-described case shown in FIG. 14, since the transformation levels 15 to 3 correspond to zero blocks, the score of screen corresponding to FIG. 14 is 80 points according to FIG. 18. According to the above-described case shown in FIG. 16, since the transformation levels 15 to 2 correspond to zero blocks, the score of screen corresponding to FIG. 16 is 90 points according to FIG. 18. According to the above-described case shown in FIG. 17, since only the transformation levels 15 and 14 correspond to zero blocks, the score of screen corresponding to FIG. 17 is 0 points according to FIG. 18.

Accordingly, in the present embodiment, score data corresponding to the brightness signal Y of an effective area of a screen is generated on the basis of the transformation characteristic shown in FIG. 18 obtained on the basis of the numbers of blocks corresponding to the transformation levels represented in a histogram.

A black section can be detected on the basis of the condition represented the following expression:

$$S_b > T_{hb} \quad (9)$$

(or $S_b \geq T_{hb}$, depending on the determination method), where $T_{hb}$ represents a threshold value corresponding to the reference level value for comparison used to detect a black section and $S_b$ represents a score value.

In the process of detecting a black section carried out by the specific condition section detection unit 101, only the data on the numbers of blocks corresponding to the transformation levels represented by a histogram for the brightness signal Y may be used or, only the data on the numbers of blocks corresponding to the transformation levels represented by a histogram for the color-difference signals Cb and Cr may be used may. Furthermore, the results from of the above processes using both the data on the brightness signal Y and the data on the color-difference signals Cb and Cr may be used to detect a black section.

According to the present embodiment, the results from of the above processes using both the data on the brightness signal Y and the data on the color-difference signals Cb and Cr is used to detect a black section. In such a case the expressions, 6, 7, and 9 are integrated or the expressions 8 and 9 are integrated to detect a black section.

A black section in a CM section can be detected even more accurately by referring to a silent section, as described above with reference to FIG. 7, that is included in a predetermined section in respect with the position of the black section detected as described above.

In the above-described process using a histogram, the number of blocks into which the screen is divided is not limited to the above-mentioned number of blocks and may be a greater or smaller number.

According to the descriptions above, the average levels of the brightness signal Y and the color-difference signals Cb and Cr for each block are detected and then used for the process using the histogram. However, instead, the process using the histogram may be carried out on all of the pixels in each block, without determining the average levels of the signals.

In such a case, for example, the levels of the brightness signal Y and the color-difference signals Cb and Cr may be added for all pixels in a block. Then, the above-described level transformation can be carried out on the data obtained by the addition so as to obtain data in the process using the histogram.

In the case shown in FIG. 13, since the histogram corresponds to the average values of the brightness signal Y, the range of data is 0 to 255. However, when pixel data is directly used instead of the average values, the range of data is 0 to 256×(number of pixels in a block)−1.

For example, if the transformation levels in the histogram are 0 to 15 and the number of pixels in one block is 16×12=192, the range of data is 0 to 49,151. Accordingly, the width of the data value of each transformation level is 49,151/16=3,072.

When the input data values are applied to the non-linear transformation characteristic such as that shown in FIG. 13, the input data values 0 to 3,071 are transformed into a transformation level 0, the input data values 3,072 to 6,143 are transformed into a transformation level 1, and so on. If these ranges are fit to the scale of the horizontal axis of FIG. 13, a non-linear transformation characteristic similar to that shown in FIG. 13 will be obtained.

[Detecting Black Sections More Accurately]

As described above with reference to FIG. 40, the brightness signal, the color-difference signals, and the audio signal included in the actual television signal of a television program are not constant in the CM sections, and the black sections and the silent sections near the CM sections. Moreover, noise signals are included in the actual television signals. As a result, the actual signals (1) to (5) will have various waveforms, as shown in FIG. 40.

The present embodiment provides a detection method that can be used for each of the signals 1 to 5 in FIG. 40. In other words, the present embodiment provides a signal processing method for detecting black sections. According to this method, for the signals 1 and 4, which are normal signal not including noise, if the level of the section is greater than the threshold value, the section is determined to be a black section. For the signal 2, which has a fluctuating waveform, the section in which the influence of noise can be neglected is determined to be a black section. For the signal (5), which has a step-like waveform, the section having a level that is closer to the black level is determined to be a black section.

First, the distribution of black sections at the start points and end points of CM sections in television programs broadcast in the United States will be described.

Figure 19:
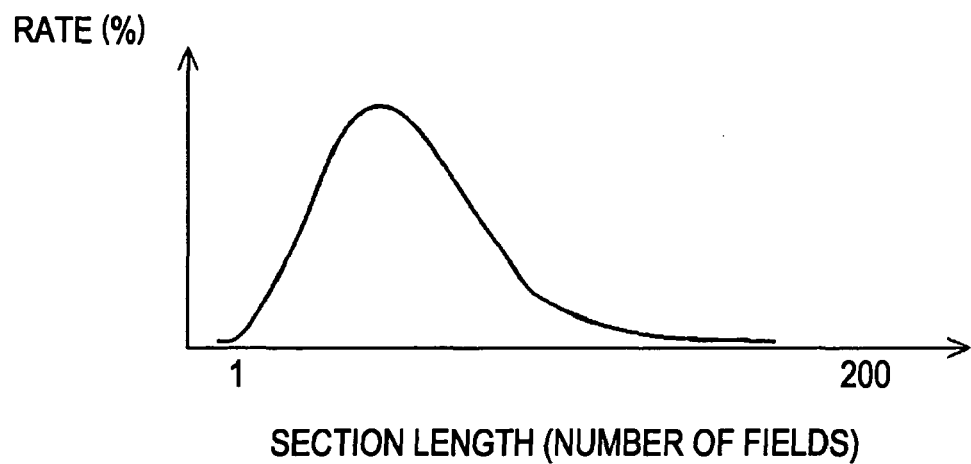
FIG. 19 illustrates characteristics of black sections in CM sections.

Several television programs actually broadcast in the United States were viewed, and their television signals were analyzed. As a result, the lengths of the black sections were in a range of about 1 to 200 fields, and the lengths of the black sections were distributed as shown in FIG. 19.

Figure 20:
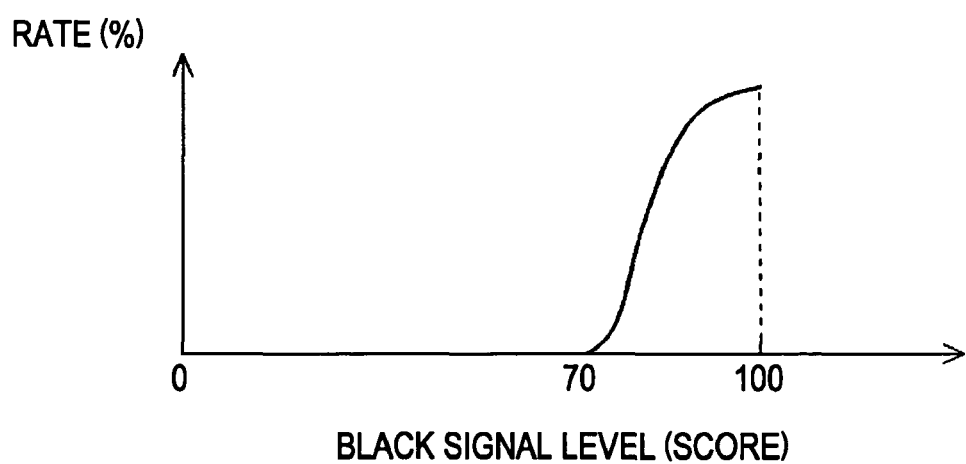
FIG. 20 illustrates characteristics of black sections in CM sections.

When the brightness signal level of the image was transformed, as described above, into scores in the range of 0 to 100, as shown in FIG. 18, to determine the distribution of the black sections in CM sections, the scores distribution of the black sections in CM sections were more or less in the range of 70 to 100 points, as shown in FIG. 20.

According to the distribution characteristic shown in FIG. 20, the minimum threshold value $T_{hmin}$ of the threshold value $T_{hb}$ corresponding to the reference level for comparison used for detecting black sections by applying the expression 9 may be set to $T_{hmin}=70$.

Here, the waveforms of signals corresponding to the black sections, as shown in FIG. 40, will be taken into consideration again. For the waveforms of signals 1 to 5 in FIG. 40, when the score $S_b$ of a section is greater than a predetermined threshold value $T_h$, the section is determined to be a black section. Accordingly, for the signal 1, which does not include noise, the section corresponding to positions f1 to f2 is determined as a black section.

The signal 2 includes noise and fluctuates near the threshold value $T_h$. In this case, the section corresponding to positions f3 to f4 is determined as a black section.

The signal 3 has a short black section whose level exceeds the threshold value $T_h$ in only one to several fields. In this case, the section corresponding to positions f5 to f6 is determined as a black section.

The signal 4 is similar to the signal 1, in which the section corresponding to positions f7 to f8 whose level exceeds the threshold value $T_h$ is determined as a black section.

The signal 5 has a step-like waveform. In this case, the section corresponding to positions f9 to f11 whose level exceeds the threshold value $T_h$ may be determined as a black section, or, otherwise, the section corresponding to positions f9 to f10 whose level is closer to the black level than the level of the section corresponding to positions f10 to f11 may be determined as a black section. For example, if the section corresponding to positions f10 to f11 of the signal 5 is closer to the minimum threshold value $T_{hmin}$, it is more desirable to determine the section corresponding to positions f9 to f11 as a black section rather than determining the section corresponding to positions f9 to f10 as a black section.

Accordingly, the present embodiment provides a method of detecting black sections capable of detecting black sections in any of the signals 1 to 5.

[Multi-Step Method of Determining Specific Condition Section]

According to this embodiment, to improve the accuracy of the detection of specific condition sections, the specific condition sections are detected and determined through multiple steps including a first step of a section detection process and a second step of the section detection process. Hereinafter, the first step is referred to as a "first detection process," the section detected in the first step is referred to as a "first detection section," the second step is referred to as a "second detection process," and the section detected in the second step is referred to as a "second detection section."

According to the present embodiment, first, the first detection process is carried out. Then, after completing the first detection process, the second detection process is carried out. The second detection section obtained in the second detection process is detected to be a specific condition section.

In the first detection process, a section whose a score $S_b$ is greater than the threshold value $T_{hb}$ is determined as a black section, on the basis of the expression 9. In this case, the threshold value $T_{hb}$ is the above-identified minimum threshold value $T_{hmin}$.

In the second detection process, the maximum value $B_{kmax}$ of the black level is detected within the first detection section obtained in the first detection process. Then, level detection (level search) is carried out along the first detection section from the start point and from the end point of the first detection section. In this way, two positions (fields or frame positions) having levels that are the same as the maximum value $B_{kmax}$ are detected. The section between the two positions is determined as the second detection section.

FIG. 21 illustrates a method of detecting a specific condition section by using such a two-step detection method. Below, the two-step detection method according to this embodiment will be described below with reference to FIG. 21.

(First Detection Process for Detecting First Detection Section)

In the first detection process, on the basis of the condition represented by the expression 9, a black section in which the scores $S_b$ of the corresponding fields or frames (hereinafter, "fields or frames" will be simply referred to as "field") are greater than the minimum threshold value $T_{hmin}$ is detected as a first detection section. After completing the first detection process, the second detection process is started.

FIG. 22 illustrates an example flow chart for the first detection process. In the first detection process, data of a field of the video image to be processed is obtained (Step S21), the score $S_b$ of the obtained data is determined (Step S22), and the score $S_b$ and the minimum threshold value $T_{hmin}$ are compared to determine whether the score $S_b$ is greater than the $T_{hmin}$ (Step S23).

If the score $S_b$ is greater than the $T_{hmin}$, the field is determined as being a field included in the first detection section. This detection result is output, and the field number and the score $S_b$ of the field are stored to be used in the second detection process (Step S24).

Then, the maximum value (maximum score value) $B_{kmax}$ of the black level within the first detection section is detected. More specifically, for the first detection section detected in Step S24, the current maximum value $B_{kmax}$ of the black level and the score value obtained in Step S22 are compared. When it is determined that the score value is greater, the maximum value $B_{kmax}$ is replaced with the score value (Step S25).

After Step S25, it is determined whether or not the detection process of a specific condition section to be ended because of completion of the recording or reproduction process (Step S26). If it is determined that the detection process is to be ended, the first detection process is completed. If it is determined that the detection process is not to be ended, the next field number is obtained (Step S27). Then, the first detection process is returned to Step S21 to repeat the subsequent steps, as described above.

If, in Step S23, the score $S_b$ is determined to be smaller than the minimum threshold value $T_{hmin}$, the field is not included in the first detection section. Therefore, whether or not the previous field is included in the first detection section is determined (Step S28). If the previous field is determined not to be included in the first detection section, the process proceeds to Step S26. If the previous field is determined to be included in the first detection section, it is determined that the first detection process is completed, and the second detection process is started (Step S29). Then, the process proceeds to Step S26, and the subsequent steps are carried out.

In the above-described first detection process for detecting a first detection section, first, as shown in FIG. 21, the first field position $f_{st}$ having a level value exceeding the minimum threshold value $T_{hmin}$ of the black level is detected, and the start point of the first detection section is detected. The fields subsequent to the start point are detected within the first detection section. Then, subsequent to the field position $f_{st}$, the first field position $f_{ed}$ whose level is smaller than the minimum threshold value $T_{hmin}$ is detected. In this way, a section corresponding to the first detection section is detected between the field position $f_{st}$ to the field position $f_{ed}$.

As described above, the process of detecting the first detection section is carried out as the signal level is determining whether it is smaller or greater than the minimum threshold value $T_{hmin}$. Therefore, the maximum level $B_{kmax}$ in the first detected can be detected at the same time.

(Second Detection Process for Detecting Second Detection Section)

In the second detection section, first, the maximum value $B_{kmax}$ of the black level within the first detection section is detected. Then, the score values of the fields are searched from the start point and from end point of the first detection section. Two fields positions having levels that are the same as the maximum value $B_{kmax}$ are detected. The section between the two field positions is determined as the second detection section.

FIG. 23 illustrates an example flow chart of the second detection process. First, in the second detection process, the maximum value $B_{kmax}$ of the black level within the first detection section that has been detected in the first detection process is recognized (Step S31).

Subsequently, the score values of the fields in the first detection section are searched from the start point of the first detection section, i.e., from the field position $f_{st}$ toward the field position $f_{ed}$ (direction a in FIG. 21), to detect a field position $f_{stm}$ that first reaches the maximum value $B_{kmax}$ of the black level (Step S32).

Subsequently, the score values of the fields in the first detection section are searched from the end point of the first detection section, i.e., from the field position $f_{ed}$ toward the field position $f_{st}$ (direction b in FIG. 21), to detect a field position $f_{edm}$ that first reaches the maximum value $B_{kmax}$ of the black level (Step S33).

The section from the field position $f_{stm}$ detected in Step S32 to the field position $f_{edm}$ detected in Step S33 is determined as the second detection section (Step S34). Then, the second detection process is completed.

In other words, the first detection section $f_{st}$ to $f_{ed}$ detected as described above is a preliminary detection section, and the second detection section $f_{stm}$ to $f_{edm}$ is a true detection section.

As described above, in the second detection section, the second detection section is determined by detecting the field positions $f_{stm}$ and $f_{edm}$ whose level is the same as the maximum value $B_{kmax}$ of the black level. However, instead of the maximum value $B_{kmax}$, a predetermined level value $B_{ktmp}$, as shown in FIG. 21, in between the maximum value $B_{kmax}$ and the minimum value $B_{kmin}$ may be used.

In such a case, as shown in FIG. 21, the field positions $f_a$ and $f_b$ whose level is the same as the predetermined level value $B_{ktmp}$ are detected from directions a and b, respectively. The section from the field position $f_a$ to the field position $f_b$ is determined as the second detection section.

In this case, the closer the predetermined level value $B_{ktmp}$ is to the maximum value $B_{kmax}$, the smaller the length of the second detection section. Furthermore, when the predetermined level value $B_{ktmp}$ is set to a value greater the maximum value $B_{kmax}$ by one, the detection results of the first detection section and the second section are substantially the same.

[Signal Processing Method for Reducing Influence of Noise]

As shown in FIG. 24A, a case in which an input signal sent to the characteristic-point extraction unit 10 includes noise, in a similar manner as that in the signal 2 shown in FIG. 40 will be described. The input signal corresponds to a plurality of fields of the above-mentioned score value. In the case of the signal shown in FIG. 24A the first detection process is carried out to determining a black section by detection a section whose score $S_b$ is greater than the minimum threshold value $T_{hmin}$.

As shown in FIG. 24A, a plurality of points corresponding to points where the signal level intersects with the level of the minimum threshold value $T_{hmin}$ exists between the field positions f3 to f4 of the input signal. Therefore, three sections corresponding to field positions f3 to fa, field positions fb to fc, and field positions fd to f4 are each detected as a black section.

Since a black section corresponding to a CM section is to be detected, the distribution characteristic of lengths of black sections related to CM sections, as shown in FIG. 19, and the distribution of the lengths CM sections are taken into consideration. It is desirable to not detect the sections fa to fb and fc to fd, as shown in FIG. 24A, as black sections if the sections are short. It is desirable to detect only the section corresponding to field positions f3 to f4 as the first detection section.

According to the present embodiment, in the section corresponding to field positions f3 to f4 that is desirably detected as the first detection section, the sections fa to fb and fc to fd are presumed to originally have had signal levels greater than the minimum threshold value $T_{hmin}$ (i.e., sections fa to fb and fc to fd are presumed to have levels smaller than the minimum threshold value $T_{hmin}$ due to noise). Therefore, the signals in to the sections fa to fb and fc to fd are corrected.

FIG. 24B illustrates the signal correction processing. As shown in FIG. 24B, the data values of the sections fa to fb and fc to fd are presumed to have data values that are smaller than the minimum threshold value $T_{hmin}$ due to noise. For example, a data value d(f) may be added to the sections fa to fb and fc to fd, or the data values of the sections fa to fb and fc to fd may be replaced with other data values. In this way, the data values of the sections fa to fb and fc to fd are corrected so that they are greater than the minimum threshold value $T_{hmin}$. As a result, sections fa to fb and fc to fd are not detected as the first detection section.

However, the data values of the sections fa to fb and fc to fd are corrected to a values smaller than the maximum value $B_{kmax}$ of the black level within the section corresponding to field positions f3 to f4 that is detected as the first detection section. Otherwise, the second detection section will not be accurately detected in the second detection process.

When correcting the data values of the sections fa to fb and fc to fd to values greater then the minimum threshold value $T_{hmin}$, for example, it should be acceptable so long as the data values of the sections fa to fb and fc to fd are greater than the minimum threshold value $T_{hmin}$ by at least one.

For example, if, after correction, the maximum value $B_{kmax}$ satisfies the following equation, $$B_{kmax} = T_{hmin} + 1$$

in the section f3 to f4 that has been detected as the first detection section, the section f3 to f4 can be accurately detected as the second detection section in the second detection process if all of the data values that are smaller than the minimum threshold value $T_{hmin}$ of the sections fa to fb and fc to fd, as shown in FIG. 24A, are corrected to $T_{hmin}+1$ in the above-described correction process. In this case, the first detected area and the second detected area both correspond to the section f3 to f4.

Accordingly, in the present embodiment, all of the data values that are smaller than the minimum threshold value $T_{hmin}$ are replaced by $T_{hmin}+1$ in a manner such in the sections fa to fb and fc to fd, as shown in FIG. 24A.

The method of correcting the data values is not limited to the above-described replacement method. Instead, as also mentioned above, a predetermined data value may be added to obtain a value that is greater than the minimum threshold value $T_{hmin}$ but smaller than the maximum value $B_{kmax}$.

According to the above-described correction process, even if sections of the signal fluctuates in the opposite direction of the predetermined signal level due to noise, as in FIGS. 24A and 40B, the levels of all sections in the signal will be greater than the reference level for comparison so long as the length of the section affected by noise is smaller than a predetermined length. Therefore, by simply comparing the level of the data signal and a reference level, the characteristic section in which the data signal continues to have a level closer to the predetermined signal level than the reference level without being affected by the signal section affected by noise can be detected.

[First Structure of Characteristic-Point Extraction Unit 10]

As described above, the characteristic-point extraction unit 10 includes the specific condition section detection unit 101 and the characteristic point extraction unit 102. With the control and support of the system controller unit 30, the characteristic-point extraction unit 10 detects silent sections and black sections. The specific condition section detection unit 101 corresponds to the specific condition section detection apparatus according to an embodiment of the present invention.

The specific condition section detection unit 101 includes an audio characteristic signal processing unit 40, a silent section detection and determination unit 41, and a threshold value setting unit 46. The specific condition section detection unit 101 also includes a brightness characteristic signal processing unit 42, a color-difference characteristic signal processing unit 43, a noise correction processing unit 44, a black section detection and determination unit 45, and a threshold value setting unit 47, which all constitute a circuit for detecting black sections in video data. The noise correction processing unit 44 constitutes a signal correction unit.

The threshold value setting unit 46 stores a threshold value used for detecting a silent section process at the silent section detection and determination unit 41. The stored threshold value is supplied to the silent section detection and determination unit 41. The threshold value setting unit 47 stores a threshold value used for detecting a black section at the black section detection and determination unit 45. The stored threshold value is supplied to the noise correction processing unit 44, and the black section detection and determination unit 45.

In the present embodiment, the threshold values stored in the threshold value setting units 46 and 47 are set by the system controller unit 30. Instead, the threshold values stored in the threshold value setting units 46 and 47 may be set in advance to a fixed value.

The audio characteristic signal processing unit 40 detects the audio level of each predetermined section and sends a detection signal to the silent section detection and determination unit 41. The silent section detection and determination unit 41 compares the detected audio level and the predetermined threshold value sent from the threshold value setting unit 46 and detects sections having a level value smaller than the threshold value as a silent section.

The brightness characteristic signal processing unit 42 detects a brightness signal component from data from the video encoding unit 9 and carries out various processes, such as, the above-described screen division process, signal level transformation process, histogram process, and score transformation process.

The color-difference characteristic signal processing unit 43 detects a color-difference signal component from data from the video encoding unit 9 and carries out various processes, such as, the above-described screen division process, signal level transformation process, histogram process, and score transformation process.

The outputs from the brightness characteristic signal processing unit 42 and the color-difference characteristic signal processing unit 43 are supplied to the noise correction processing unit 44 where the above-described noise correction process is carried out on the outputs. The corrected outputs are supplied to the black section detection and determination unit 45.

The noise correction processing unit 44 compares the outputs from the brightness characteristic signal processing unit 42 and the color-difference characteristic signal processing unit 43 with the threshold value $T_{hmin}$ from the threshold value setting unit 47. Then, for example, according to these present embodiment, as described with reference to FIG. 24, the noise correction processing unit 44 carries out a process to replace the data values of sections fa to fb and fc to fd whose levels are smaller than the minimum threshold value $T_{hmin}$ in the section f3 to f4, which desirably is detected as the first detection section, with a value greater than the minimum threshold value $T_{hmin}$ by one. As described later, according to the present embodiment, the noise correction processing unit 44 includes a digital filter (non-linear signal processing system).

As described above, according to the present embodiment, the black section detection and determination unit 45 detects a black section from the expressions 8 and 9. More specifically, as described above, for the brightness signal component, the detection process for detecting the first detection section is carried out by using the minimum threshold value $T_{hmin}$ from the threshold value setting unit 47 (where the expression 9 is provided as a condition), and the detection process for detecting the second detection section is carried out. For the color-difference signal component, the calculation according to the above-described expression 8 is carried out by using the threshold value $T_{hc}$ from the threshold value setting unit 47. Then, from both detection results, a black section is detected.

According to the present embodiment, the output data on the detected silent section from the silent section detection and determination unit 41 is supplied to the characteristic-point extraction unit 102. At the same time, the output data on the detected black section from the black section detection and determination unit 45 is supplied the characteristic-point extraction unit 102.

The characteristic-point extraction unit 102 extracts characteristic point that correspond to a start point and an end point of a CM section or a start point and an end point of a main part of a television program from input data on the detected silent section and the detected black section.

In such a case, the characteristic-point extraction unit 102 extracts characteristic points on the basis of the signal attribute of the video and audio signals, i.e., whether the signals is for a television program broadcast in Japan or the United States. More specifically, as described above, when the signals is for a television program broadcast in Japan, characteristic points are extracted only on the basis of output data on the silent sections, whereas, when the signals is for a television program broadcast in United States, characteristic points are extracted on the basis of output data on the black section and, according to the present embodiment, output data on the silent section.

As a method of determining the signal attribute, a manual method of determining the signal attribute on the basis of information input by the user may be employed or an automatic method of determining the signal attribute on the basis of output data on both the silent section and the black section from the specific condition section detection unit 101 may be employed.

If, for example, electronic program guide (EPG) data is attached to the received broadcast signal, the EPG data may be used to determine the signal attribute only if the EPG data includes information that can be used for determining whether the television program is broadcast in Japan or the United States. Moreover, when identification data indicating whether the television program is broadcast in Japan or the United States is added to the television program data recorded on a recording medium, the identification data may be used to determine the signal attribute.

The manual determination method is carried out during recording or playing on the basis of the signal attribute data of the television signal to be recorded or played input by the user to the system controller unit 30 via the user input interface unit 31, in case the user knows whether the television program is broadcast in Japan or the United States.

In other words, the system controller unit 30 generates signal attribute identification data from the information on the signal attribute input by the user and supplies the generated signal attribute identification data to the characteristic-point extraction unit 102.

The characteristic-point extraction unit 102 determines whether the characteristic points to be detected are for CM sections in a Japanese television program or a US television program on the basis of the signal attribute identification data sent from the system controller unit 30. When the characteristic points are to be detected for CM sections in a Japanese television program, characteristic points are extracted on the basis of only silent section detection data, whereas, when the characteristic points are to be detected for CM sections in a US television program, characteristic points are extracted on the basis of black section detection data and, according to this embodiment, silent section detection data.

The method of detecting characteristic points in a CM section using silent section detection data will be described below. If silent sections exist in intervals of integral multiples of 15 seconds+α (where α represents margin time for detection signal processing), the silent sections are determined as characteristic points. On the basis of the characteristic shown in FIG. 6, with reference to a detected characteristic point, if another characteristic point is not detected within a predetermined amount of time (e.g., 100 seconds) before the reference characteristic point, the reference characteristic point is determined as the start point of the CM section (corresponding to the CM start point Pm1 or Pm4 shown in FIG. 4).

Similarly, on the basis of the characteristic shown in FIG. 6, with reference to a detected characteristic point, if another characteristic point is not detected within a predetermined amount of time (e.g., 100 seconds) after the reference characteristic point, the reference characteristic point is determined as the end point of the CM section (corresponding to the CM end point Pm3 or Pm8 shown in FIG. 4).

The method of detecting characteristic points of CM sections using black section detection data is basically the same as the method of detecting characteristic points of CM sections using silent section detection data on the basis of the characteristic shown in FIG. 6.

When no signal attribute identification data from the system controller unit 30 is provided according the manual determination method based on an input by the user, the characteristic-point extraction unit 102 according to this embodiment automatically determines the signal attribute. In other words, the characteristic-point extraction unit 102 includes a signal attribute automatic detection unit 1021. The signal attribute automatic detection unit 1021 receives characteristic point extraction data of CM sections extracted from the silent section detection data and characteristic point extraction data of CM sections extracted from the black section detection data.

The signal attribute automatic detection unit 1021 determines the signal attribute to be a Japanese television program when characteristic point extraction data of CM sections is extracted from the silent section detection data but characteristic point extraction data of CM sections is not extracted from the black section detection data.

The signal attribute automatic detection unit 1021 determines the signal attribute to be a US television program when characteristic point extraction data of CM sections is extracted from the silent section detection data, characteristic point extraction data of CM sections is extracted from the black section detection data, and the two sets of characteristic point extraction data have a chronological relationship as shown in FIG. 7.

The characteristic-point extraction unit 102 determines whether the characteristic points to be detected are for CM sections in a Japanese television program or a US television program on the basis of signal attribute identification data from the determination result of the signal attribute automatic detection unit 1021. If the characteristic points are determined to be for a Japanese television program, the data of the characteristic points extracted on the basis of only the silent section detection data is output as characteristic point extraction data. If the characteristic points are determined to be for a US television program, the data of the characteristic points extracted on the basis of the black section detection data and, according to this embodiment, silent section detection data is output as characteristic point extraction data.

As described above, the characteristic point extraction data from the characteristic-point extraction unit 102 is supplied to the play list generating unit 14 via the memory unit 13 and, if instructed, is recorded on a recording medium.

As described above, the signal attribute automatic detection unit 1021 not only refers to the characteristic point extraction data of CM sections determined on the basis of the black section detection data but also the characteristic point extraction data of CM sections determined on the basis of the silent section detection data to determined whether or not the television program is a US television program. However, only the characteristic point extraction data of CM sections determined on the basis of the black section detection data may be used to determined whether or not the television program is a US television program.

(Structures of Audio Characteristic Signal Processing Unit 40 and Silent section Detection and Determination Unit 41)

(First Structural Example)

Figure 26:
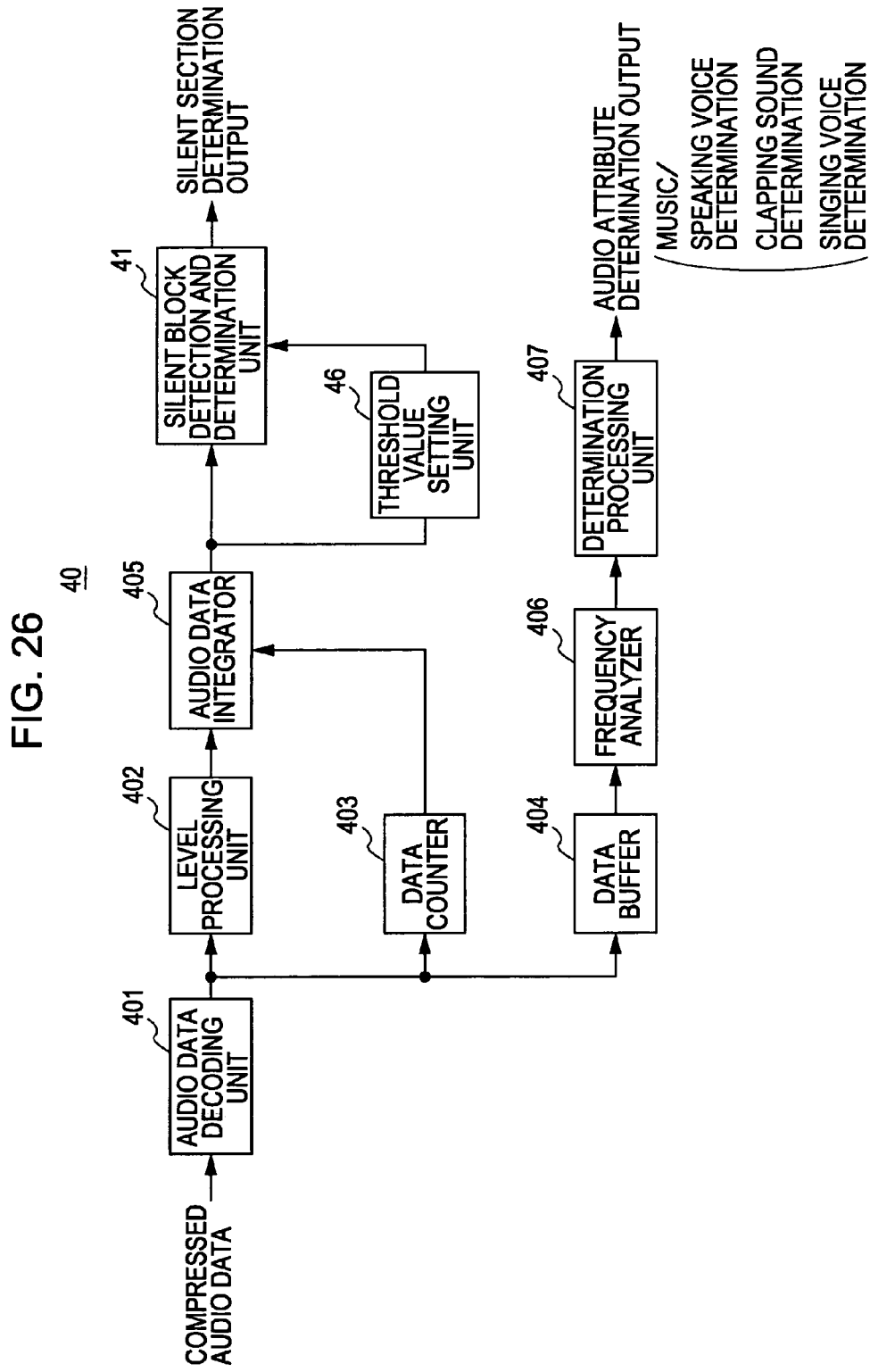
FIG. 26 illustrates an audio characteristic signal processing unit according to an embodiment in the characteristic-point extraction unit shown in FIG. 25.

FIG. 26 illustrates a black diagram of an example hardware configuration of the audio characteristic signal processing unit 40 and the silent section detection and determination unit 41.

Compressed audio data from the audio encoding unit 4 is input to an audio data decoding unit 401, where decoding is carried out. The decoded audio data is input to a level processing unit 402, a data counter 403, and a data buffer 404.

At the level processing unit 402, an absolute value of the data is obtained to calculate an average power (or average level) $P_{av}$ of a predetermined section of the audio data. At an audio data integrator 405, integration is carried out until a predetermined number of sample data sets are obtained at the data counter 403.

Here, the average power $P_{av}$ is determined on the basis of an expression 10 shown in FIG. 27, where $A_d(n)$ represents the audio data value (level) and $S_m$ represents the number of sample data sets obtained by the data counter 403.

In this case, if the length of the predetermined section for calculating the average level is, for example, about 0.01 sec (10 ms) to 1 sec and the sampling frequency $F_s$ is, for example, 48 kHz, 480 to 48,000 samples are integrated and then averaged by the sample number $S_m$ to determined the average power (or average level) $P_{av}$.

The data $P_{av}$ from the audio data integrator 405 is input to the silent section detection and determination unit 41 and is compared with the threshold value $A_{th}$ set at the threshold value setting unit 46 to determine the silent section.

When the threshold value setting unit 46 sets the threshold value $A_{th}$, the threshold value $A_{th}$ may be set to zero. However, in this embodiment, the threshold value $A_{th}$ is set to a variable threshold value $A_{thm}$ corresponding to the average level of the predetermined audio section, instead of setting the threshold value $A_{th}$ to zero.

For example, if n represents the section to be processed and $P_{av}(n-k)$ represents the average level of a section (n−k) before the section n, the variable threshold value $A_{thm}$ can be determined by the expression 11 in FIG. 27.

For example, if t=2, the variable threshold value $A_{thm}$ can be represented by the expression 12 in FIG. 27. For example, m may be in the range of about 20 to 2.

Next, the predetermined audio data stored in the data buffer 404 is input to a frequency analyzer 406, where a predetermined frequency analysis is carried out. Here, the frequency analysis may be fast Fourier transformation (FFT), and the number of predetermined analysis sample data sets from the data buffer 404 is a power of two, such as 512, 1024, 2048, or so on.

The data from the frequency analyzer 406 is input to a determination processing unit 407, where predetermined determination processing is carried out. For example, a music signal is determined on the basis of the continuity of the spectral peak of the frequency range. Such a technology is described in Japanese Unexamined Patent Application Publication No. 2002-116784.

At the determination processing unit 407, a signal of speaking voice is determined by detecting a section with a waveform having a steep rising section or a steep trailing section since the waveform of speaking voice has moments of break intake.

In such a case, in general, the waveform of a music signal compared to that of a signal of a speaking voice has a smaller possibility of including a steep rising section or a steep trailing section. Therefore, the attribute of the audio signal is determined comprehensively on the basis of the waveform characteristic of a music signal.

When the attribute of an audio signal is determined on the basis of the difference between the waveform characteristic of an audio signal of a speaking voice and the waveform characteristic of an audio signal of music, the chronological and physical characteristics of the waveform are determined. Therefore, in addition to the above-described method of determining the signal after carrying out frequency analysis (i.e., signal analysis and signal determination within a frequency range), a method of determining the signal within a base band range (i.e., signal analysis and signal determination within a chronological range) may be employed.

(Second Structural Example)

Figure 28:
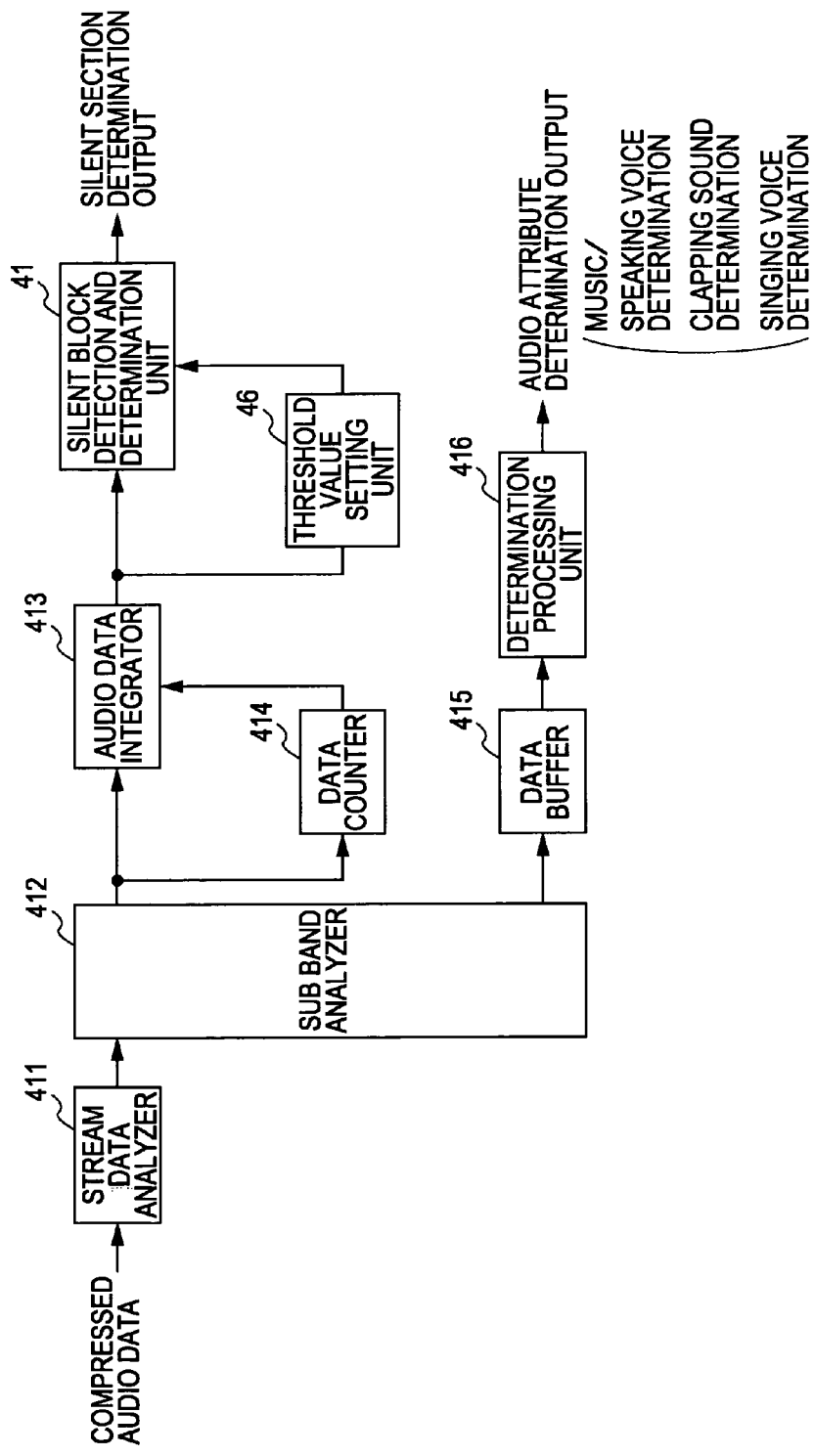
FIG. 28 illustrates an audio characteristic signal processing unit according to another embodiment in the characteristic-point extraction unit shown in FIG. 25.

FIG. 28 illustrates a block diagram describing a signal attribute analysis process that is carried out in a compressed range without decoding the audio data.

In FIG. 28, audio data from the audio encoding unit 4 is input to a stream data analyzer 411, where signal analysis at a predetermined sampling frequency, a predetermined quantized bit number, and so on is carried out. The audio data obtained as a result of the analysis is supplied to a sub band analyzer 412.

At the sub band analyzer 412, predetermined sub band analysis is carried out. Signal processing similar to that described with reference to the expressions 10 to 12 is carried out on the predetermined sub band range data.

More specifically, integration is carried out until a predetermine number of sampling data sets $S_m$ is detected at a data counter 414 as the data is input to an audio data integrator 413. Then, silent section determination is carried out at the silent section detection and determination unit 41 on the basis of a threshold value set by the threshold value setting unit 46.

In the silent section determination process, the spectrum of the audio data is taken into consideration, and a band range where energy is concentrated and a sub band range of about 3 kHz or less are used.

In the first structural example, it has been mentioned that music and speaking voice can be determined by analyzing the frequencies of the output from the apparatus count number 415. However, since the processing carried out by the sub band analyzer 412 is equivalent to carrying out predetermined frequency analysis in this signal processing system, signal processing for attribute determination is possible by carrying out a determination process of the continuity of the spectral peak, as described in relation to the determination processing unit 407 according to the first structural example.

In such a case, the spectral peak can be perceived as a maximum data band range in the sub band range, and the same signal processing as that carried out for FFT processing can be employed.

When determining the audio signal attribute from the difference between the waveform characteristic of a speaking voice audio signal and the waveform characteristic of a music audio signal, the method of determining a specific condition section according to the present embodiment of the present invention can be employed.

[Hardware Configuration of Noise Correction Processing Unit 44]

The noise correction processing unit 44 according to this embodiment is constituted of a filter processing unit using a digital filter.

(First Structural Example of Noise Correction Processing Unit 44)

Figure 29:
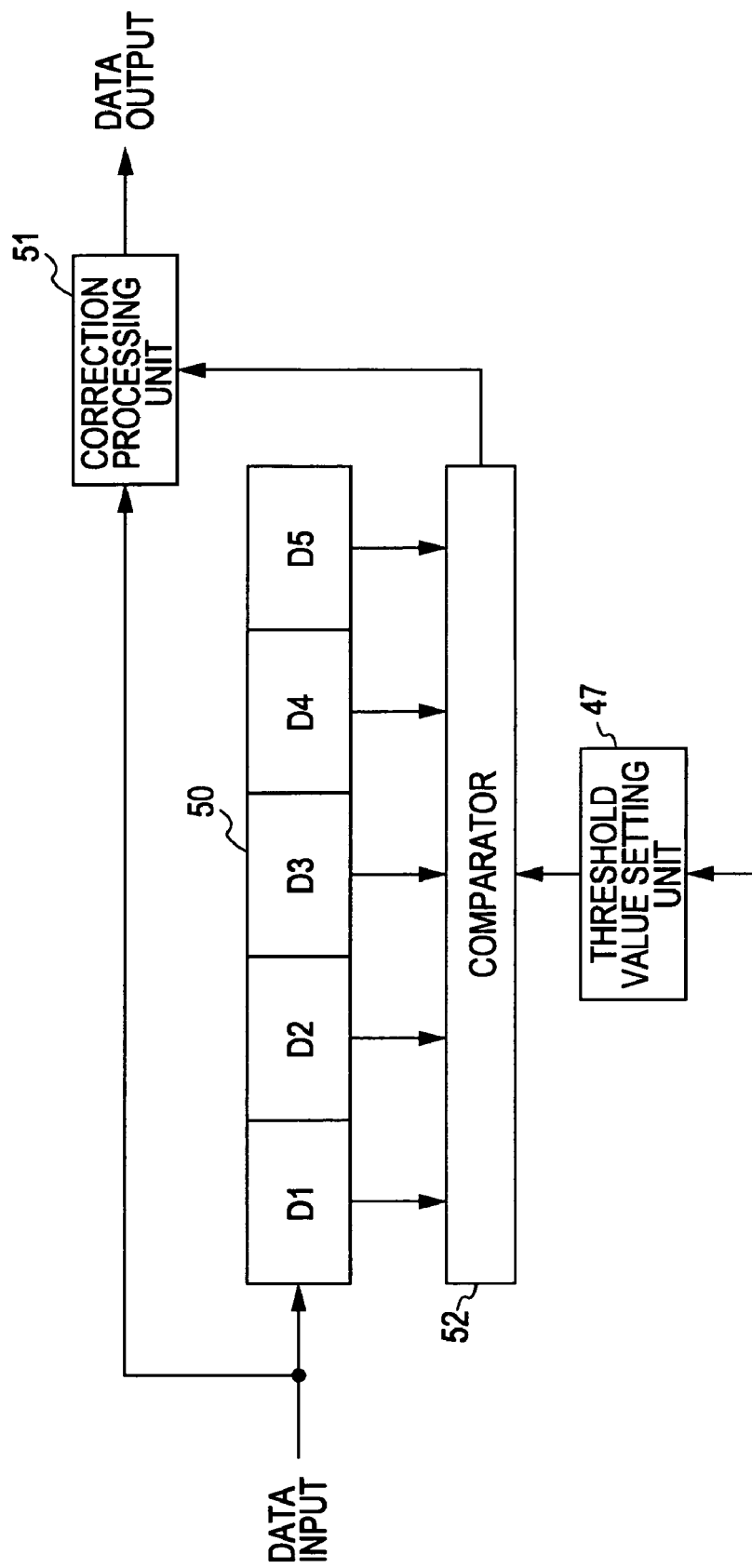
FIG. 29 illustrates a noise correction processing unit according to an embodiment in the characteristic-point extraction unit shown in FIG. 25.

FIG. 29 illustrates a black diagram of an example hardware configuration of the noise correction processing unit 44. In FIG. 29, only one system is illustrated. Although not illustrated, actually, two systems are provided, i.e., one system for processing a signal from the brightness characteristic signal processing unit 42 and another system for processing a signal from the color-difference characteristic signal processing unit 43.

In FIG. 29, D1 to D5 represent memory buffers that function as a shift register 50. The number of memory buffers correspond to the length (number of fields) included in a field section that is treated as noise. In this example, five memory buffers are provided.

Data (transformation data for characteristic extraction) from the brightness characteristic signal processing unit 42 or the color-difference characteristic signal processing unit 43 is input in order to the memory buffer D1, is temporarily store, and is then input to a correction processing unit 51. Each time data is input to the shift register 50, the data stored in the memory buffer D1 is shifted to the memory buffer D2, the data stored in the memory buffer D2 is shifted to the memory buffer D3, and so on.

The data sets stored in the memory buffers D1 to D5 are capered with the threshold value $T_{hmin}$ from the noise correction processing unit 44 by a comparator 52. The result of the comparison is supplied to the correction processing unit 51.

Data for characteristic extraction is supplied to the correction processing unit 51. The correction processing unit 51 corrects the data for characteristic extraction in accordance with the comparison result from the comparator 52. More specifically, in accordance with the output signal from the comparator 52, the correction processing unit 51 corrects and outputs portions of the data for characteristic extraction that require correction in such a manner described in detail below and does not correct portions of the data for characteristic extraction that do not require correction on the basis of the comparison result from the comparator 52.

Figure 30:
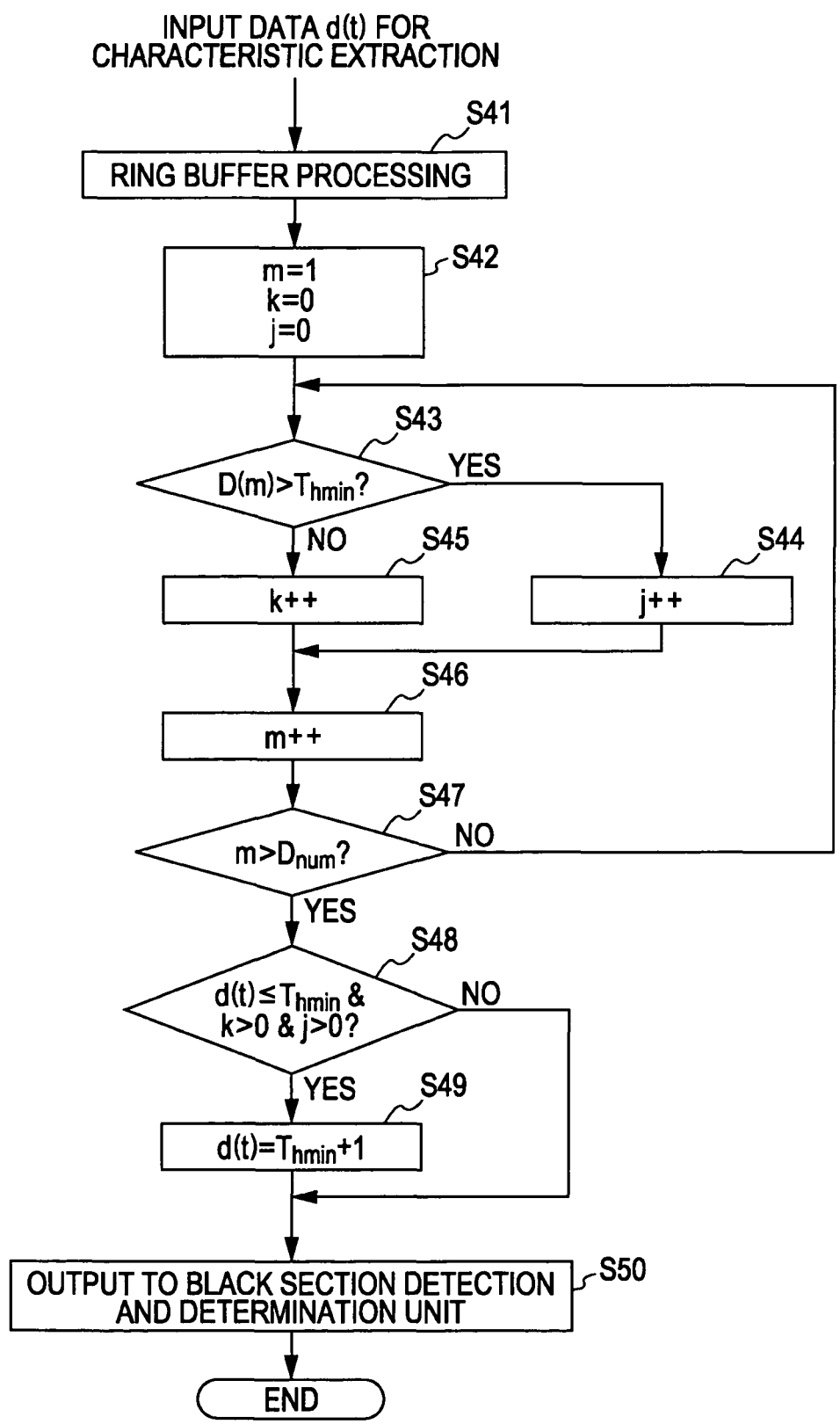
FIG. 30 illustrates a flow chart for the processing operation of a noise correction processing unit according to an embodiment in the characteristic-point extraction unit shown in FIG. 25.

The correction process carried out at the comparator 52 and the correction processing unit 51 will be described with reference to the flow chart illustrated in FIG. 30. The flow chart in FIG. 30 illustrates the steps of processing carried out on a brightness signal component. Each time a data item d(t) for characteristic extraction is input, the steps shown in FIG. 30 are carried out. The same processing is carried out on a color-difference signal component.

When the noise correction processing unit 44 receives the data item d(t) for characteristic extraction (which is a score value), ring buffering is carried at the above-described shift register 50 (Step S41). Next, the count values of variables m, k, and j are initialized to zero (Step S42).

The variable m represents which data of the five memory buffers D1 to D5 is being processed. In this case, the maximum value Dn for the variable m is five. The variable k represents the number of data items d(t) for characteristic extraction stored in the memory buffers D1 to D5 that have a value smaller than the minimum threshold value $T_{hmin}$. The variable j represents the number of data item d(t) for characteristic extraction stored in the memory buffers D1 to D5 that have a value greater than the minimum threshold value $T_{hmin}$. Here, the variables k and j are smaller or equal to five (k, j≦5).

The data sets in the memory buffers D1 to D5 and the minimum threshold value $T_{hmin}$ are compared to determine the numbers to be set to the variables k and j. More specifically, it is determined whether a data item D(1) in the first memory buffer D1 is greater than the minimum threshold value $T_{hmin}$ (Step S43). If it is determined that the data item D(1) is greater than the minimum threshold value $T_{hmin}$, the value set to the variable j is incremented (Step S44). If it is determined that the data item D(1) is smaller than the minimum threshold value $T_{hmin}$, the value set to the variable k is incremented (Step S45).

Next, to carry out a comparison with the data item in the next memory buffer, the variable m is incremented by one (Step S46). Then, it is determined whether the incremented variable m is greater than the maximum value $D_{num}$ (Step S47). In Step S47, it is determined whether the comparison process for the data items in all of the memory buffers D1 to D5 is completed.

In Step S47, if it is determined that the variable m is smaller than the maximum value $D_{num}$, the process returns to Step S43 to repeat the subsequent steps. In Step S47, if it is determined that the variable m is greater than the maximum value $D_{num}$, it is determined that the comparison process for the data items in all of the memory buffers D1 to D5 is completed. Accordingly, it is determined whether the output data d(t) for characteristic extraction satisfies the conditions of: 1) d(t) is smaller than the minimum threshold value $T_{hmin}$; 2) k is greater than zero (k>0); and 3) j is greater than zero (j>0) (Step S48).

In Step S48, if it determined that the above-mentioned conditions are satisfied, the output data d(t) for characteristic extraction is determined to be d(t)=$T_{hmin}$+1 (Step S49) and is output to the black section detection and determination unit 45 (Step S50).

In Step S48, if it determined that the above-mentioned conditions are not satisfied, Step S49 is skipped and the process directly proceeds to Step S50. In Step S50, the output data d(t) for characteristic extraction is not changed and is output to the black section detection and determination unit 45.

(Timing Chart of Noise Correction Operation)

Figure 33:
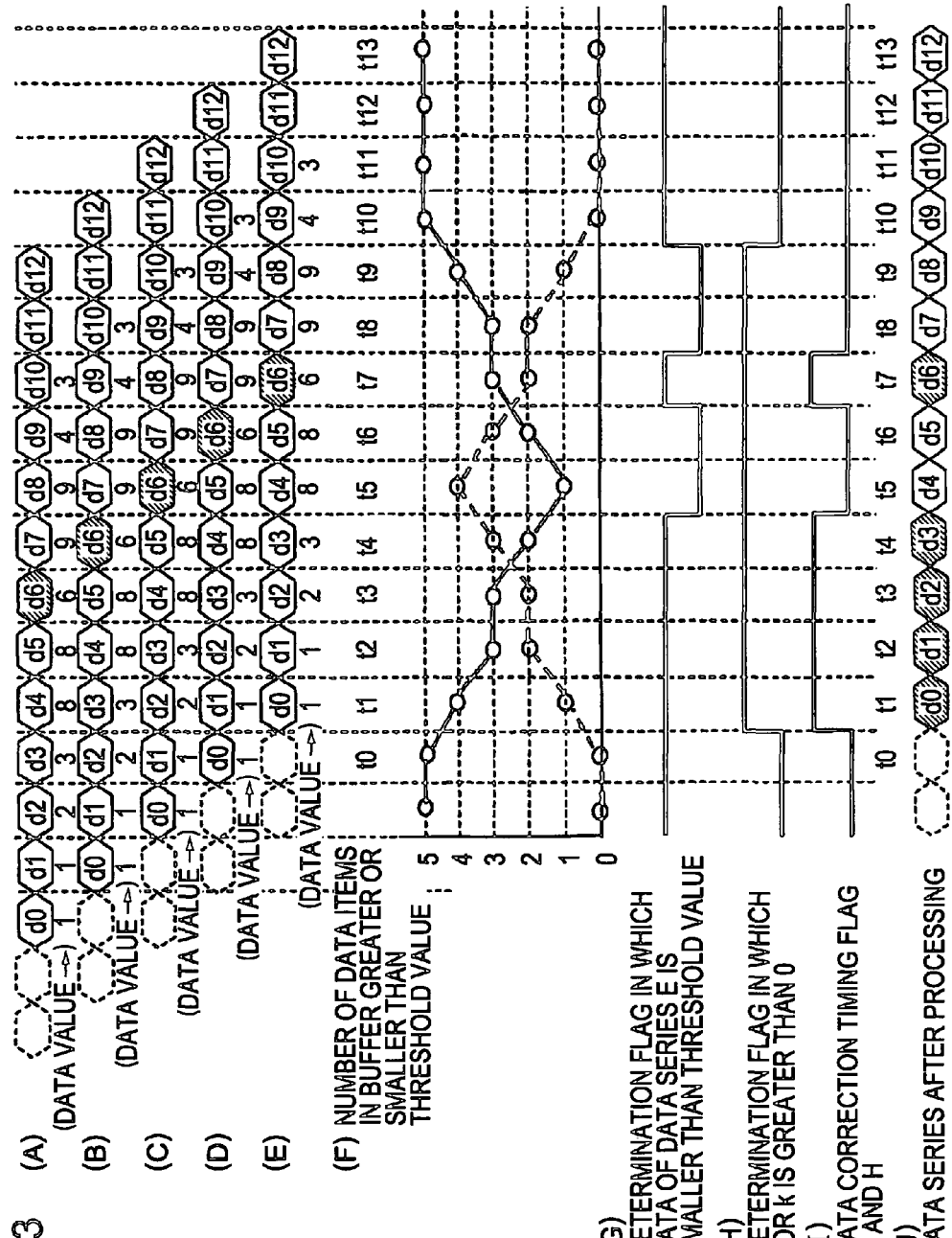
FIG. 33 illustrates the processing operation of a noise correction processing unit according to another embodiment in the characteristic-point extraction unit shown in FIG. 25.

Next, the above-described noise correction process (non-linear filtering process) will be described using a simple data string. FIGS. 31 to 33 illustrate timing charts to be referred to in the description below on the noise correction process.

FIG. 31 shows a data string for characteristic extraction before being corrected at the noise correction processing unit 44. FIG. 32 shows a data string for characteristic extraction after being corrected at the noise correction processing unit 44. FIG. 33 shows a timing chart describing the correction process using output data from the memory buffers D1 to D5.

In these drawings, d0 to d12 represent data sets (in field units) for characteristic extraction. Moreover, t0 to t12 represent the data output point (in field units) of the data sets d0 to d12 for characteristic extraction.

The numerical values provided along the vertical axes in FIGS. 31 and 32 are the values of the data sets d0 to d12, which in this case are the score values $S_b$, described above. In FIG. 18, the score values $S_b$ are in a range of 0 to 100. However, since in this case simple data is used, as mentioned above, the score values $S_b$ are in a range of 0 to 10.

In this example, the minimum threshold value $T_{hmin}$ equals seven. When a score value of any of the data sets d0 to d12 is greater than the minimum threshold value $T_{hmin}$, that data sets is determined to be a black section. When a score value of any of the data sets d0 to d12 is smaller than the minimum threshold value $T_{hmin}$, that data sets is determined not to be a black section. Therefore, in this example, the noise correction processing unit 44 replaces the data value of a section that is presumed to be noise with the minimum threshold value $T_{hmin}$ so that the section can be determined as a black section.

As shown in FIG. 31, in this example, the section corresponding to data sets d4 to d8 is presumed to be a black section. However, since the value of the data set d6 is smaller than the minimum threshold value $T_{hmin}$, when correction processing is not carried out at the noise correction processing unit 44, two sections corresponding to data sets d4 to d5 and d7 to d8 will be output as first detection sections and detected as black sections, as shown in the lower area of FIG. 31.

When the second detection process is carried out on the first detection sections so as to obtain a second detection section, two black sections will be detected in a similar way as those detected in the first detection process, as shown in the lower area of FIG. 31. As a result, due to the influence of the data set d6, which is presumed to be noise, the detection results will be false.

Next, noise correction processing carried out on input data for characteristic extraction, such as that illustrated in FIG. 31, will be described with reference to FIG. 33.

FIGS. 33A to 33E illustrate the output timing of the data sets output from the memory buffers D1 to D5. In the drawings, d0 to d12 represent data sets (in field units) for characteristic extraction. Moreover, t0 to t12 represent the data output points (in field units) of the data sets d0 to d12 for characteristic extraction. The numerical values shown in the lower area the data sets d0 to d12 are the values (score values) of the data sets.

Processing is carried out when data is stored in all of the memory buffers D1 to D5. The processing timing will be described with reference to the data series in FIG. 33E.

The relationship of the data values in the memory buffers D1 to D5 to the minimum threshold value $T_{hmin}$ will be described in order from the point t1. At the point t1, the data sets d0 to d4 are stored in the memory buffers D1 to D5, respectively. Only the data set d4 among the data sets d0 to d4 is greater than the minimum threshold value $T_{hmin}$, whereas the other four data sets d0 to d3 are smaller than the minimum threshold value $T_{hmin}$.

Next, at the point t2, two of the data sets d4 and d5 are greater than the minimum threshold value $T_{hmin}$, whereas the three data sets d1 to d3 are smaller than the minimum threshold value $T_{hmin}$.

In this way, the data values in the memory buffers D1 to D5 are compared with the minimum threshold value $T_{hmin}$ to obtain the number of data sets j that are greater than the minimum threshold value $T_{hmin}$, and the number of data sets k that are smaller than the minimum threshold value $T_{hmin}$, as shown in FIG. 33F.

FIG. 33G shows a detection flag indicating a section in which the data series in interest (i.e., data series shown in FIG. 33E) is smaller than the minimum threshold value $T_{hmin}$. FIG. 33H shows a detection flag indicating a section in which the numbers of data sets j and k are greater than zero.

According to the condition provided in Step S48 in the flow chart shown in FIG. 30, the theoretical AND of the detection flags shown in FIGS. 33G and 33H is obtained. As a result, the timing of the correction flag for filter processing for reducing the influence of noise will be as shown in FIG. 33I. In other words, noise is corrected in sections in which the correction flags are 'on' (i.e., high-level sections), as shown in FIG. 33I, by correcting the data corresponding to Step S49 of the flow chart in FIG. 30. In this description with reference to FIGS. 31 to 33, the value of the data for characteristic extraction is d=$T_{hmin}$.

The data for characteristic extraction after noise is corrected is illustrated in FIG. 33J, where the data sets do, d1, d2, d3, and d6 are replaced with a correction value and the data set d6 that was affected by noise is corrected.

FIG. 32 illustrates the data string shown in FIG. 31 after correction. When the first detection section is obtained from the corrected data string shown in FIG. 32, the influence of noise is reduced, and, as shown in the lower area of FIG. 32, the first detection section is detected as a section between the data set do to the data set d8. The second detection section obtained on the basis of the first detection section corresponds the section d7 and d8, as shown in the lower area of FIG. 32. In other words, the second section is accurately detected.

As shown in FIG. 32, in addition to the data set d6 that is affected by noise, the four data sets do, d1, d2, and d4 are also corrected. Therefore, the first detection section will be detected as a black section that is longer in the forward direction by (memory buffers)-1. However, this is not a problem since the number of memory buffers is less than ten and the section being corrected is not divided due to an influence of noise.

This is not a problem also because the four data sets do, d1, d2, and d4 are not detected as black sections in the second detection process when the maximum value $B_{kmax}$ is greater than the minimum threshold value $T_{hmin}$.

(Second Structural Example of Noise Correction Processing Unit 44)

Figure 34:
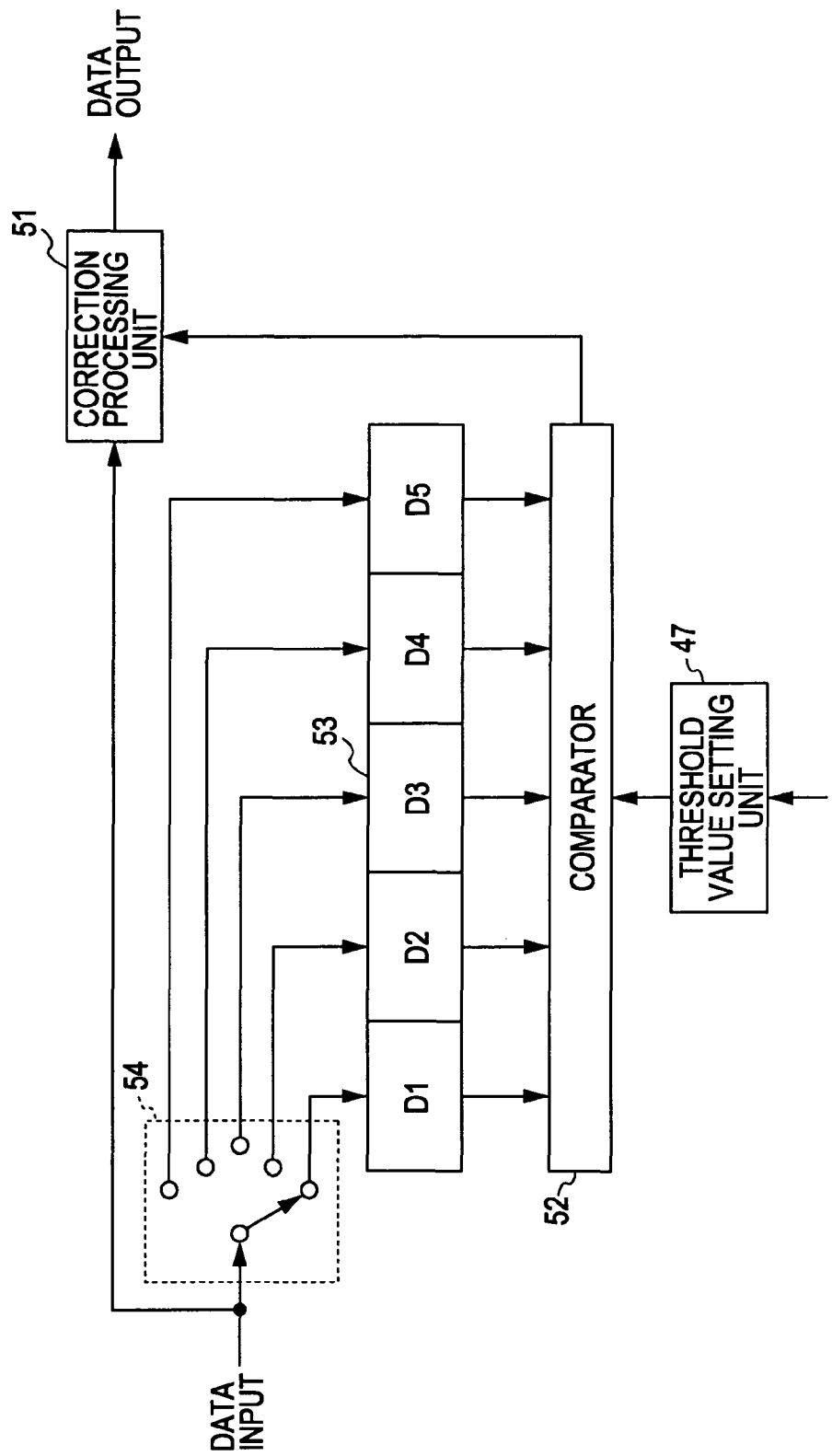
FIG. 34 illustrates the processing operation of a noise correction processing unit according to another embodiment in the characteristic-point extraction unit shown in FIG. 25.

FIG. 34 illustrates the noise correction processing unit 44 is a modification of the embodiment shown in FIG. 29 employing digital filter processing.

The memory buffers D1 to D5 store data for characteristic extraction and constitute a ring buffer 53. According to this modification, unlike the above-described embodiment, the memory buffers D1 to D5 do not constitute a shift register. Each time a data set for characteristic extraction is input to a memory buffer, the data set is switched by a switch circuit 54 and is supplied to the ring buffer 53. In this way, the memory buffer that receives the data set changes in a cycle, such as D1 to D2, D2 to D3, D3 to D4, D4 to D5, D5 to D1 and so on.

When data sets for characteristic extraction are stored in each of the memory buffers D1 to D5, a comparison process is carried out on the data sets stored in the memory buffers D1 to D5 by the comparator 52 in a manner similar to that according to the above-described embodiment. Then, a correction process, similar to that described above, is carried out by the correction processing unit 51 on the basis of the comparison results. The signal processing carried out by the comparator 52 and the correction processing unit 51 will not be described in detail again since the processing is the same as described above.

(Other Processing Carried Out by Noise Correction Processing Unit 44)

The processing carried out by the noise correction processing unit 44 is not limited to the above-described filter processing using a digital filter.

Figure 35:
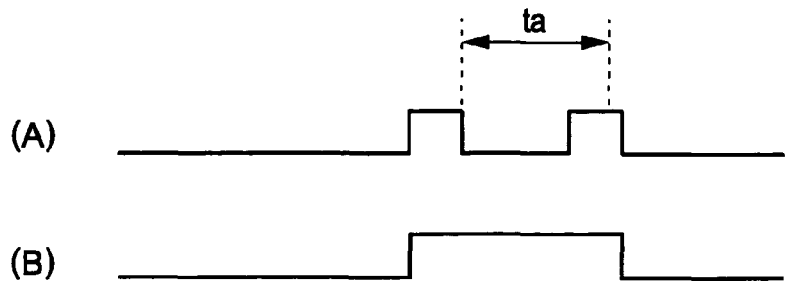
FIG. 35 illustrates the processing operation of a noise correction processing unit according to another embodiment in the characteristic-point extraction unit shown in FIG. 25.

For example, when the first detection section is divided as shown in FIG. 35A in a manner similar to that shown in FIG. 31, it is determined whether the intervals of the divided sections are longer or shorter than a predetermined amount time $t_a$. If the interval is shorter than the amount of time $t_a$, it is presumed that the first detection section has been divided due to the influence of noise, and a process for combining the divided sections, as shown in FIG. 35B, to obtain the first detection section is carried out.

The amount of time $t_a$ corresponds to the number of memory buffers used in the above-described filter processing and is set in accordance with the characteristics shown in FIGS. 6, 19, and 20 to, for example, $t_a$=5 fields. In this way, as shown in FIG. 35B, even when there is noise, a single first detection section can be obtained, reducing the influence of noise.

Another method of processing may also be employed. In this method, a window signal $S_{wd}$ having a window width for detecting a black section is used when a black section of a CM section is detected as a characteristic point. The window width W of the window signal $S_{wd}$ is set to, for example, 200 fields on the basis of the characteristic of the width of the black section, as shown in FIG. 19.

In this case, the window signal $S_{wd}$ having the window width W and rising from the detected start point of the first detection section (i.e., the point where the value (score) of the input data for characteristic extraction becomes greater than the minimum threshold value $T_{hmin}$) is provided to detect a black section as a characteristic point. In the section where the window signal $S_{wd}$ has a window width W, the portions of the input data for characteristic extraction that corresponds to values smaller than the minimum threshold value $T_{hmin}$ are all replaced with a value greater than the minimum threshold value $T_{hmin}$, e.g., ($T_{hmin}$+1)

In this way, the detection output of the first detection section will not be divided even if there is noise. By carrying out the second detection process, the black section will be detected even more accurately.

Figure 36:
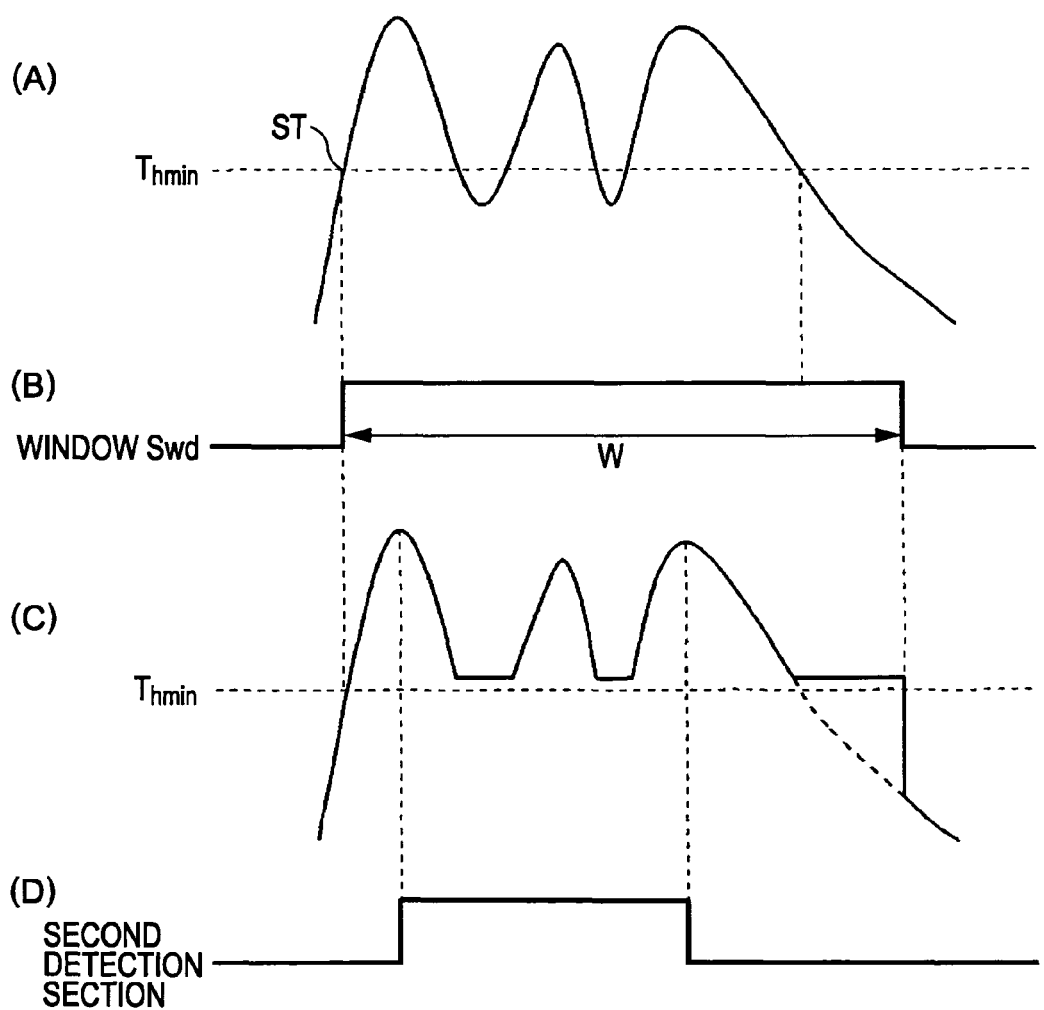
FIG. 36 illustrates the processing operation of a noise correction processing unit according to another embodiment in the characteristic-point extraction unit shown in FIG. 25.

For example, when data for characteristic extraction, such as that shown in FIG. 36A is input, the window signal $S_{wd}$, as shown in FIG. 36B, starts rising from the point ST where the value of the data for characteristic extraction first exceeds the minimum threshold value $T_{hmin}$.

Sections of the data corresponding to values smaller than the minimum threshold value $T_{hmin}$ included the section of the window signal $S_{wd}$ having a window width W, as shown in FIG. 36C, are all replaced with ($T_{hmin}$+1).

Therefore, even if data for characteristic extraction including sections that correspond to values smaller than the minimum threshold value $T_{hmin}$ due to noise is input, as shown in FIG. 36A, the section is not divided due to the noise. By carrying out the second detection process on the corrected input data for characteristic extraction, as shown in FIG. 36C, a black section can be accurately detected as shown in FIG. 36D.

Another method using a window signal $S_{wd}$ will be described below. In this method, the window signal $S_{wd}$ does not start to rise from the detection start point of the first detection section, but a predetermined window signal $S_{wd}$ is moved in order in correspondence with the input data for characteristic extraction.

For example, until the first specific condition section (which, in this case, is the first detection section of the black section) is detected, the window signal $S_{wd}$ is moved in sections by increments of the window width W or by increments of the window width W while overlapping with the sections in a predetermined section.

As described above, when the predetermined specific condition section (which, in this case, is the first detection section of the black section) is detected, the next window signal $S_{wd}$ is moved on the basis of the characteristic described in FIG. 6 to carry out signal processing, as shown in FIG. 36C, by moving the window signal $S_{wd}$ by a predetermined increment, e.g., 30 seconds.

By such movement of the window signal $S_{wd}$, predetermined sections are corrected to a value greater than a predetermined threshold value. In this way, the above-described processing is carried out properly.

(Another Example Structure of Characteristic-Point Extraction Unit 10)

Figure 25:
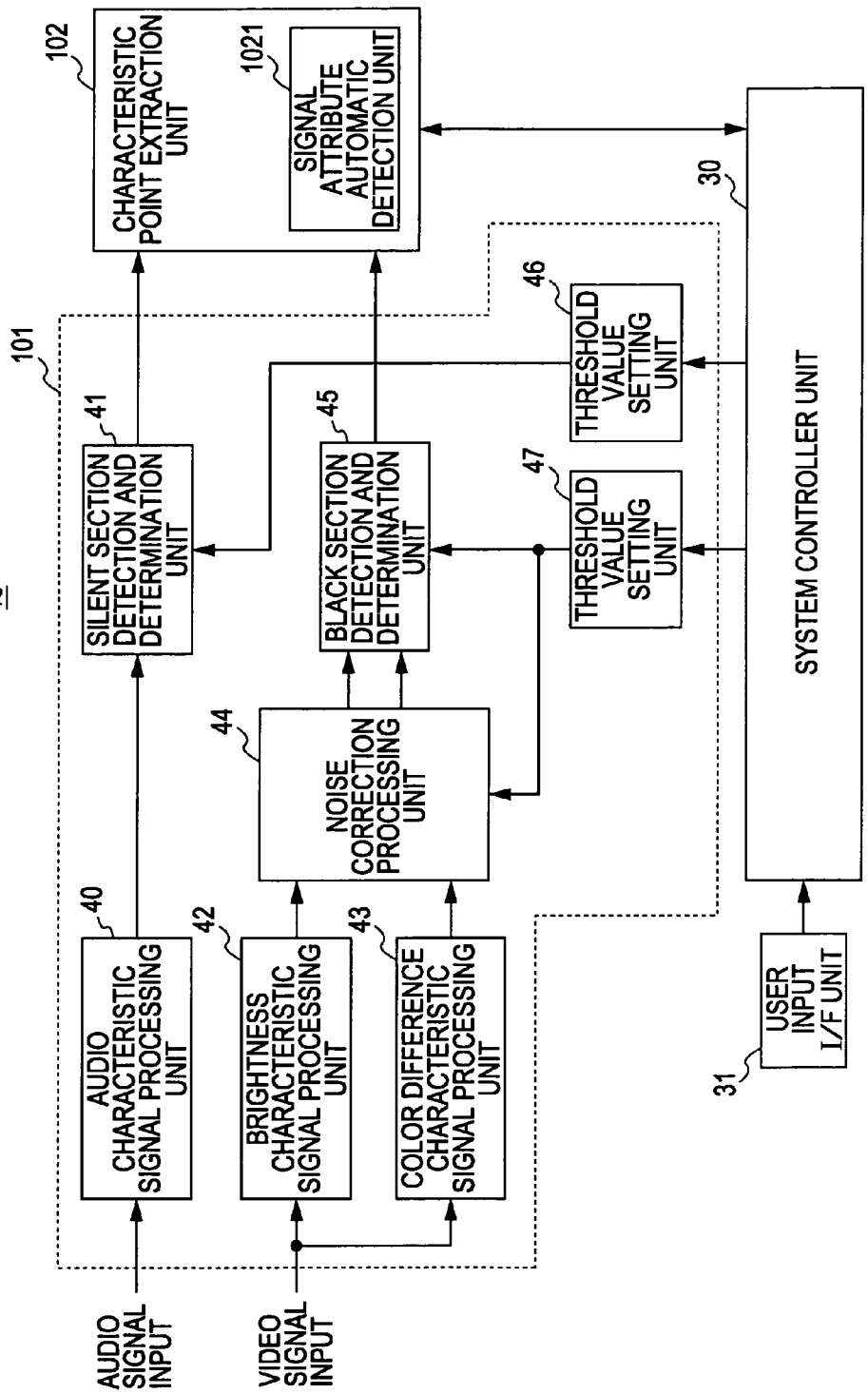
FIG. 25 illustrates a characteristic-point extraction unit according to an embodiment in the recording and reproducing apparatus shown in FIG. 1.

The characteristic-point extraction unit 10 shown in FIG. 25 includes not only the specific condition section detection unit 101 but also the characteristic-point extraction unit 102 as hardware. However, as shown in FIG. 37, software processing may be carried out by the microcomputer included in the system controller unit 30 so as to function as the characteristic-point extraction unit 102.

Figure 37:
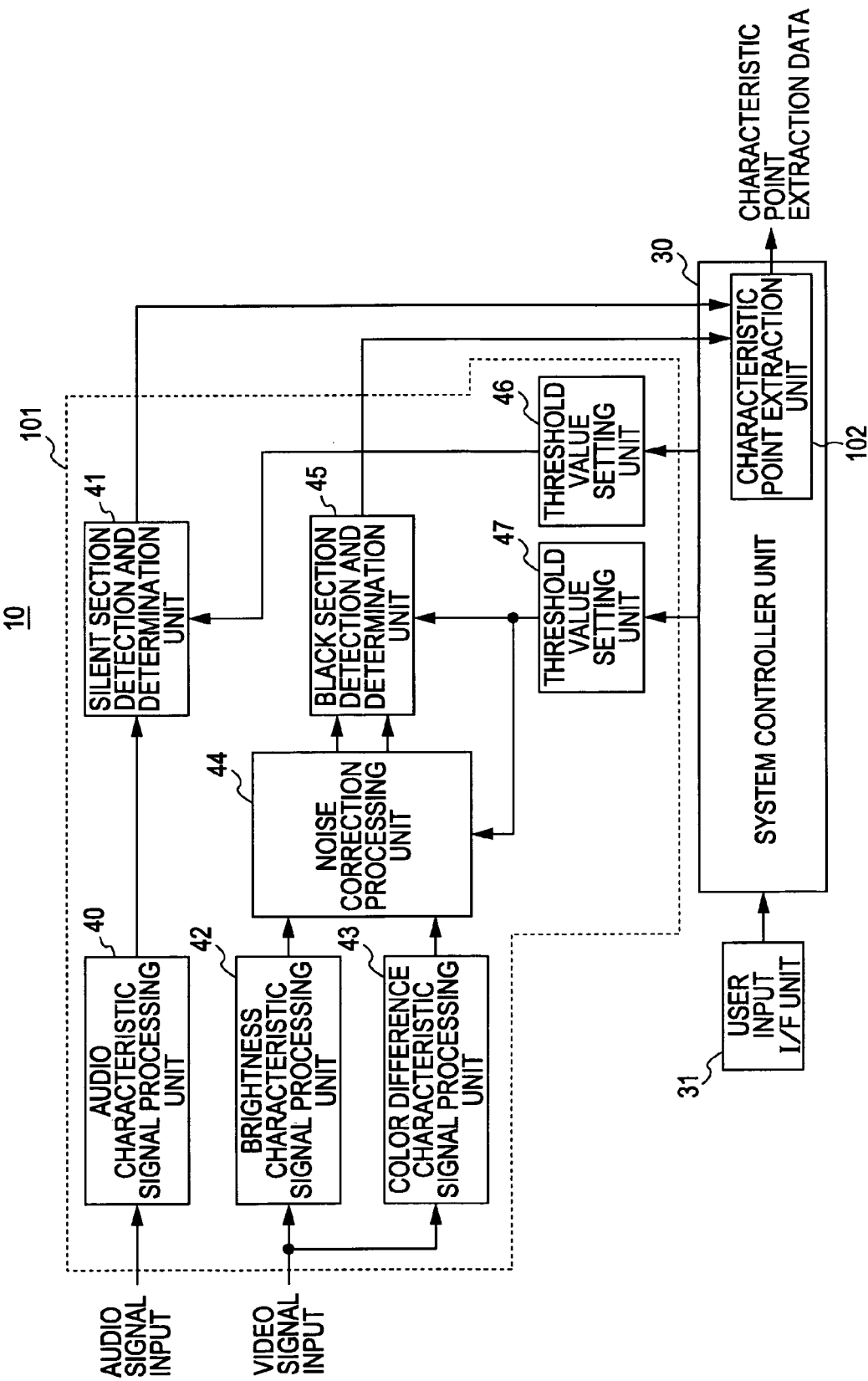
FIG. 37 illustrates a characteristic-point extraction unit according to another embodiment in the recording and reproducing apparatus shown in FIG. 1.

As shown in FIG. 37, the output of the characteristic-point extraction unit 10 is output as data for characteristic extraction from the system controller unit 30.

[Another Embodiment of Recording and Reproducing Apparatus]

Figure 38:
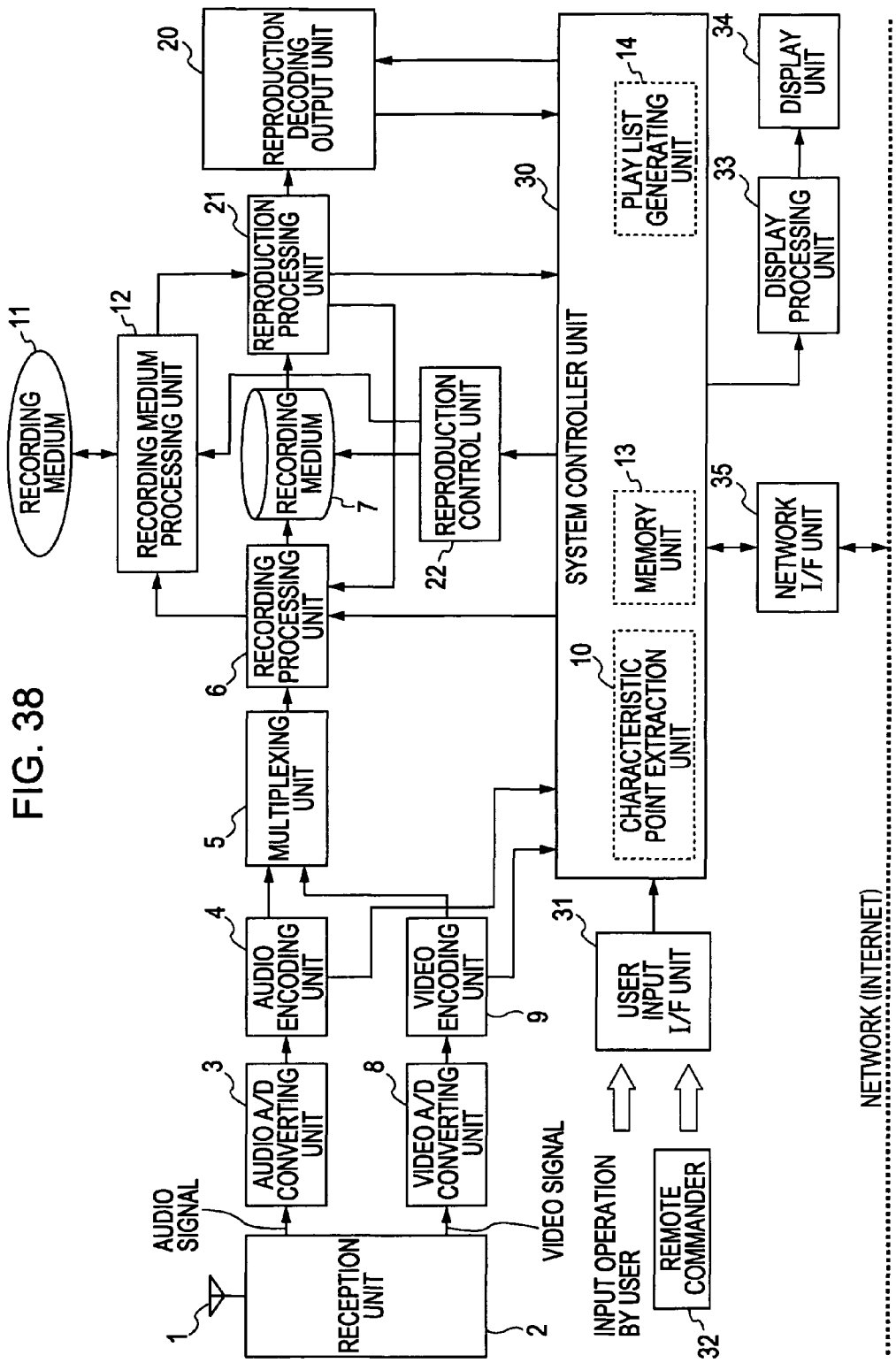
FIG. 38 illustrates a block diagram of a recording and reproducing apparatus employing a method of detecting a specific condition section according to another embodiment of the present embodiment.

FIG. 38 illustrates a block diagram of a recording and reproducing apparatus according to another embodiment of the present invention. As shown in FIG. 38, the characteristic-point extraction unit 10 and the play list generating unit 14, which are provided as hardware in the above-described embodiment, are provided as software executed by the microcomputer included in the system controller unit 30. Moreover, a memory included in the system controller unit 30 is used as the memory unit 13.

As shown in FIG. 38, the system controller unit 30 is connected to a network, such as the Internet, via a network interface unit 35.

Since the signal processing carried out to record and reproduce a television program is the same as that according to the recording and reproducing apparatus shown in FIG. 1, only the steps in the signal processing that are different from those in the signal processing carried out by the apparatus shown in FIG. 1 will be described below.

First, the recording and reproducing apparatus shown in FIG. 38 differs from the recording and reproducing apparatus shown in FIG. 1 in that the characteristic-point extraction unit 10 is realized by the system controller unit 30 through software execution.

More specifically, the system controller unit 30 receives audio data and video data from the audio encoding unit 4 and the video encoding unit 9, respectively, and carries out silent section detection and black section detection. Then, from the detection results, characteristic points of CM sections are extracted to generate characteristic point extraction data.

The characteristic point extraction data is transmitted via the memory unit 13 to the play list generating unit 14 that is realized by the system controller unit 30 carrying out software processing. At the play list generating unit 14 that is realized by the system controller unit 30 carrying out software processing, a play list is generated from the characteristic point extraction data.

FIG. 39 illustrates a flow chart showing the process of detecting a black section in video data as a specific condition section at the characteristic-point extraction unit 10 realized by the system controller unit 30 carrying out software processing.

First, the system controller unit 30 receives video data (Step S61). Then, the system controller unit 30 generates data for characteristic extraction by carrying out level transformation processing, histogram processing, and score transformation processing, as described above, on a brightness signal component and a color-difference component (Step S62).

Then, noise correction is carried out on the generated data for characteristic extraction, as described above (Step S63).

Noise correction is carried out by the microcomputer included in the system controller unit 30 by executing software to carry out the steps in the flow chart shown in FIG. 30.

Next, the system controller unit 30 carries out the first detection process for detecting a first detection section (Step S64). In the first detection process for detecting a first detection section, the maximum data $B_{max}$ in the first detection section is also detected.

The second detection process for detecting a second detection section is carried out on the detected first detection section on the basis of the detected maximum data $B_{max}$ (Step S65). In the second detection process for detecting a second detection section, a predetermine data value $\beta$ is defined as a data margin (data margin value). Then, a position $f_a$ that corresponds to the position of ($B_{max}-\beta$) from the direction a in FIG. 21 is determined. Subsequently, a position $f_b$ that corresponds to the position of ($B_{max}-\beta$) from the direction b in FIG. 21 is determined. Finally, the section from the position fa to the position $f_b$ is determined as the second detection section.

When the second detection process for detecting a second detection section is completed, the system controller unit 30 determines whether or not an instruction for ending the characteristic point extraction process has been received. (Step S66). When it is determined that an instruction has not yet been received, the process is returned to Step S61 and the subsequent steps are repeated. If it is determined that an instruction has been received, the processing routine is ended.

The recording and reproducing apparatus according to the present embodiment is connected to a network, such as the Internet, via the network interface unit 35. Therefore, even if the software (program) for realizing the function of the characteristic-point extraction unit 10 is not initially stored in the recording and reproducing apparatus, the software can be obtained later via the network connection.

More specifically, the system controller unit 30 can download the software program to be executed by the system controller unit 30 to realize the functions of the characteristic-point extraction unit 10 and the software program to be executed by the system controller unit 30 to realize the functions of the play list generating unit 14 and stores these software programs in the memory unit 13. Then, the system controller unit 30 carries out the characteristic point extraction process and the play list generation process (chapter generation process (i.e., generating play sections and play point position information)) by executing the downloaded software programs.

For example, when a deadline for production and distribution cannot be met, during the design and production stages, the recording and reproducing apparatus may be provided with a simple structure that does not employ the structure according to an embodiment of the present invention. Then, later, the software program for realizing the functions of the characteristic-point extraction unit 10 and the software program for realizing the functions of the play list generating unit 14 may be provided on a server connected to the Internet, allowing the recording and reproducing apparatus to download the software programs. In this way, functions according to an embodiment of the present invention can be added to a recording and reproducing apparatus not including the structure according to embodiments of the present invention so as to obtain a recording and reproducing apparatus according to an embodiment of the present invention to a user.

The user may purchase a recording and reproducing apparatus having a simple structure that does not employ the structure according to an embodiment of the present invention. Then, by carrying out software processing, functions can be added to obtain a recording and reproducing apparatus according to an embodiment of the present invention.

By obtaining the network interface unit 35 and allowing network connection, the recording and reproducing apparatus can download software programs to upgrade the recording and reproducing apparatus so that the characteristic extraction system and the like can be corrected and/or improved.

When the above-mentioned software programs are to be downloaded and installed in the recording and reproducing apparatus, the user can connect the apparatus to the Internet via the network interface unit 35 by using a predetermined operation system, such as the remote commander 32. Then, by using the predetermined operation system again, any software programs can be downloaded.

The downloaded software programs are decompressed at the system controller unit 30 to load various predetermined functions, such as characteristic extraction, play list generation, chapter generation, and so on.

By using a microprocessor (micro processing unit (MPU) or central processing unit (CPU)) as the system controller unit 30, the characteristic extraction process can be carried out simultaneously to the recording process of video data and audio data.

As described above, when carrying out band compression of predetermined images and sound in a recording process, an MPU or a CPU having the above-described specifications or a digital signal processor (DSP) may be used. The same MPU, CPU, or DSP may also be used for characteristic extraction and play list generation.

[Recording and Playing Apparatus According to Another Embodiment]

(Data Recording and Reproduction from Network System)

Video and audio contents can be loaded from a network system by using a network having a high-speed transmission rate, such as optical cables, to record, play, and view the video and audio contents.

A wireless network system may also be considered. However, a wireless network system may be treated in the same way as a wired network system if the network interface unit 35 for loading video and audio data from a network system is modified to support a wireless network system. Therefore, detailed descriptions of a wireless network system will be omitted.

In this case, the video and audio content data loaded from a predetermined network system is data, such as MPEG data, on which predetermined bandwidth compression is carried out. Furthermore, this embodiment of the present invention may be employed to other transmission systems, such as power line data transmission and power line communication (PLC).

(Recording Mode)

Predetermined video and audio content data loaded from a network system is input to the system controller unit 30 via the network interface unit 35. In the system controller unit 30, as described above, signal processing for characteristic extraction is carried out to obtain characteristic point extraction data. At the system controller unit 30, various types of signal processing, such as characteristic point detection and play list data generation, are carried out. However, since the processes are the same as those described above, the descriptions are not repeated here.

Predetermined signal processing is carried out at the recording processing unit 6 on the characteristic point extraction data and the play list data generated at the system controller unit 30. Then, the processed data is stored on the recording medium 7 or the recording medium 11.

(Play Mode)

To directly reproduce video and audio data from a network, the video and audio data is input to the reproduction data separating unit 23 of the reproduction decode output unit 20, where the video data and the audio data are separated. Then, as described above, video decoding and audio decoding are carried out. Since the subsequent signal processing is the same as described above, descriptions are not repeated.

To view video and audio data directly reproduced from a network when the characteristic point extraction data is not yet obtained, characteristic extraction is carried out at the system controller unit 30, as described above, to detect the characteristic point extraction data. Subsequently, characteristic points are determined. Since the determination process is the same as that described above, descriptions are not repeated.

[Other Embodiments and Modifications]

In the above-described embodiments, the data signal on which noise correction is carried out at the specific-condition-section detection unit is a video signal. However, the data signal on which noise correction is carried out is not limited to a video signal, and embodiments of the present invention may be employed for audio signals and other signals as well.

In other words, a method of detecting specific condition sections such as that described above is not limited to detecting black sections and can be employed as a standard method of detecting signals. For example, to detect silent sections, satisfactory detection and determination are possible in manners similar to those of the detection process of black sections even when noise is included in the signal by replacing the black level signal (video signal level) with the audio signal level.

To detect a speaking voice, a cheering voice, or a clapping sound, a signal for detection processing is generated on the basis of the result of frequency analysis. Embodiments of the present invention may also be employed in noise reduction and correction processing carried out on this signal.

As described above, data signals input to the specific-condition-section detection unit are not limited to compressed video and audio signals. In other words, video and audio signals that are not compressed may also be input.

Bandwidth compression signal processing carried out on video and audio data is not limited to that described above and other processing bandwidth compression signal methods, such as wavelet transformation and fractal analysis, may be carried out. For example, in wavelet transformation, an analysis coefficient for multifractal analysis is equivalent to the DCT coefficient of video data, and signal processing can be carried out in the same manner as described above.

According to the above-described embodiment, a brightness signal is transformed from an average level signal to a transformation level signal. Then, by using the transformation level signal, a histogram is generated. The histogram is further transformed into score data. By using the score data, black sections are detected. However, the level of the brightness signal and the level of a reference signal used for comparison may be directly compared to detect black sections.

In such a case, for example, if the brightness signal level is in the range of 0 to 255, the more black the level of the signal is, the closer to 0 the level is, if the offset of the signal is not taken into consideration. Therefore, the reference level for comparison may be set at, for example, ten as a predetermined threshold value. In this way, when the signal level is below ten, the signal can be determined as having a black level.

In this way, by changing the way how a data signal for characteristic point extraction is determined by setting a corresponding threshold value, predetermined signal processing according to the above-described embodiments, such as detection of characteristic point extraction data and filtering, can be carried out. Moreover, data input to the specific-condition-section detection unit is not limited to data on which data processing, such as level transformation, histogram processing, or score transformation, is carried out.

According to the above-described embodiments, characteristic point extraction data is recorded as an additional data file on a recording medium. However, instead, the detection result of specific condition sections may be recorded an additional data file on a recording medium as. In such a case, the extracted characteristic data can be regenerated by using the data of the detection results of the specific condition sections recorded on the recording medium.

According to the above-described embodiments, two types of signal attributes, i.e., a Japanese television program and a US television program, are identified. However, more than three types of signal attributes may also be identified. For example, the first attribute may be a Japanese television program, the second attribute may be a US television program, and the third attribute may be a television program broadcast in some other country (such as a European country).

It has been actually confirmed that in the United States and in European countries, characteristic points included in a television program differ. Characteristic points in a television program broadcast in a European country may be, for example, scene-change points. However, the broadcasting standard used in European countries is not the NTSC standard. Therefore, to employ an embodiment of the present invention to European television programs, pre-processing must be carried out to convert the television signal into video and audio signals that can be reproduced in the NTSC standard.

It should be understood by those skilled in the art that various modifications, combinations, sub-combinations and alterations may occur depending on design requirements and other factors insofar as they are within the scope of the appended claims or the equivalents thereof.

The invention claimed is:

1. A specific-condition-section detection apparatus configured to detect a specific condition section in a data signal, the signal level of the specific condition section being closer to a predetermined signal level than to a reference level set for comparison, the apparatus comprising:
   signal correction means for correcting the data signal by replacing a specific segment of the data signal in which the signal level is further away from the predetermined signal level than from the reference level with another data signal segment having a signal level closer to the predetermined signal level than to the reference level, the specific segment of the data signal occurring during an interval that starts at a time at which the signal level of the data signal changes from the level closer to the predetermined signal level than to the reference level to the level further away from the predetermined signal level than from the reference level and which ends at a time at which the signal level of the data signal changes back from the level further away from the predetermined signal level than from the reference level to the level closer to the predetermined signal level than to the reference level; and
   determining means for determining whether the level of the corrected data signal is closer to the predetermined signal level than to the reference level,
   the specific condition section being detected based on the determination carried out by the determining means.

2. The specific-condition-section detection on apparatus according to claim 1, wherein the data signal is a video signal and the predetermined signal level is a black level.

3. A specific-condition-section detection apparatus configured to detect a specific condition section in a data signal, the signal level of the specific condition section continuing to be closer to a predetermined signal level than a reference level for comparison, the apparatus comprising:
   signal correction means for correcting the data signal so that a segment of the data signal in which the signal level is further away from the predetermined signal level than the reference level is corrected to a level closer to the predetermined signal level than the reference level for a predetermined amount of time starting from a point at which the signal level of the data signal changes from a level closer to the predetermined signal level than the reference level to a level further away from the predetermined signal level than the reference level;
   determining means for determining whether the level of the corrected data signal is closer to the predetermined signal level than the reference level,
   wherein the specific condition section is detected based on the determination output from the determining means; and
   first detecting means for detecting a first point and a second point in a section of the data signal determined by the determining means to have a signal level closer to the predetermined signal level than the reference level, the first point being the first point in the section of the data signal at which the signal level reaches a maximum level in the signal level closer to the predetermined signal level than the reference level when the section of the data signal is searched from a chronological start position, the second point being the first point in the section of the data signal at which the signal level reaches a maximum level in the signal level closer to the predetermined signal level than the reference level when the section of the data signal is searched backward from a chronological end position,
   wherein a section from the first point to the second point is the specific condition section.

4. A specific-condition-section detection apparatus configured to detect a specific condition section in a data signal, the signal level of the specific condition section continuing to be closer to a predetermined signal level than a reference level for comparison, the apparatus comprising:
   signal correction means for correcting the data signal so that a segment of the data signal in which the signal level is further away from the predetermined signal level than the reference level is corrected to a level closer to the predetermined signal level than the reference level for a predetermined amount of time starting from a point at which the signal level of the data signal changes from a level closer to the predetermined signal level than the reference level to a level further away from the predetermined signal level than the reference level;
   determining means for determining whether the level of the corrected data signal is closer to the predetermined signal level than the reference level,
   wherein the specific condition section is detected based on the determination output from the determining means; and first detecting means for setting a second reference level and detecting a first point and a second point in a section of the data signal determined by the determining means to have a signal level closer to the predetermined signal level than the reference level, the second reference level being a level between a maximum level in the signal level closer to the predetermined signal level than the reference level in the section of the data signal and the reference level, the first point being the first point in the section of the data signal at which the signal level reaches the second reference level when the section of the data signal is searched from a chronological start position, the second point being the first point in the section of the data signal at which the signal level reaches the second reference level when the section of the data signal is searched backward from a chronological end position, wherein a section from the first point to the second point is the specific condition section.

5. In a recording and reproducing apparatus configured to record a broadcast television program on a recording medium and to play back data recorded on the recording medium, a method of detecting a specific condition section in a data signal representing at least one of a video portion of the broadcast television program and an audio portion of the broadcast television program, the signal level of the specific condition section being closer to a predetermined signal level than to a reference level set for comparison, the method comprising:

correcting the data signal by replacing a specific segment of the data signal in which the signal level is further away from the predetermined signal level than from the reference level with another data signal segment having a signal level closer to the predetermined signal level than to the reference level, the specific segment of the data signal occurring during an interval that starts at a time at which the signal level of the data signal changes from the level closer to the predetermined signal level than to the reference level to the level further away from the predetermined signal level than from the reference level and which ends at a time at which the signal level of the data signal changes back from the level further away from the predetermined signal level than from the reference level to the level closer to the predetermined signal level than to the reference level; and determining whether the level of the corrected data signal is closer to the predetermined signal level than to the reference level, the specific condition section being detected based on the determination carried out by the determining step.

6. A specific-condition-section detection apparatus configured to detect a specific condition section in a data signal, the signal level of the specific condition section being closer to a predetermined signal level than to a reference level set for comparison, the apparatus comprising:

signal correction means for correcting the data signal by replacing a specific segment of the data signal in which the signal level is further away from the predetermined signal level than from the reference level with another data signal segment having a signal level closer to the predetermined signal level than to the reference level, the specific segment of the data signal occurring during an interval within a window section of the data signal having a predetermined length starting at a moment at which the level of the data signal is closer to the predetermined signal level than to the reference level and ending at a moment at which the level of the data signal is closer to the reference level than to the predetermined signal level; and determining means for determining whether the level of the corrected data signal is closer to the predetermined signal level than to the reference level, the specific condition section being detected based on the determination carried out by the determining means.

7. A specific-condition-section detection apparatus configured to detect a specific condition section in a data signal, the signal level of the specific condition section continuing to be closer to a predetermined signal level than a reference level for comparison, the apparatus comprising:

signal correcting means for correcting the data signal so that a segment of the data signal in which the signal level is further away from the predetermined signal level than the reference level is corrected to a level closer to the predetermined signal level than the reference level for a predetermined amount of time during a window section of the data signal having a predetermined length starting from a point corresponding to a moment at which the level of the data signal is closer to the predetermined signal level than the reference level;

determining means for determining whether the level of the corrected data signal is closer to the predetermined signal level than the reference level, wherein the specific condition section is detected based on the determination output from the determining means; and first detecting means for detecting a first point and a second point in a section of the data signal determined by the determining means to have a signal level closer to the predetermined signal level than the reference level, the first point being the first point in the section of the data signal at which the signal level reaches a maximum level in the signal level closer to the predetermined signal level than the reference level when the section of the data signal is searched from a chronological start position, the second point being the first point in the section of the data signal at which the signal level reaches a maximum level in the signal level closer to the predetermined signal level than the reference level when the section of the data signal is searched backward from a chronological end position, wherein a section from the first point to the second point is the specific condition section.

8. A specific-condition-section detection apparatus configured to detect a specific condition section in a data signal, the signal level of the specific condition section continuing to be closer to a predetermined signal level than a reference level for comparison, the apparatus comprising:

signal correcting means for correcting the data signal so that a segment of the data signal in which the signal level is further away from the predetermined signal level than the reference level is corrected to a level closer to the predetermined signal level than the reference level for a predetermined amount of time during a window section of the data signal having a predetermined length starting from a point corresponding to a moment at which the level of the data signal is closer to the predetermined signal level than the reference level;

determining means for determining whether the level of the corrected data signal is closer to the predetermined signal level than the reference level, wherein the specific condition section is detected based on the determination output from the determining means; and first detecting means for setting a second reference level and detecting a first point and a second point in a section of the data signal determined by the determining means to have a signal level closer to the predetermined signal level than the reference level, the second reference level being a level between a maximum level in the signal level closer to the predetermined signal level than the reference level in the section of the data signal and the reference level, the first point being the first point in the section of the data signal at which the signal level reaches the second reference level when the section of the data signal is searched from a chronological start position, the second point being the first point in the section of the data signal at which the signal level reaches the second reference level when the section of the data signal is searched backward from a chronological end position, wherein a section from the first point to the second point is the specific condition section.

9. In a recording and reproducing apparatus configured to record a broadcast television program on a recording medium and to play back data recorded on the recording medium, a method of detecting a specific condition section in a data signal representing at least one of a video portion of the broadcast television program and an audio portion of the broadcast television program, the signal level of the specific condition section being closer to a predetermined signal level than to a reference level set for comparison, the method comprising:

correcting the data signal by replacing a specific segment of the data signal in which the signal level is further away from the predetermined signal level than from the reference level with another data signal segment having a signal level closer to the predetermined signal level than to the reference level, the specific segment of the data signal occurring during an interval within a window section of the data signal having a predetermined length starting at a moment at which the level of the data signal is closer to the predetermined signal level than to the reference level and ending at a moment at which the level of the data signal is closer to the reference level than to the predetermined signal level; and determining whether the level of the corrected data signal is closer to the predetermined signal level than to the reference level, the specific condition section being detected based on the determination carried out by the determining step.

10. A specific-condition-section detection apparatus configured to detect a specific condition section in a data signal, the signal level of the specific condition section being closer to a predetermined signal level than to a reference level set for comparison, the apparatus comprising:

a signal correction unit configured to correct the data signal by replacing a specific segment of the data signal in which the signal level is further away from the predetermined signal level than from the reference level with another data signal segment having a signal level closer to the predetermined signal level than to the reference level, the specific segment of the data signal occurring during an interval that starts at a time at which the signal level of the data signal changes from the level closer to the predetermined signal level than to the reference level to the level further away from the predetermined signal level than from the reference level and which ends at a time at which the signal level of the data signal changes back from the level further away from the predetermined signal level than from the reference level to the level closer to the predetermined signal level than to the reference level; and a determination unit configured to determine whether the level of the corrected data signal is closer to the predetermined signal level than to the reference level, the specific condition section being detected based on the determination carried out by the determination unit.

11. A specific-condition-section detection apparatus configured to detect a specific condition section in a data signal, the signal level of the specific condition section being closer to a predetermined signal level than to a reference level set for comparison, the apparatus comprising:

a signal correction unit configured to correct the data signal by replacing a specific segment of the data signal in which the signal level is further away from the predetermined signal level than from the reference level with another data signal segment having a signal level closer to the predetermined signal level than to the reference level, the specific segment of the data signal occurring during an interval within a window section of the data signal having a predetermined length starting at a moment at which the level of the data signal is closer to the predetermined signal level than to the reference level and ending at a moment at which the level of the data signal is closer to the reference level than to the predetermined signal level; and a determination unit configured to determine whether the level of the corrected data signal is closer to the predetermined signal level than to the reference level, the specific condition section being detected based on the determination carried out by the determination unit.

12. A specific-condition-section detection apparatus configured to detect a specific condition section in a data signal, the signal level of the specific condition section continuing to be closer to a predetermined signal level than a reference level for comparison, the apparatus comprising:

a signal correction unit configured to correct the data signal so that a segment of the data signal in which the signal level is further away from the predetermined signal level than the reference level is corrected to a level closer to the predetermined signal level than the reference level for a predetermined amount of time starting from a point at which the signal level of the data signal changes from a level closer to the predetermined signal level than the reference level to a level further away from the predetermined signal level than the reference level;

a determination unit configured to determine whether the level of the corrected data signal is closer to the predetermined signal level than the reference level, wherein the specific condition section is detected based on the determination output from the determination unit; and a first detecting unit configured to detect a first point and a second point in a section of the data signal determined by the determination unit to have a signal level closer to the predetermined signal level than the reference level, the first point being the first point in the section of the data signal at which the signal level reaches a maximum level in the signal level closer to the predetermined signal level than the reference level when the section of the data signal is searched from a chronological start position, the second point being the first point in the section of the data signal at which the signal level reaches a maximum level in the signal level closer to the predetermined signal level than the reference level when the section of the data signal is searched backward from a chronological end position, wherein a section from the first point to the second point is the specific condition section.

13. A specific-condition-section detection apparatus configured to detect a specific condition section in a data signal, the signal level of the specific condition section continuing to be closer to a predetermined signal level than a reference level for comparison, the apparatus comprising:

a signal correction unit configured to correct the data signal so that a segment of the data signal in which the signal level is further away from the predetermined signal level than the reference level is corrected to a level closer to the predetermined signal level than the reference level for a predetermined amount of time starting from a point at which the signal level of the data signal changes from a level closer to the predetermined signal level than the reference level to a level further away from the predetermined signal level than the reference level;

a determination unit configured to determine whether the level of the corrected data signal is closer to the predetermined signal level than the reference level, wherein the specific condition section is detected based on the determination output from the determination unit; and a first detecting unit configured to set a second reference level and detect a first point and a second point in a section of the data signal determined by the determination unit to have a signal level closer to the predetermined signal level than the reference level, the second reference level being a level between a maximum level in the signal level closer to the predetermined signal level than the reference level in the section of the data signal and the reference level, the first point being the first point in the section of the data signal at which the signal level reaches the second reference level when the section of the data signal is searched from a chronological start position, the second point being the first point in the section of the data signal at which the signal level reaches the second reference level when the section of the data signal is searched backward from a chronological end position, wherein a section from the first point to the second point is the specific condition section.

14. A specific-condition-section detection apparatus configured to detect a specific condition section in a data signal, the signal level of the specific condition section continuing to be closer to a predetermined signal level than a reference level for comparison, the apparatus comprising:

a signal correction unit configured to correct the data signal so that a segment of the data signal in which the signal level is further away from the predetermined signal level than the reference level is corrected to a level closer to the predetermined signal level than the reference level for a predetermined amount of time during a window section of the data signal having a predetermined length starting from a point corresponding to a moment at which the level of the data signal is closer to the predetermined signal level than the reference level;

a determination unit configured to determine whether the level of the corrected data signal is closer to the predetermined signal level than the reference level, wherein the specific condition section is detected based on the determination output from the determination unit; and a first detecting unit configured to detect a first point and a second point in a section of the data signal determined by the determination unit to have a signal level closer to the predetermined signal level than the reference level, the first point being the first point in the section of the data signal at which the signal level reaches a maximum level in the signal level closer to the predetermined signal level than the reference level when the section of the data signal is searched from a chronological start position, the second point being the first point in the section of the data signal at which the signal level reaches a maximum level in the signal level closer to the predetermined signal level than the reference level when the section of the data signal is searched backward from a chronological end position, wherein a section from the first point to the second point is the specific condition section.

15. A specific-condition-section detection apparatus configured to detect a specific condition section in a data signal, the signal level of the specific condition section continuing to be closer to a predetermined signal level than a reference level for comparison, the apparatus comprising:

a signal correction unit configured to correct the data signal so that a segment of the data signal in which the signal level is further away from the predetermined signal level than the reference level is corrected to a level closer to the predetermined signal level than the reference level for a predetermined amount of time during a window section of the data signal having a predetermined length starting from a point corresponding to a moment at which the level of the data signal is closer to the predetermined signal level than the reference level;

a determination unit configured to determine whether the level of the corrected data signal is closer to the predetermined signal level than the reference level, wherein the specific condition section is detected based on the determination output from the determination unit; and a first detecting unit configured to set a second reference level and detect a first point and a second point in a section of the data signal determined by the determination unit to have a signal level closer to the predetermined signal level than the reference level, the second reference level being a level between a maximum level in the signal level closer to the predetermined signal level than the reference level in the section of the data signal and the reference level, the first point being the first point in the section of the data signal at which the signal level reaches the second reference level when the section of the data signal is searched from a chronological start position, the second point being the first point in the section of the data signal at which the signal level reaches the second reference level when the section of the data signal is searched backward from a chronological end position, wherein a section from the first point to the second point is the specific condition section.

* * * * *